United States Patent
Nihei et al.

(10) Patent No.: US 6,791,596 B2
(45) Date of Patent: Sep. 14, 2004

(54) METHOD AND APPARATUS FOR IMAGE FORMING CAPABLE OF EFFECTIVELY GENERATING PIXEL CLOCK PULSES

(75) Inventors: Yasuhiro Nihei, Kanagawa-ken (JP); Hidetoshi Ema, Kanagawa-ken (JP); Masaaki Ishida, Kanagawa-ken (JP); Akihisa Itabashi, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 146 days.

(21) Appl. No.: 10/183,748

(22) Filed: Jun. 28, 2002

(65) Prior Publication Data

US 2003/0025785 A1 Feb. 6, 2003

(30) Foreign Application Priority Data

| Jun. 28, 2001 | (JP) | 2001-196597 |
| Jul. 2, 2001 | (JP) | 2001-201404 |
| Jul. 25, 2001 | (JP) | 2001-224604 |
| Sep. 25, 2001 | (JP) | 2001-290469 |

(51) Int. Cl.[7] .............................................. B41J 2/435
(52) U.S. Cl. ...................... 347/247; 347/249; 377/39
(58) Field of Search ................................ 347/234, 235, 347/347, 249, 250; 358/1.1; 377/39

(56) References Cited

U.S. PATENT DOCUMENTS

| 4,420,761 A | * 12/1983 | Kitamura | 347/235 |
| 5,181,137 A | * 1/1993 | Koide | 359/217 |
| 5,402,436 A | * 3/1995 | Paoli | 372/50 |
| 5,477,330 A | * 12/1995 | Dorr | 358/296 |
| 6,233,081 B1 | 5/2001 | Suzuki et al. | |
| 6,359,717 B2 | 3/2002 | Suzuki et al. | |
| 6,376,837 B1 | 4/2002 | Itabashi et al. | |
| 6,381,057 B1 | 4/2002 | Itabashi | |
| 6,384,949 B1 | 5/2002 | Suzuki | |
| 6,388,792 B1 | 5/2002 | Atsuumi et al. | |
| 6,400,391 B1 | 6/2002 | Suhara et al. | |
| 6,417,509 B1 | 7/2002 | Atsuumi et al. | |
| 6,429,956 B2 | 8/2002 | Itabashi | |
| 6,448,998 B1 | 9/2002 | Suzuki et al. | |
| 6,469,772 B1 | 10/2002 | Itabashi | |
| 6,498,617 B1 | 12/2002 | Ishida et al. | |
| 6,509,995 B1 | 1/2003 | Suzuki et al. | |

FOREIGN PATENT DOCUMENTS

| JP | 1-107230 | 4/1989 |
| JP | 3-77905 | 4/1991 |
| JP | 05-075199 | 3/1993 |
| JP | 05-207234 | 8/1993 |
| JP | 05-235446 | 9/1993 |
| JP | 09-321376 | 12/1997 |
| JP | 11-167081 | 6/1999 |
| JP | 2001-228415 | 8/2001 |

OTHER PUBLICATIONS

U.S. patent application Ser. No. 09/873,256, filed Jun. 5, 2001, pending.
U.S. patent application Ser. No. 10/667,321, Omori et al., filed Sep. 23, 2003.
U.S. patent application Ser. No. 10/448,413, Itabashi, filed May 30, 2003.
U.S. patent application Ser. No. 10/435,034, Nihei et al., filed May 12, 2003.
U.S. patent application Ser. No. 10/409,143, Ozasa et al., filed Apr. 9, 2003.
Pub. No.: US 2002/0080428; Appl. No.: 09/955,181; filed: Sep. 19, 2001; Inventor: Suzuki et al.
Pub. No.: US 2002/0101642; Appl. No.: 10/058,466, Filed: Jan. 28, 2002; Inventor: Masuda.

* cited by examiner

*Primary Examiner*—Blaise Mouttet
(74) *Attorney, Agent, or Firm*—Oblon, Spivak, McClelland, Maier & Neustadt, P.C.

(57) ABSTRACT

A pixel clock pulse generating apparatus for use in an image forming apparatus includes high frequency clock pulse and pixel clock pulse generators. The high frequency clock pulse generator generates relatively high frequency clock pulses. The pixel clock pulse generator generates pixel clock pulses based on the phase data for instructing a transition time of pixel clock pulses and the high frequency clock pulses.

101 Claims, 55 Drawing Sheets

Fig. 14

| AMOUNT OF PHASE SHIFT | PHASE DATA |
|---|---|
| 0 | 00 |
| +1/8PCLK | 01 |
| −1/8PCLK | 11 |

Fig. 15

| INPUT | | OUTPUT | |
|---|---|---|---|
| PHASE DATA | STATUS | V1 | V2 |
| 00 | 0 | 3 | 3 |
| 00 | 1 | 3 | 3 |
| 01 | 0 | 3 | 4 |
| 01 | 1 | 4 | 3 |
| 11 | 0 | 2 | 3 |
| 11 | 1 | 3 | 2 |

SUB-SCANNING DIRECTION

MAIN SCANNING DIRECTION

Fig. 33A
Fig. 33B
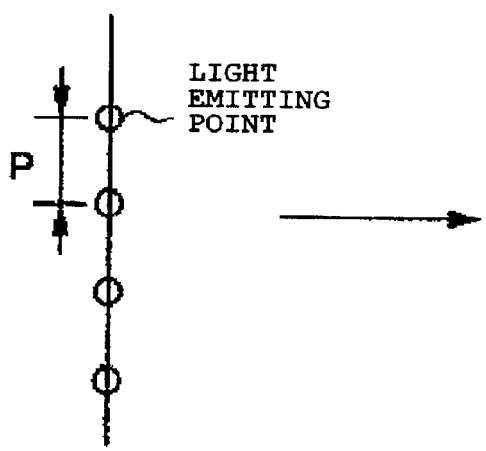
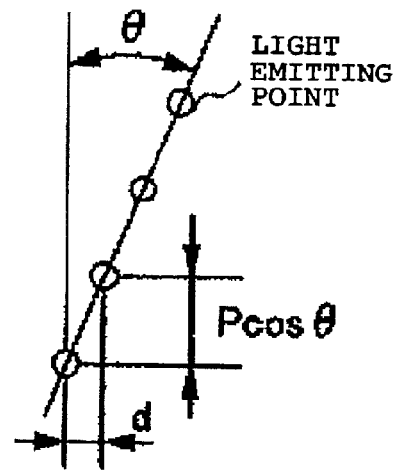

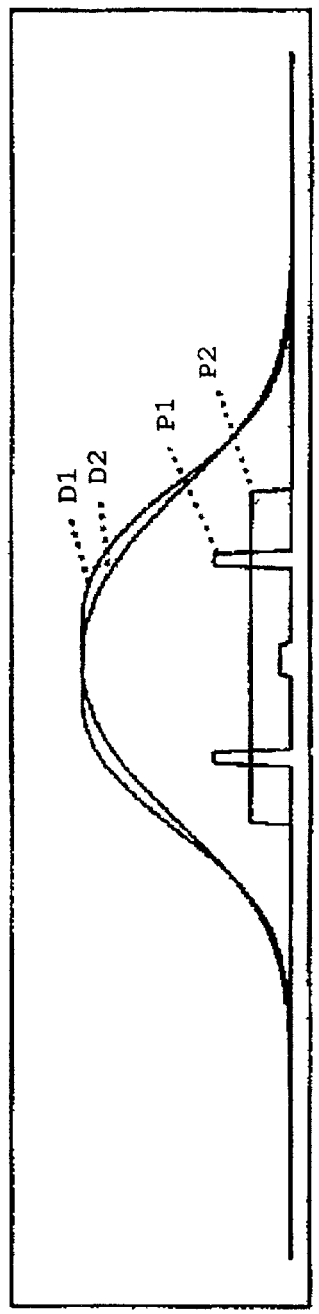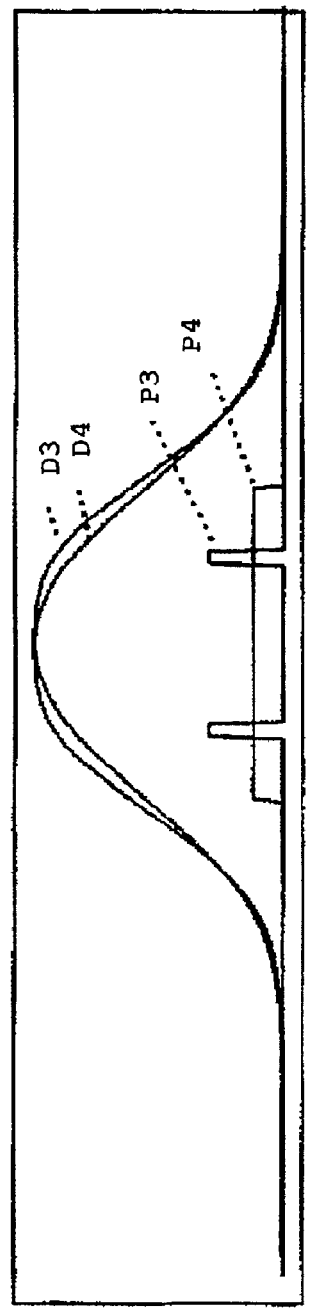

Fig. 54

METHOD AND APPARATUS FOR IMAGE FORMING CAPABLE OF EFFECTIVELY GENERATING PIXEL CLOCK PULSES

BACKGROUND OF THE INVENTION

1. Field of the Invention

The present invention relates to a method and apparatus for image forming, and more particularly to a method and apparatus for image forming that is capable of effectively generating pixel clock pulses without using an extremely high frequency clock pulse.

2. Discussion of the Background

FIG. 1 illustrates a typical structure of a background electrophotographic image forming apparatus such as a digital copying apparatus. The background image forming apparatus of FIG. 1 includes a semiconductor laser unit 1, a polygon mirror 2, a scanning lens system 3, a photosensitive member 4, a photo-detector 5, an image process unit 6, a laser drive circuit 7, a clock pulse generator 8, and a phase sync circuit 9.

In the background image forming apparatus of FIG. 1, a laser light beam emitted from the laser unit 1 is reflected in a continuous and cyclic manner by the rotating polygon mirror 2 and becomes a scanning beam. Then, the scanning beam is directed to the surface of the photosensitive member 4 with the scanning lens system 3 to form a beam spot thereon. With this beam spot, an exposure process relative to the surface of the photosensitive member 4 is performed and therefore an electrostatic latent image is generated on the surface of the photosensitive member 4. In this process, the photo-detector 5 detects the scanning beam from line to line. The phase sync circuit 9 receives a clock pulse output from the clock pulse generator 8 and generates pixel clock pulses synchronized in phase from line to line with reference to the output from the photo-detector 5. The phase sync circuit 9 sends the thus-generated pixel clock pulses to the image process unit 6 and the laser drive circuit 7. In this way, the laser unit 1 controls a time period that the semiconductor laser emits laser light based on the image data generated by the image process unit 6 and the pixel clock pulses, synchronized in phase from line to line, and which is generated by the phase sync circuit 9. Thereby, the laser unit 1 can control an electrostatic latent image to be formed on the surface of the photosensitive member 4.

In the above-described optical scanning system, variations of distance between a deflective surface of a deflecting device such as a polygon mirror and a revolution shaft will cause the scanning beam to run on the surface of the photosensitive member at an undesired uneven scanning speed. Such an undesired uneven scanning speed will cause a jitter of an image and, as a result, an image quality is degraded. Therefore, correction for the scanning speed is needed to obtain a high image quality.

In a multiple beam optical system, a plurality of light sources may generate a plurality of laser beams with uneven oscillation wave lengths. In this case, an exposure displacement occurs particularly when the optical system does not correct a chromatic aberration of the scanning lens. Accordingly, when the beams spots generated by the laser light beams from the respective laser light sources run on the surface of the photosensitive member, the scanning widths will be different from each other. This also leads to a deterioration of an image quality and therefore the scanning widths are needed to be corrected.

For example, Japanese unexamined laid-open patent application publications, NO. 05-075199, No. 05-235446, No. 09-321376, No. 11-167081 and No. 2001-228415, describe background techniques for attempting to correct for the uneven scanning. These techniques basically are a frequency modulation method for changing a frequency of the pixel clock pulses to control a position of a light spot along the scanning line.

However, a circuit using such a frequency modulation method involves a complex control circuit for controlling pixel clock pulses and the complexness increases as the frequency modulation width becomes smaller. As a result, the circuit using the frequency modulation method cannot control the pixel clock pulses in a delicate manner.

SUMMARY OF THE INVENTION

This patent specification describes a novel pixel clock pulse generating apparatus for use in an image forming apparatus. In one example, this novel pixel clock pulse generating apparatus includes a high frequency clock pulse generator and a pixel clock pulse generator. The high frequency clock pulse generator generates relatively high frequency clock pulses. The pixel clock pulse generator receives phase data for instructing a transition time of pixel clock pulses and the relatively high frequency clock pulses generated by the high frequency clock pulse generator, and generates pixel clock pulses based on the phase data and the high frequency clock pulses.

This patent specification describes another novel pixel clock pulse generating apparatus for use in an image forming apparatus. In one example, this novel pixel clock pulse generating apparatus includes a high frequency clock pulse generator and a pixel clock pulse generator. The high frequency clock pulse generator generates relatively high frequency clock pulses. The pixel clock pulse generator receives phase data for instructing a transition time of pixel clock pulses and the relatively high frequency clock pulses generated by the high frequency clock pulse generator, and changes a frequency of pixel clock pulses based on the phase data and the high frequency clock pulses.

The transition time of pixel clock pulses may be synchronism with a transition time of the high frequency clock pulses.

In the above-mentioned pixel clock pulse generating apparatus, a frequency of the pixel clock pulses may be changed in steps of one clock cycle or a half clock cycle of the high frequency clock pulses.

This patent specification further describes another novel pixel clock pulse generating apparatus for use in an image forming apparatus. In one example, this novel pixel clock pulse generating apparatus includes a high frequency clock pulse generator, a counter, a comparator, and a controller. The high frequency clock pulse generator generates relatively high frequency clock pulses. The counter counts a number of the high frequency clock pulses generated by the high frequency clock pulse generator. The comparator compares the number of the high frequency clock pulses counted by the counter with phase data for instructing a transition time of pixel clock pulses. The controller performs a transition of a pixel clock pulse based on a result of comparison performed by the comparator.

The above-mentioned pixel clock pulse generating apparatus may further include a decoder for decoding the phase data and sending decoded data to the comparator.

The above-mentioned pixel clock pulse generating apparatus may further include a phase data memory for storing a plurality of phase data and sending the plurality of phase data in synchronism with the pixel clock pulses to the comparator.

The above-mentioned pixel clock pulse generating apparatus may further include a phase data memory and a decoder. The phase data memory stores a plurality of phase data and outputs the plurality of phase data in synchronism with the pixel clock pulses. The decoder receives the plurality of phase data output by the phase data memory, decodes the plurality of phase data, and sends the decoded phase data to the comparator.

The above-mentioned pixel clock pulse generating apparatus may further include a phase data memory and a synthesizer. The phase data memory stores a plurality of first phase data and outputs the plurality of phase data in synchronism with the pixel clock pulses. The synthesizer receives the plurality of first phase data output by the phase data memory and second phase data, synthesizes the plurality of first phase data and the second phase data, and sends synthesized phase data to the comparator.

The above-mentioned pixel clock pulse generating apparatus may further include a phase data memory, a synthesizer, and a decoder. The phase data memory stores a plurality of first phase data and outputs the plurality of phase data in synchronism with the pixel clock pulses. The synthesizer receives the plurality of first phase data output by the phase data memory and second phase data, synthesizes the plurality of first phase data and the second phase data, and outputs synthesized phase data. The decoder receives the synthesized phase data output from the synthesizer, decodes the synthesized phase data, and sends decoded phase data to the comparator.

The decoder may decode phase data having a bit width corresponding to an amount of phase shift into phase data having a bit width equal to a bit width used in a calculation.

The phase data memory may previously store a line of phase data and output the phase data line by line in synchronism with the pixel clock pulses.

The phase data memory may previously store a line of first phase data and output the phase data line by line in synchronism with the pixel clock pulses, and the synthesizer may synthesize the second phase data with the first phase data.

In the above-mentioned pixel clock pulse generating apparatus, a rising edge or a falling edge of each of the high frequency clock pulses may be detected and a number of the high frequency clock pulses is counted.

This patent specification further describes another novel pixel clock pulse generating apparatus for use in an image forming apparatus. In one example, this novel pixel clock pulse generating apparatus includes a high frequency clock pulse generator, a comparison value generator, first and second counters, first and second comparators, first and second clock pulse generators, and a clock pulse selector. The high frequency clock pulse generator generates relatively high frequency clock pulses. The comparison value generator generates a first comparison value and a second comparison value based on phase data indicating an amount of phase shift relative to pixel clock pulses and a status signal indicating a status of the pixel clock pulses. The first counter counts the high frequency clock pulses generated by the high frequency clock pulse generator by detecting a first varying point of each of the high frequency clock pulses. The first comparator compares an output value of the first counter with the first comparison value output from the comparison value generator. The first clock pulse generator generates a first clock pulse at the first varying point of the high frequency clock pulses based on a result of a comparison performed by the first comparator. The second counter counts the high frequency clock pulses generated by the high frequency clock pulse generator by detecting a second varying point of each of the high frequency clock pulses. The second comparator compares an output value of the second counter with the second comparison value output from the comparison value generator. The second clock pulse generator generates a second clock pulse at the second varying point of the high frequency clock pulses based on a result of a comparison performed by the second comparator. The pulse selector selects one of the first and second clock pulses and to output selected clock pulse as a pixel clock pulse.

The comparison value generator may generate a first value as the first comparison value and a second value as the second comparison value in accordance with the amount of phase shift indicated by the phase data when the status signal indicates that the pixel clock pulses are in a first status, and generate the second value as the first comparison value and the first value as the second comparison value in accordance with the amount of phase shift indicated by the phase data when the status signal indicates that the pixel clock pulses are in a second status.

The clock pulse selector may toggle between the first and second clock pulses in accordance with the phase data and the status of the pixel clock pulses indicated by the status signal.

This patent specification further describes a novel pixel clock pulse generating apparatus for use in an image forming apparatus. In one example, this novel pixel clock pulse generating apparatus includes a phase data memory which stores a plurality of phase data and sends the plurality of phase data in synchronism with the pixel clock pulses to the comparison value generator.

The above-mentioned novel pixel clock pulse generating apparatus may further include a phase data memory and a synthesizer. The phase data memory stores a plurality of first phase data and to send the plurality of first phase data in synchronism with the pixel clock pulses. The synthesizer receives the plurality of first phase data output by the phase data memory and second phase data, synthesizes the plurality of first phase data and the second phase data, and sends synthesized phase data to the comparison value generator.

The phase data memory may previously store a line of phase data and outputs the phase data line by line in synchronism with the pixel clock pulses.

The phase data memory may previously store a line of first phase data and outputs the phase data line by line in synchronism with the pixel clock pulses and the synthesizer synthesizes the second phase data with the first phase data.

The first varying point of each of the high frequency clock pulses may be a rising edge of each of the high frequency clock pulses and the second varying point of each of the high frequency clock pulses may be a falling edge of each of the high frequency clock pulses.

Further, this patent specification describes a novel method of generating pixel clock pulses. In one example, this novel method includes the steps of generating, instructing, and generating. The generating step generates relatively high frequency clock pulses. The instructing step instructs a transition time of pixel clock pulses with phase data. The generating step generates pixel clock pulses based on the phase data and the high frequency clock pulses.

This patent specification further describes another novel method of generating pixel clock pulse. In one example, this novel method includes the steps of generating, instructing, and changing. The generating step generates relatively high frequency clock pulses. The instructing step instructs a transition time of pixel clock pulses with phase data. The changing step changes a frequency of pixel clock pulses based on the phase data and the high frequency clock pulses.

Further, this patent specification describes a novel image forming apparatus. In one example, this novel image forming apparatus includes a photosensitive member, a pixel clock pulse generator, and a laser beam scanning mechanism. The pixel clock pulse generator includes a high frequency clock pulse generator and a pixel clock pulse generator. The high frequency clock pulse generator generates relatively high frequency clock pulses. The pixel clock pulse generator receives phase data for instructing a transition time of pixel clock pulses and the relatively high frequency clock pulses generated by the high frequency clock pulse generator and changes a frequency of pixel clock pulses based on the phase data and the high frequency clock pulses. The laser beam scanning mechanism generates a laser scanning beam based on the pixel clock pulses for cyclically scanning a surface of the photosensitive member to form an electrostatic latent image on the photosensitive member.

The laser beam scanning mechanism may generate a plurality of laser scanning beams based on the pixel clock pulses for cyclically scanning a surface of the photosensitive member with the plurality of laser scanning beams in a simultaneous manner to form an electrostatic latent image on the photosensitive member.

Further, this patent specification describes a novel method of image forming. In one example, this novel method includes the steps of generating, generating, instructing, changing, generating, and performing. The generating step generates relatively high frequency clock pulses. The generating step generates pixel clock pulses based on the relatively high frequency clock pulses. The instructing step instructs a transition time of the pixel clock pulses with phase data. The changing step changes a frequency of the pixel clock pulses based on the phase data and the high frequency clock pulses. The generating step generates a laser scanning beam based on the pixel clock pulses. The performing step performs a cyclic scanning with the laser scanning beam relative to a surface of a photosensitive member to form an electrostatic latent image on the photosensitive member.

The generating step may generate a plurality of laser scanning beams based on the pixel clock pulses and the performing step may perform the cyclic scanning with the plurality of laser scanning beams in a simultaneous manner relative to the surface of the photosensitive member to form an electrostatic latent image on the photosensitive member.

Further, this patent specification describes a novel image forming apparatus. In one example, a novel image forming apparatus include a photosensitive member, a pixel clock pulse generator, a laser light oscillator, an optical scanner, and a phase changer. The photosensitive member has a photosensitive surface. The pixel clock pulse generator is configured to generate pixel clock pulses. The laser light oscillator is configured to oscillate a plurality of laser light in accordance with the pixel clock pulses. The optical scanner is configured to convert the plurality of laser light into a plurality of scanning laser light beams that focus as a plurality of scanning laser light spots on the photosensitive surface of the photosensitive member and scan respective scanning lines starting from respective scanning start positions aligned in a sub-scanning direction on the photosensitive surface of the photosensitive member. The phase changer is configured to change a phase of the pixel clock pulses to control respective times when the plurality of laser light are oscillated by the laser light oscillator so as to correct deviations associated with the scanning laser light spots.

The laser light oscillator may include at least two laser light oscillating semiconductors or a laser light oscillating semiconductor that has a plurality of laser light emission points.

The deviations may occur in the scanning start positions in a main scanning direction and may be caused by differences in wave lengths of the respective of the plurality of laser light oscillated by the laser light oscillator.

The deviations may occur in the scanning start positions in a main scanning direction and may be caused due to manufacturing errors generated during a manufacturing of the laser light oscillator.

The optical scanner may include a laser light deflector configured to deflect the plurality of laser light. In this case, and the deviations may occur in the scanning start positions in a main scanning direction and may be caused due to a characteristic of the laser light deflector.

The deviations may occur in a scanning line length per unit time among the scanning laser light spots and the phase changer may change the phase of the pixel clock pulses to control respective times when the plurality of laser light are oscillated by the laser light oscillator so as to correct the deviations to be less than 1% relative to a predetermined scanning line length.

Further, this patent specification describes a novel image forming apparatus. In one example, a novel image forming apparatus includes a plurality of photosensitive members, a pixel clock pulse generator, a plurality of laser light oscillators, a plurality of optical scanners, and a phase changer. Each of the plurality of photosensitive members has a photosensitive surface. The pixel clock pulse generator is configured to generate pixel clock pulses. Each of the plurality of laser light oscillators includes at least one laser light oscillating semiconductor configured to oscillate laser light in accordance with the pixel clock pulses. The plurality of optical scanners are arranged to correspond to the plurality of laser light oscillators and to the plurality of photosensitive members on a one-to-one basis. Each of the plurality of optical scanners is configured to convert the laser light emitted by corresponding one of the plurality of laser light oscillator into a scanning laser light beam that focuses as a scanning laser light spot on the photosensitive surface of corresponding one of the plurality of the photosensitive members and scans a scanning line on the photosensitive surface of the corresponding one of the plurality of the photosensitive members. The phase changer is configured to change a phase of the pixel clock pulses to control respective times when the plurality of laser light are oscillated by the plurality of laser light oscillators so as to correct deviations in lengths of the scanning lines relative to a predetermined scanning time period among the plurality of photosensitive members.

The above-mentioned image forming apparatus may further includes a controller configured to control a driving of the laser light oscillator. This controller includes a high frequency clock pulse generator and an image data loader. The high frequency clock pulse generator is configured to generate a high frequency clock pulse. The image data loader is configured to load image data in synchronism with the high frequency clock pulse and the pixel clock pulse. In this configuration, the pixel clock pulse generator frequency-divides the high frequency clock pulse generated by the high frequency clock pulse generator to generate the pixel clock pulse and the phase changer shifts the phase of the pixel clock pulse to cause the image data loader to change a timing of loading the image data.

The high frequency clock pulse generator may include a phase synchronizer which includes a voltage control oscillator, a frequency divider, and a phase comparator. The voltage control oscillator is configured to oscillate laser light in accordance with a voltage applied. The frequency divider is configured to frequency-divide an output from the voltage control oscillator. The phase comparator is configured to compare a phase of an output from the frequency divider with a phase of a reference frequency and, based on a comparison result, to output a phase synchronous signal.

The pixel clock pulse generator may output the pixel clock pulse in synchronism with the phase synchronous signal output by the phase comparator.

The controller may include a pulse modulation pattern generator configured to generate a pulse modulation pattern relative to the laser light oscillated by the laser light oscillator in accordance with the output from the voltage control oscillator and the image data loaded by the image data loader.

The above-mentioned image forming apparatus may further include a pulse modulation controller configured to modulation-control the laser light oscillator in accordance with the pulse modulation pattern generated by the pulse modulation pattern generator to cause the laser light to be a frequency-modulated laser light. In this configuration, the phase changer may change the phase of the pixel clock pulses to control a time when the pulse modulation pattern generator generates the pulse modulation pattern.

The pixel clock pulse generator, the phase changer, the image data loader, the phase synchronizer, and the pulse modulation pattern generator may be integrated into a one-chip integrated circuit.

The pixel clock pulse generator, the phase changer, the controller, the phase synchronizer, and the pulse modulation pattern generator may be integrated into a one-chip integrated circuit.

This patent specification further describes a novel method of image forming. In one example, a novel method includes the steps of providing, generating, oscillating, converting, and changing. The providing step provides a photosensitive surface. The generating step generates pixel clock pulses. The oscillating step oscillates a plurality of laser light in accordance with the pixel clock pulses. The converting step converts the plurality of laser light into a plurality of scanning laser light beams that focus as a plurality of scanning laser light spots on the photosensitive surface and scan respective scanning lines starting from respective scanning start positions aligned in a sub-scanning direction on the photosensitive surface. The changing step changes a phase of the pixel clock pulses to control respective times when the plurality of laser light are oscillated by the oscillating step so as to correct deviations associated with the scanning laser light spots.

The oscillating step may use at least two laser light oscillating semiconductors or a laser light oscillating semiconductor that has a plurality of laser light emission points.

The deviations may occur in the scanning start positions in a main scanning direction and may be caused by differences in wave lengths of the respective of the plurality of laser light oscillated by the oscillating step.

The deviations may occur in the scanning start positions in a main scanning direction and may be caused due to manufacturing errors generated during a manufacturing of the laser light oscillating means.

The converting step may include a step of deflecting the plurality of laser light, and the deviations may occur in the scanning start positions in a main scanning direction and may be caused due to a characteristic of the deflecting step.

The deviations may occur in a scanning line length per unit time among the scanning laser light spots and the changing step may change the phase of the pixel clock pulses to control respective times when the plurality of laser light are oscillated by the oscillating step so as to correct the deviations to be less than 1% relative to a predetermined scanning line length.

The above-mentioned method may further include the step of controlling a driving of the laser light oscillator. This controlling step further include the steps of generating and loading. The generating step generates a high frequency clock pulse. The loading step loads image data in synchronism with the high frequency clock pulse and the pixel clock pulse. In this configuration, the pixel clock pulse generating step may frequency-divide the high frequency clock pulse generated by the high frequency clock pulse generating step to generate the pixel clock pulse and the changing step shifts the phase of the pixel clock pulse to cause the loading step to change a timing of loading the image data.

The high frequency clock pulse generating step may include the step of synchronizing which includes the steps of oscillating, frequency-dividing, and comparing. The oscillating step oscillates laser light in accordance with a voltage applied. The frequency-dividing step frequency-divides an output from the voltage control oscillating step. The comparing step compares a phase of an output from the frequency dividing step with a phase of a reference frequency and, based on a comparison result, to output a phase synchronous signal.

The pixel clock pulse generating step may output the pixel clock pulse in synchronism with the phase synchronous signal output by the comparing step.

The controlling step may further include the step of generating a pulse modulation pattern relative to the laser light oscillated by the laser light oscillating step in accordance with the output from the voltage control oscillating step and the image data loaded by the image data loading step.

The above-mentioned method may further include the steps of modulation-controlling the laser light oscillating step in accordance with the pulse modulation pattern generated by the pulse modulation pattern generating step to cause the laser light to be a frequency-modulated laser light. In this configuration, the phase changing step may change the phase of the pixel clock pulses to control a time when the pulse modulation pattern generating step generates the pulse modulation pattern.

The pixel clock pulse generating step, the phase changing step, the image data loading step, the phase synchronizing step, and the pulse modulation pattern generating step may be integrated into a one-chip integrated circuit.

The pixel clock pulse generating step, the phase changing step, the controlling step, the phase synchronizing step, and the pulse modulation pattern generating step may be integrated into a one-chip integrated circuit.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein:

FIG. 14 is a data table indicating a relationship between the phase shift amount and the phase data;

FIG. 15 is a data table indicating a relationship between input and output of a comparator used in the pixel clock pulse generator of FIG. 11;

FIGS. 33A and 33B are illustrations for explaining the case in which a laser diode array of the light source unit is tilted;

FIGS. 38–41 are graphs for explaining a relationship between a light modulation pulse and an exposure energy distribution in various cases;

FIG. 54 is a data table showing exemplary modulation data used in an LUT of the pulse modulator of FIG. 42;

DETAILED DESCRIPTION OF PREFERRED EMBODIMENTS

Figure 1:
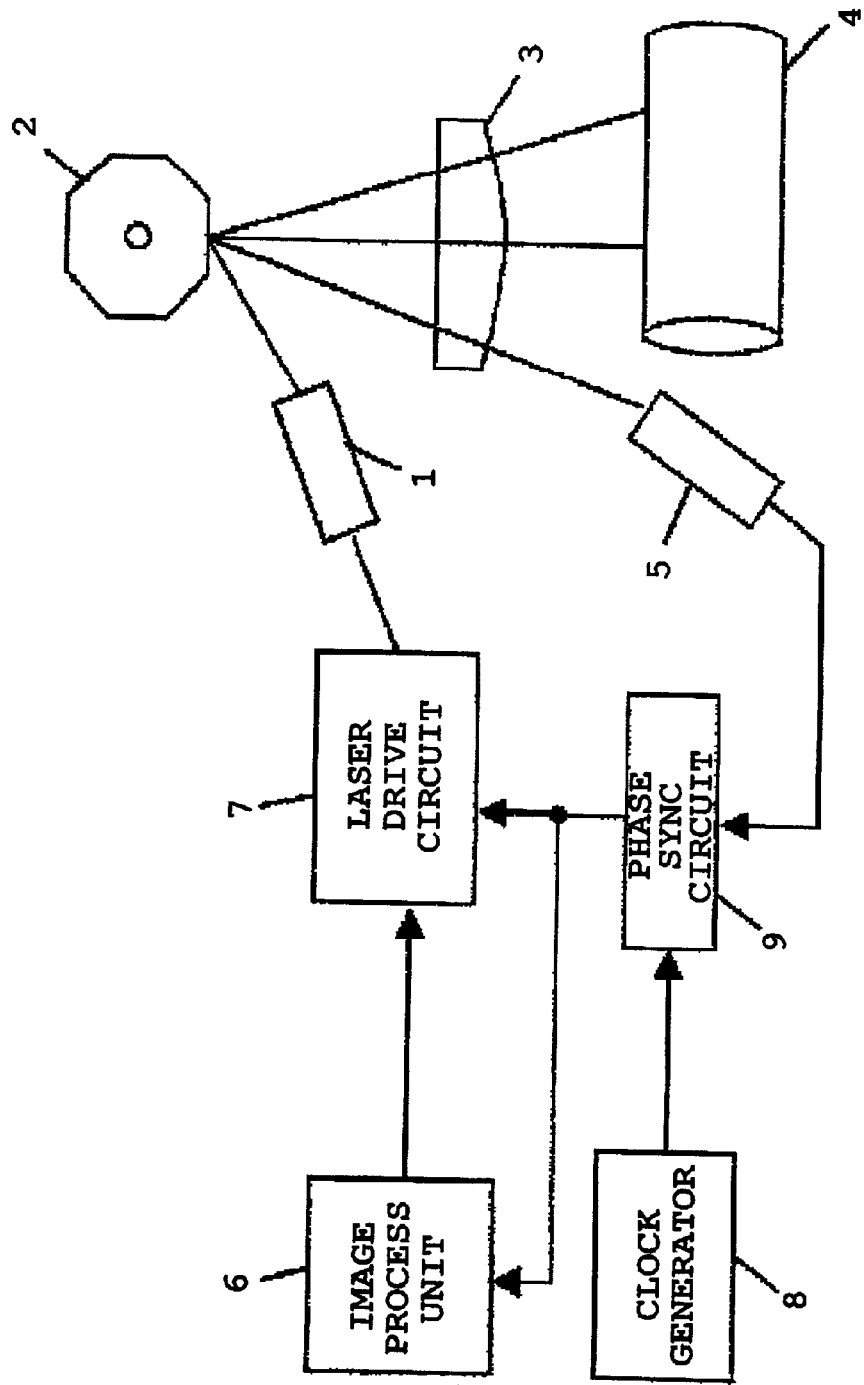
FIG. 1 is a schematic illustration for explaining a structure of a background image forming apparatus.
Figure 2:
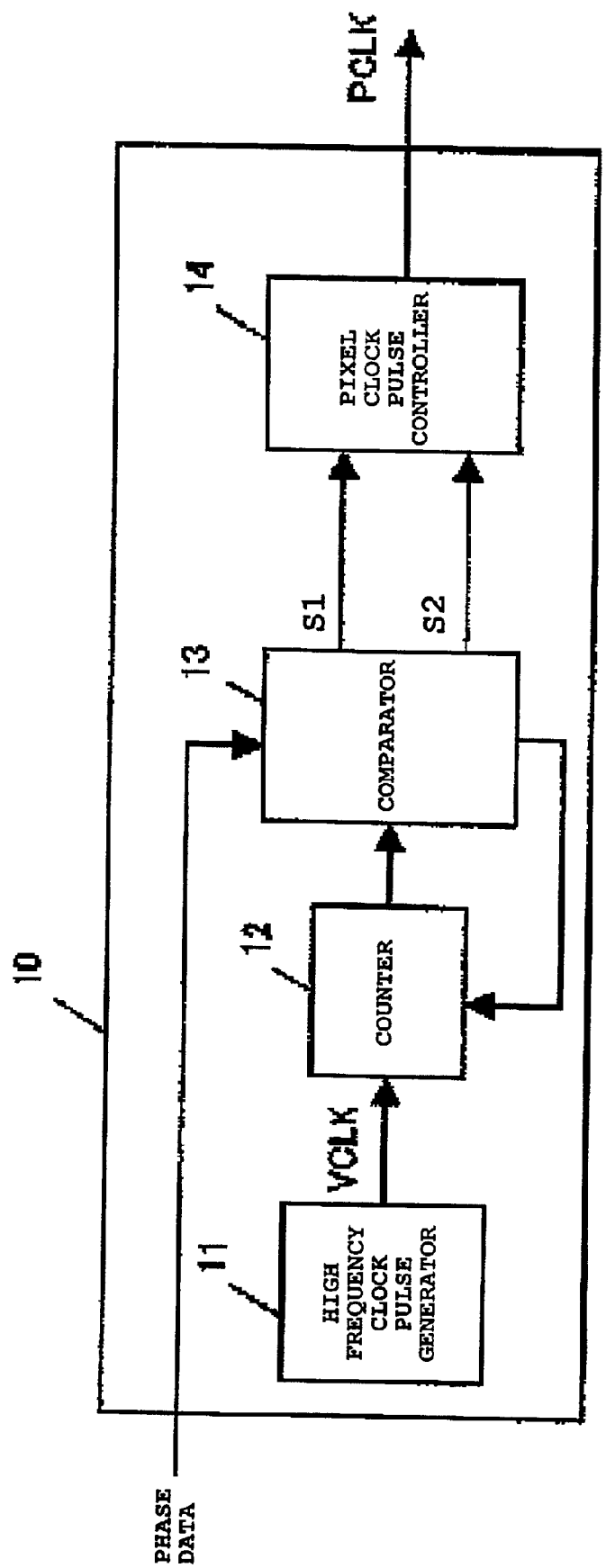
FIG. 2 is a schematic block diagram of a pixel clock pulse generator according to a preferred embodiment of the present invention.

In describing preferred embodiments illustrated in the drawings, specific terminology is employed for the sake of clarity. However, the disclosure of this patent specification is not intended to be limited to the specific terminology so selected and it is to be understood that each specific element includes all technical equivalents that operate in a similar manner. Referring now to the drawings, wherein like reference numerals designate identical or corresponding parts throughout the several views, particularly to FIG. 2, a description is made for a pixel clock pulse generator 10 for use in an electrophotographic image forming apparatus according to a preferred embodiment of the present invention. FIG. 2 is a block diagram of the pixel clock pulse generator 10. As shown in FIG. 2, the pixel clock pulse generator 10 includes a high frequency clock pulse generator 11, a counter 12, a comparator 13, and a pixel clock pulse controller 14. The high frequency clock pulse generator 11 generates high frequency clock pulses VCLK which are the basic pulses to make pixel clock pulses PCLK.

The counter 12 includes a counter circuit which is triggered by each rising edge of the clock pulses VCLK to count the number of the clock pulses VCLK. The comparator 13 compares the value of the counter 12 with a prestored value and phase data which is externally input to indicate an amount of a phase shift for transitions of the pixel clock pulses PCLK. As a result of the comparison, the comparator 13 outputs controls signals S1 and S2. The pixel clock pulse controller 14 controls the transitions of the pixel clock pulses PCLK based on the control signals S1 and S2.

The above-mentioned phase data is the data indicating what amount the phase of the pixel clock pulse is needed to be shifted in order to correct, for example, for undesired variations in scanning caused by characteristics of the scanning lenses used, undesired displacements of dots caused by the variations in the revolution of a polygon mirror, and also undesired displacements of dots caused by a chromatic aberration of laser light. The phase data is generally expressed in several bits of a digital value. Further details of the phase data are explained later.

Figure 3A:
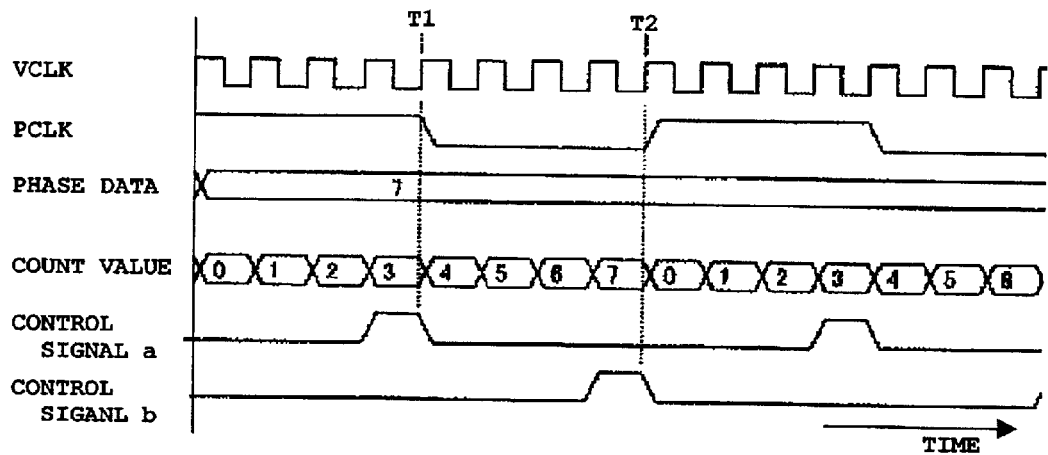
FIGS. 3A–3C are time charts for explaining operations of the pixel clock pulse generator of FIG. 2 to generate pixel clock pulses PCLK based on high frequency clock pulses VCLK.
Figure 3B:
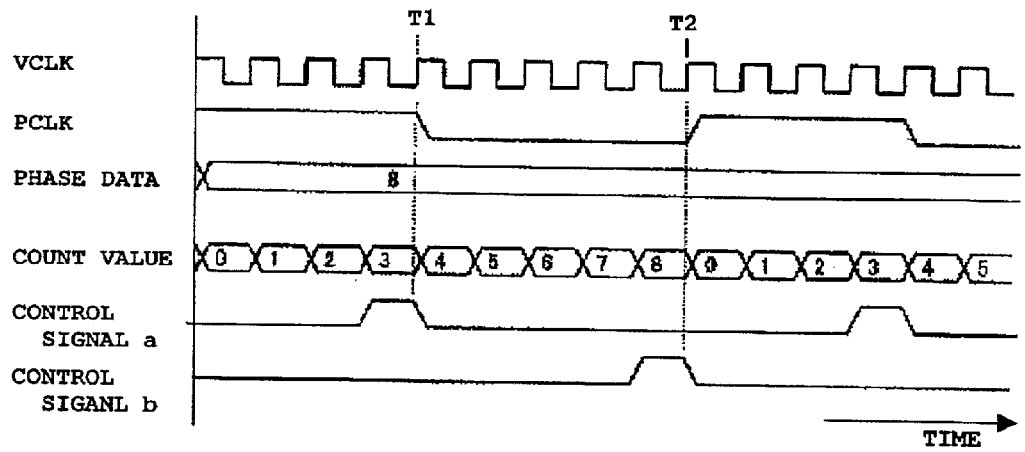
Figure 3C:
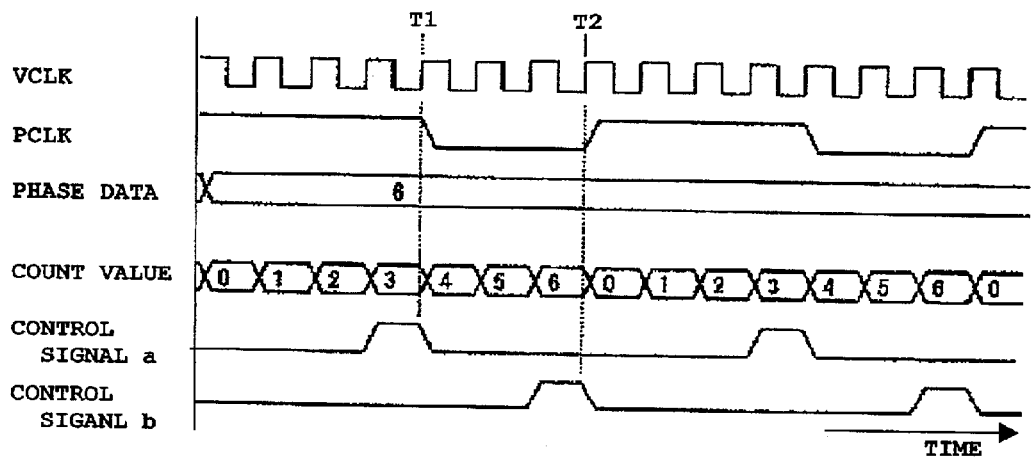

Referring to FIGS. 3A–3C, operations of the pixel clock pulse generator 10 are explained. In this discussion, the frequency of the pixel clock pulses PCLK is one-eighth of the frequency of the high frequency clock pulses VCLK and each cycle is set to a basic duty ratio of 50%, for example.

FIG. 3A shows a basic pixel clock pulse PCLK having a basic 50% duty ratio, and which corresponds to a one-eighth frequency of the clock pulses VCLK. FIG. 3B shows pixel clock pulses PCLK having a cycle that has a phase lead of a one-eighth clock cycle, for example, relative to the cycle of the basic-pixel clock pulses PCLK with the basic 50% duty ratio. FIG. 3C shows a pixel clock pulse PCLK having a cycle that has a phase lag of a one-eighth clock cycle, for example, relative to the cycle of the basic pixel clock pulse PCLK with the basic 50% duty ratio.

In FIG. 3A, the phase data is set to 7, for example, and the comparator 13 prestores 3, for example. The counter 12 counts the number of the clock pulses VCLK by detecting the rising edge of each VCLK. The comparator 13 outputs a high pulse of the control signal S1 when the counter 12 outputs a count value of 3. As the control signal S1 is high, the pixel clock pulse controller 14 detects the subsequent VCLK at a time T1 and causes the pixel clock pulse PCLK to transition from its high state to its low state. After that, the comparator 13 compares the given phase data with the count value and outputs a high pulse of the control signal S2 when the two values match each other.

In FIG. 3A, the comparator 13 outputs the high pulse of the control signal S2 when the counter 12 has the count value of 7. As the control signal S2 is high, the pixel clock pulse controller 14 detects the subsequent VCLK at a time T2 and causes the pixel clock pulse PCLK to transition from its low state to its high state. At the same time, the comparator 13 resets the counter 12 so that the counter 12 restarts its counting operation from 0. In this way, the pixel clock pulse generator 10 generates the basic pixel clock pulses PCLK with the basic 50% duty ratio, which frequency corresponds to one-eighth the frequency of the high frequency clock pulses VCLK. The duty ratio can be varied with a different value prestored to the comparator 13.

In FIG. 3B, the phase data is set to 8, instead of 7, and the comparator 13 prestores 3, the same value as the case of FIG. 3A. The counter 12 counts the number of the clock pulses VCLK. The comparator 13 outputs a high pulse of the control signal S1 when the counter 12 outputs the count value of 3. As the control signal S1 is high, the pixel clock pulse controller 14 detects the subsequent VCLK at a time T1 and causes the pixel clock pulse PCLK to transition from its high state to its low state.

After that, the comparator 13 compares the given phase data (i.e., 8) with the count value and outputs a high pulse of the control signal S2 when the two values match each other. As the control signal S2 is high, the pixel clock pulse controller 14 detects the subsequent VCLK at a time T2 and causes the pixel clock pulse PCLK to transition from its low state to its high state.

At the same time, the comparator 13 resets the counter 12 so that the counter 12 restarts its counting operation from 0. In this way, the pixel clock pulse generator 10 generates the pixel clock pulses PCLK which cycle has a phase lead by a one-eighth clock cycle relative to the cycle of the basic pixel clock pulses PCLK, as shown in FIG. 3B.

In FIG. 3C, the phase data is set to 6, instead of 7, and the comparator 13 prestores 3, the same value as the case of FIG. 3A. The counter 12 counts the number of the clock pulses VCLK. The comparator 13 outputs a high pulse of the control signal S1 when the counter 12 outputs the count value of 3. As the control signal S1 is high, the pixel clock pulse controller 14 detects the subsequent VCLK at a time T1 and causes the pixel clock pulse PCLK to transition from its high state to its low state.

After that, the comparator 13 compares the given phase data (i.e., 6) with the count value and outputs a high pulse of the control signal S2 when the two values match each other. As the control signal S2 is high, the pixel clock pulse controller 14 detects the subsequent VCLK at a time T2 and causes the pixel clock pulse PCLK to transition from its low state to its high state.

At the same time, the comparator 13 resets the counter 12 so that the counter 12 restarts its counting operation from 0. In this way, the pixel clock pulse generator 10 generates the pixel clock pulses PCLK which cycle has a phase lag by a one-eighth clock cycle relative to the cycle of the basic pixel clock pulses PCLK, as shown in FIG. 3C.

Figure 4:
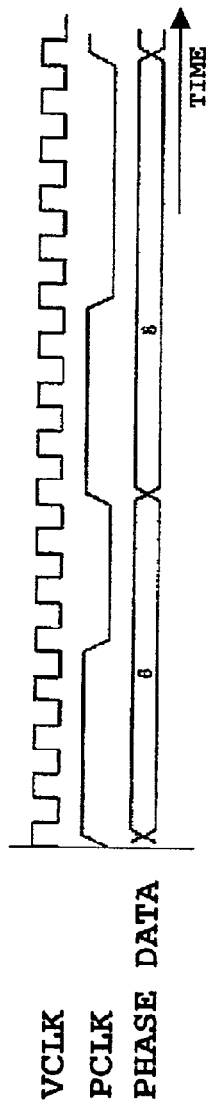
FIG. 4 is another time chart of the operation of the pixel clock pulse generator of FIG. 2.

The pixel clock pulses PCLK can be varied in steps of one VCLK clock cycle with the application of the phase data to the comparator 13 in synchronism with the rising edge of the pixel clock pulses PCLK. FIG. 4 shows this arrangement.

Thus, according to the present invention, it becomes possible to control a time length of the pixel clock pulses PCLK in steps of the VCLK clock cycle with a relatively simple structure. In addition, the comparator 13 can be made in a simper manner by such an arrangement that the number of bits of the phase data is equal to the number of the counting bits of the counter 12.

Figure 5:
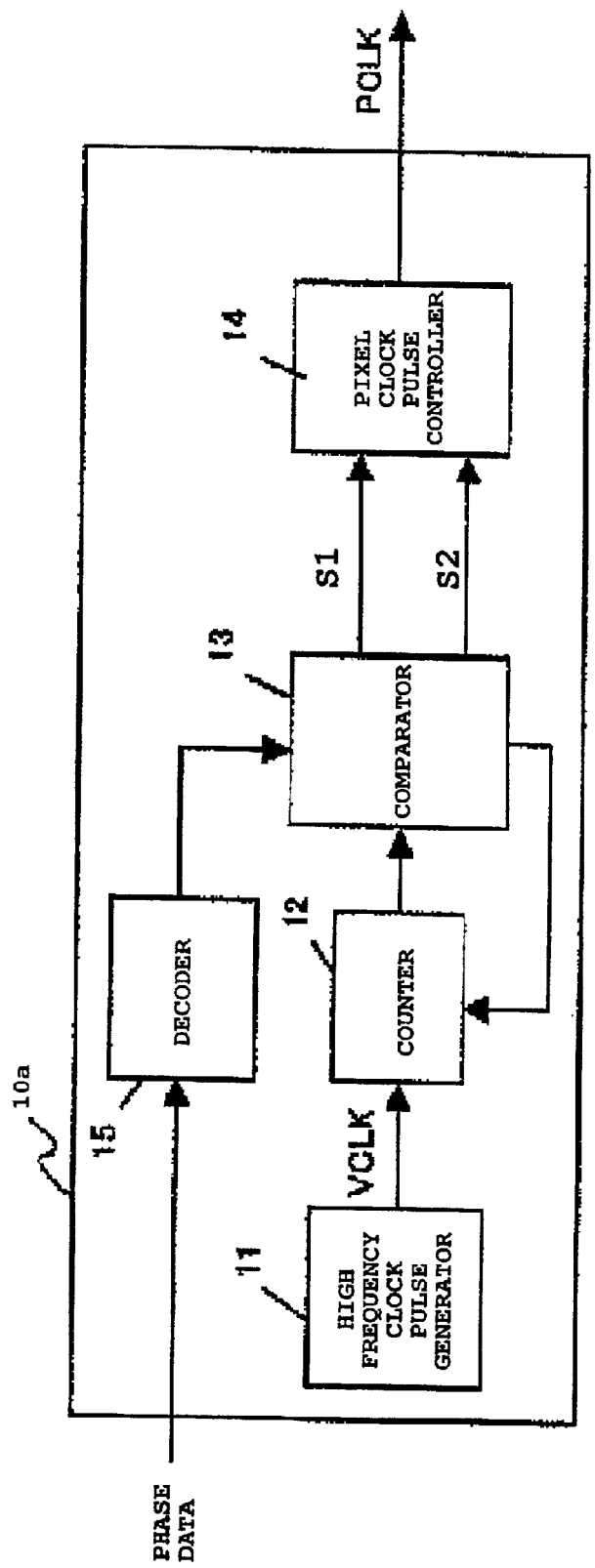
FIG. 5 is a schematic block diagram of another pixel clock pulse generator according to a preferred embodiment of the present invention.

FIG. 5 shows a pixel clock pulse generator 10a which is made on a basis of the pixel clock pulse generator 10 of FIG. 2. The pixel clock pulse generator 10a of FIG. 5 has a structure similar to that of the pixel clock pulse generator 10 of FIG. 2, except for an addition of a decoder 15. Each phase data is made into correspondence with an amount of the phase shift, as shown in FIG. 6.

The decoder 15 decodes the input phase data into a count value corresponding to the amount of the phase shift and outputs the count value to the comparator 13. With the decoder 15, the phase data unnecessarily has a bit number equal to that of the counter 12. As a consequence, it may be possible to reduce a pin number of a chip into which the pixel clock pulse generator 10a is implemented, for example.

Operations of the pixel clock pulse generator 10a is quite a similar to those of the pixel clock pulse generator 10 of FIG. 2 and therefore description for the operations thereof is omitted.

Figures 6, 7:
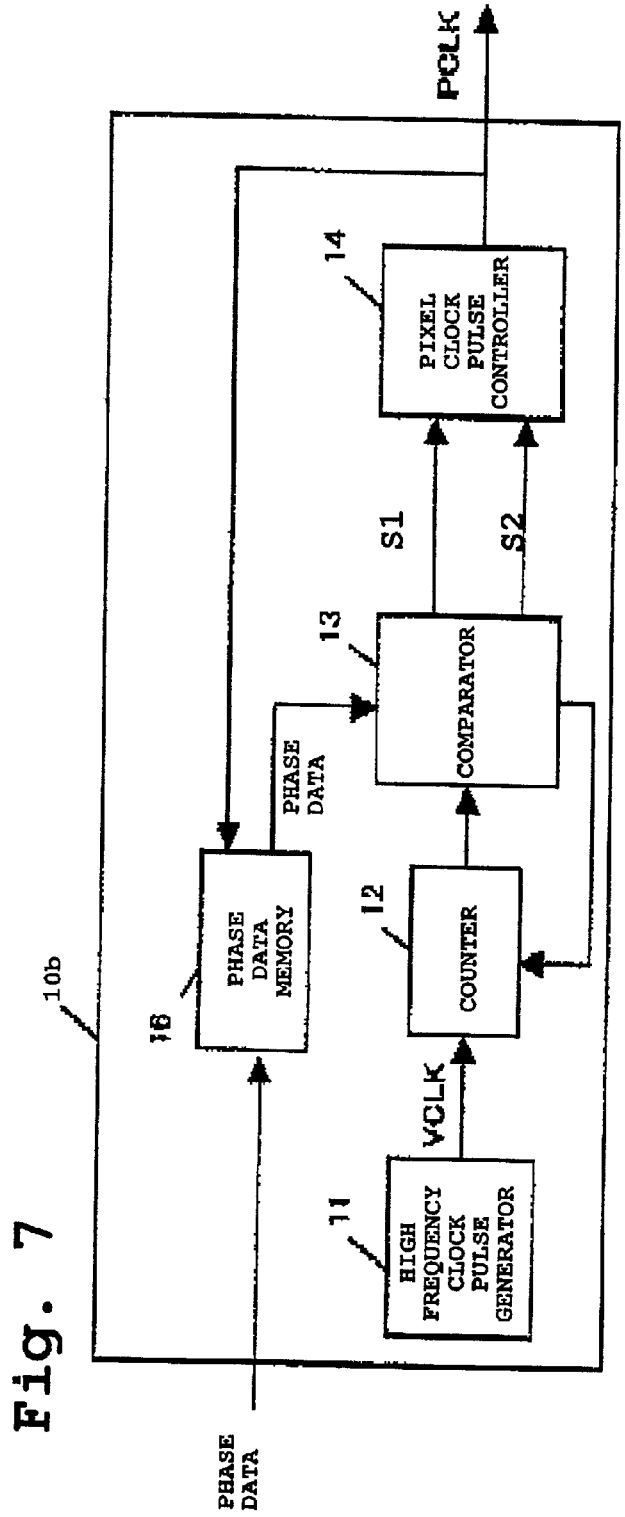
FIG. 6 is a data table indicating a relationship among external input phase data, an amount of phase shift, and an output of a decoder.
FIGS. 7–10 are schematic block diagrams of other pixel clock pulse generators according to preferred embodiments of the present invention.

FIG. 7 shows a pixel clock pulse generator 10b which is made on a basis of the pixel clock pulse generator 10 of FIG. 2. The pixel clock pulse generator 10b of FIG. 7 has a structure similar to that of the pixel clock pulse generator 10 of FIG. 2, except for an addition of a phase data memory 16. A plurality of phase data are externally prestored in the phase data memory 16 which includes an address counter (not shown). The plurality of phase data are read from the phase data memory 16 one by one in synchronism with the pixel clock pulses PCLK and are input to the comparator 13.

The phase data are the data for correcting, for example, for undesired variations in scanning caused by characteristics of the scanning lenses used and are therefore needed to be identical in each line. Using such phase data, it is preferable to prestore a line of the phase data in the phase data memory 16 and to sequentially read the phase data in accordance with the order of the addresses of the phase data memory 16 each time the line is scanned. With the transmission of the thus-read phase data to the comparator 13, it becomes unnecessary to repeat an external-input of the same line of the phase data for each line. An external controller (not shown) may consequently have a less load.

Figure 8:
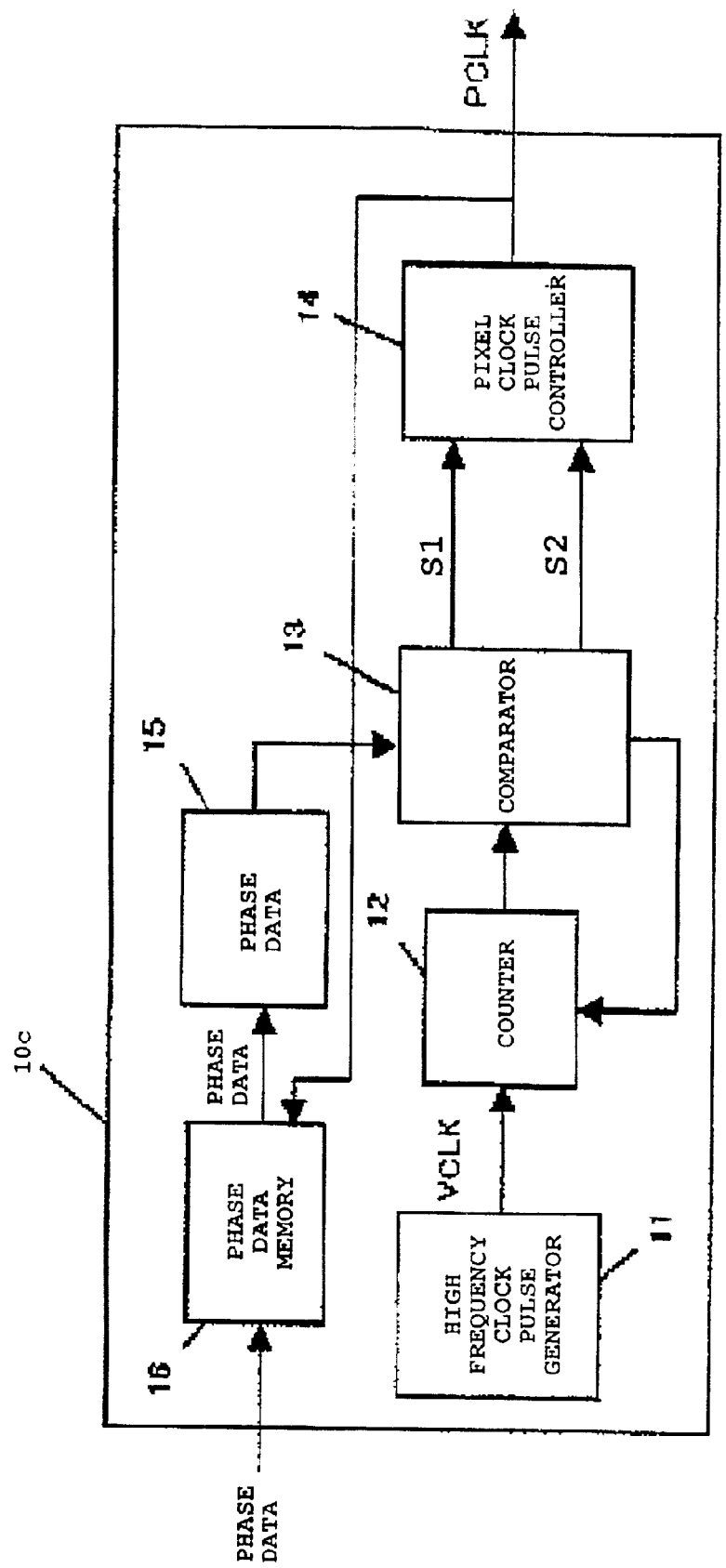

FIG. 8 shows a pixel clock pulse generator 10c which is made as a combination of the pixel clock pulse generators 10b and 10c. The pixel clock pulse generator 10c of FIG. 8 has a structure similar to that of the pixel clock pulse generator 10 of FIG. 2, except for additions of the decoder 15 and the phase data memory 16. As shown in FIG. 8, the pixel clock pulse generator 10c has the phase data memory 16 in a stage preceding to the decoder 15. The phase data memory 16 is externally preset with a plurality of phase data. In synchronism with the pixel clock pulses PCLK, the phase data are read from the phase data memory 16 one by one and are in turn input to the decoder 15. Then, the decoder 15 decodes the input phase data into a count value corresponding to the amount of the phase shift in response to the input phase data.

The phase data are the data for correcting, for example, for undesired variations in scanning caused by characteristics of the scanning lenses used and are therefore needed to be identical in each line. Using such phase data, it is preferable to prestore a line of the phase data in the phase data memory 16 and to sequentially read the phase data in accordance with the order of the addresses of the phase data memory 16 each time the line is scanned. With the transmission of the thus-read phase data to the comparator 13, it becomes unnecessary to repeat an external input of the same line of the phase data for each line. An external controller may consequently have a less load.

In addition, since the phase data and the outputs of the decoder 15 have the above-described relationship, as shown in FIG. 6, the bit number of the phase data can be made relatively small and the memory capacity required of the phase data memory 16 may be relatively small. Therefore, this structure is advantageous to the size and cost of an integrated circuit on a chip.

Figure 9:
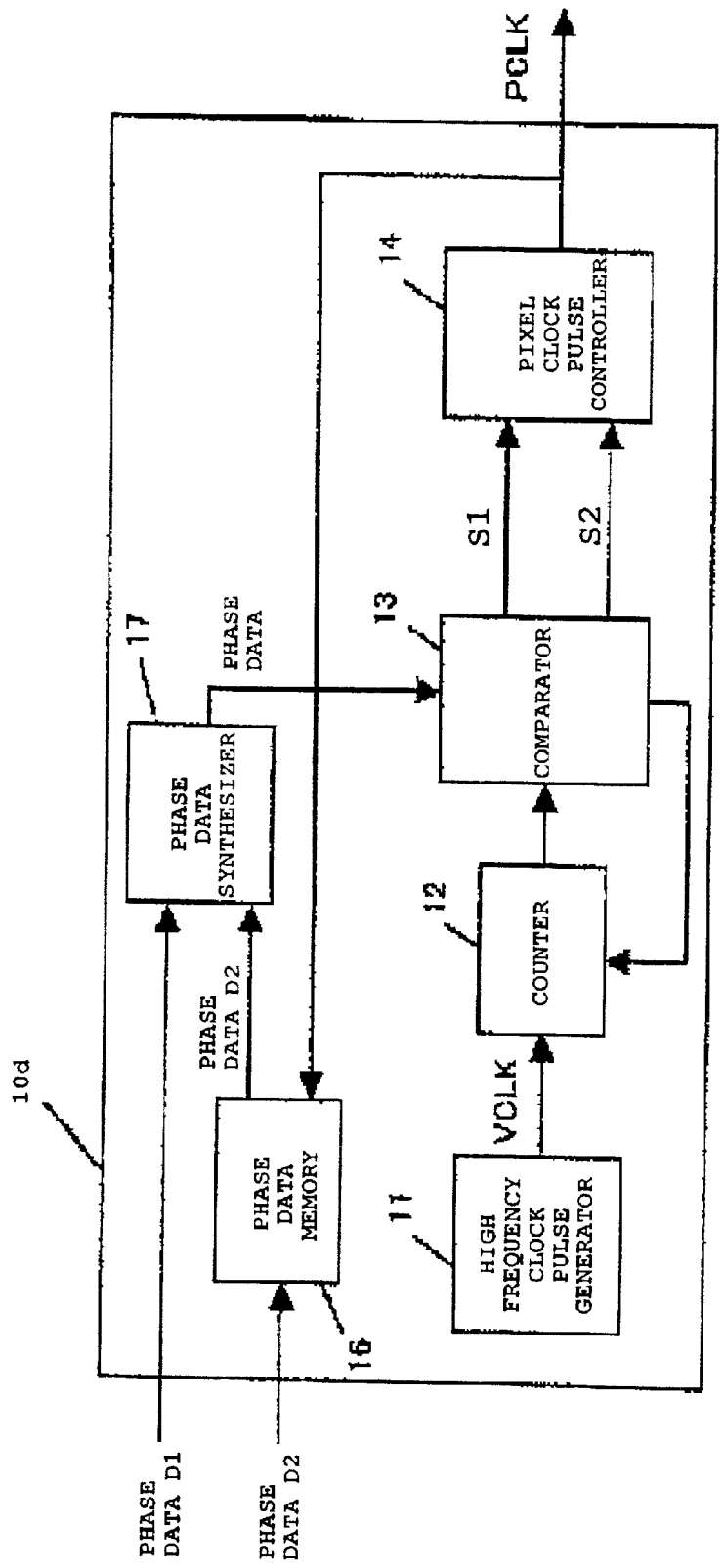

FIG. 9 shows a pixel clock pulse generator 10d which is made on a basis of the pixel clock pulse generator 10b of FIG. 7. The pixel clock pulse generator 10d of FIG. 9 has a structure similar to that of the pixel clock pulse generator 10b of FIG. 7, except for an addition of a phase data synthesizer 17. As shown in FIG. 9, the pixel clock pulse generator 10d has the phase data synthesizer 17 in a stage following the phase data memory 16. The phase data memory 16 is externally preset with a plurality of phase data D2. In synchronism with the pixel clock pulses PCLK, the phase data are read from the phase data memory 16 one by one and are in turn input to one input terminal of the phase data synthesizer 17. The other input terminal of the phase data synthesizer 17 receives an external input, i.e., phase data D1, per line. The phase data synthesizer 17 synthesizes the external input phase data D1 and the phase data D2 output from the phase data memory 16 and outputs synthesized phase data to the comparator 13. In this procedure, the phase data synthesizer 17 performs a calculation as follows;

the phase data=(phase data $D1$+phase data $D2$)−7.

With this configuration, the pixel clock pulse generator 10d can correct for undesired variations varying from line to line, such as the variations in the revolution of the polygon mirror, as well as undesired variations that are even from line to line, such as the variations in scanning caused by characteristics of the scanning lenses.

Figure 10:
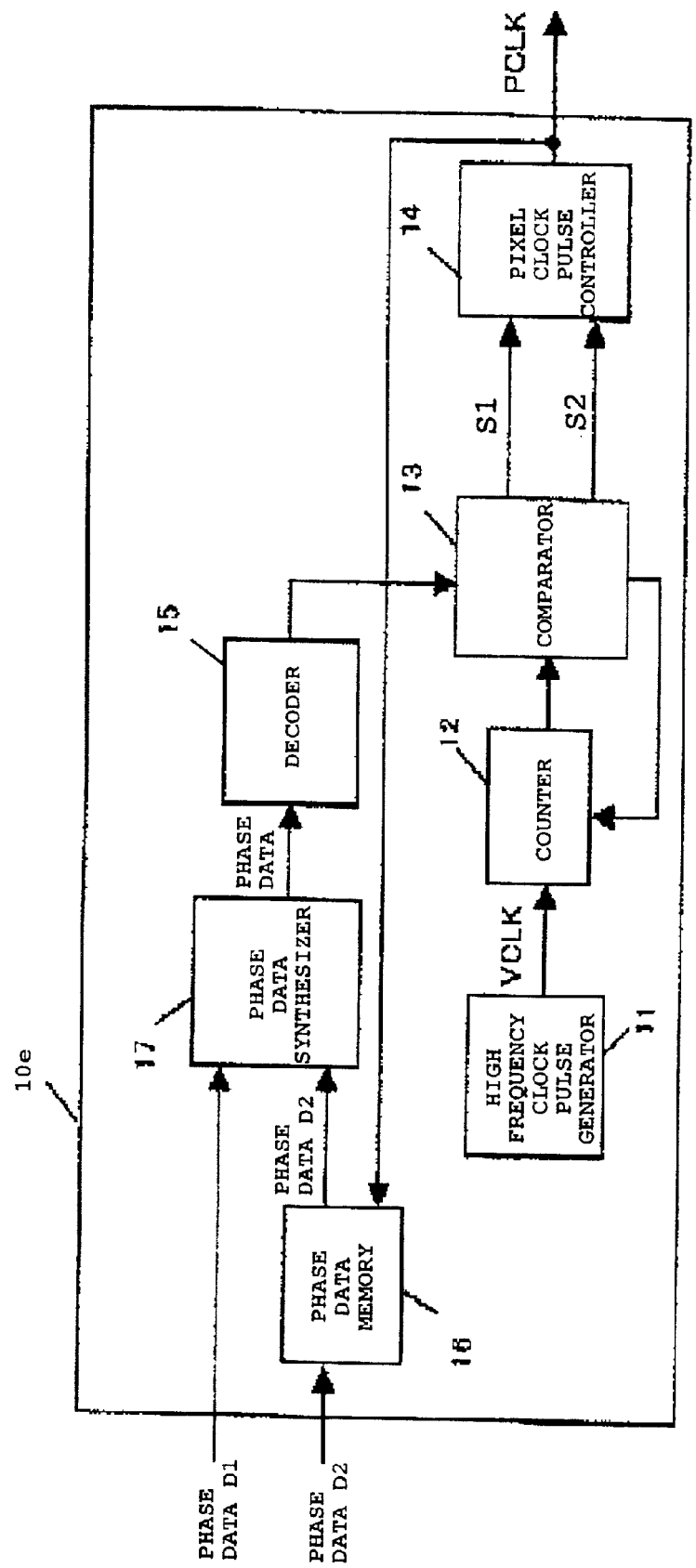

FIG. 10 shows a pixel clock pulse generator 10e which is made on a combination of the pixel clock pulse generators 10a and 10d. The pixel clock pulse generator 10e of FIG. 10 has a structure similar to that of the pixel clock pulse generator 10d of FIG. 9, except for an addition of the decoder 15. As shown in FIG. 10, the pixel clock pulse generator 10e has the decoder 15 in a stage following the phase data synthesizer 17. The phase data synthesizer 17 synthesizes the external input phase data D1 and the phase data D2 output from the phase data memory 16 and outputs synthesized phase data to the decoder 15. In this procedure, the phase data synthesizer 17 performs a calculation as follows;

the phase data=phase data D1+phase data D2.

The decoder 15 receives the synthesized phase data output from the phase data synthesizer 17 and decodes the synthesized phase data into a count value corresponding to an amount of the phase shift in response to the synthesized phase data, as shown in FIG. 6, for example.

With this configuration, the pixel clock pulse generator 10d can correct for undesired variations varying from line to line, such as the variations in the revolution of the polygon mirror, as well as variations undesired but fixed between lines, such as the variations in the scanning caused by characteristics of the scanning lenses. In addition, since the phase data and the outputs of the decoder 15 have the above-described relationship, as shown in FIG. 6, the bit number of the phase data can be made relatively small and the memory capacity required of the phase data memory 16 may be relatively small. Therefore, this structure is advantageous to the size and cost of an integrated circuit on a chip.

Figure 11:
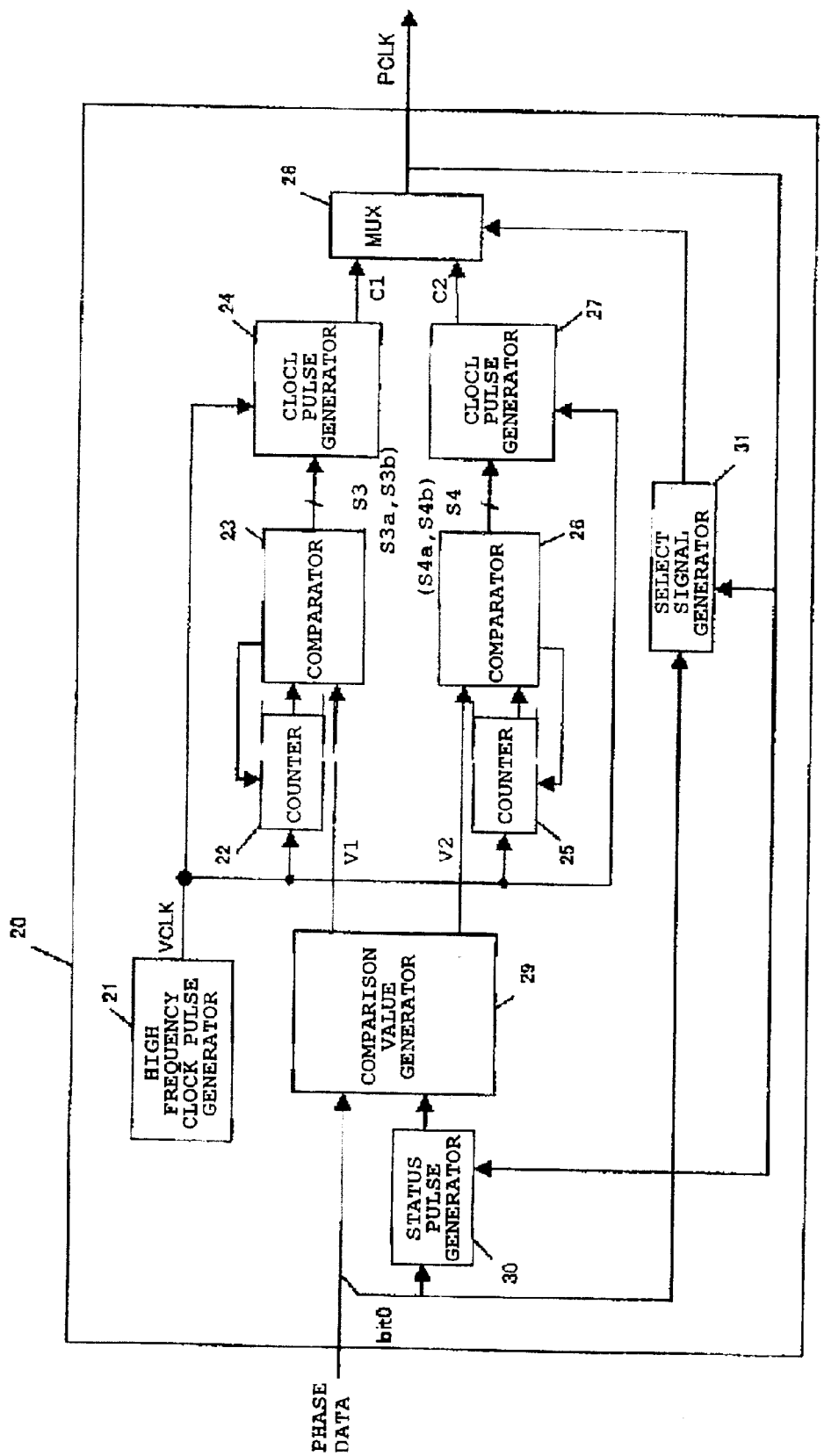
FIG. 11 is a schematic block diagram of still another pixel clock pulse generator according to a preferred embodiment of the present invention.

In the above-described pixel clock pulse generators, the counter 12 is commonly configured to detect the rising edge of each clock pulse VCLK to count the number of the clock pulses VCLK. However, it is also possible to configure the counter 12 to detect a falling edge of each clock pulse VCLK to count the number of the clock pulse VCLK. Next, a pixel clock pulse generator 20 according to another preferred embodiment of the present invention is explained with reference to FIG. 11. FIG. 11 shows the pixel clock pulse generator 20 which includes a high frequency clock pulse generator 21, counters 22 and 25, comparators 23 and 26, clock pulse generators 24 and 27, a multiplexer (MUX) 28, a comparison value generator 29, a status signal generator 30, and a select signal generator 31.

The high frequency clock pulse generator 21 generates high frequency clock pulses VCLK based on which pixel clock pulses PCLK are generated. The counter 22 detects a rising edge of the clock pulses VCLK to count the number of the clock pulses VCLK. The comparator 23 compares the value of the counter 22 with a preset value therein and a comparison value V1 output from the comparison value generator 29 and, based on the comparison result, outputs a control signal S3. The control signal S3 includes control signals S3a and S3b, which will be explained later. The clock pulse generator 24 generates a clock pulse C1 based on the control signal S3.

The counter 25 detects a falling edge of each high frequency clock pulse VCLK to count the number of the high frequency clock pulses VCLK. The comparator 26 compares the value of the counter 25 with a preset value therein and a comparison value V2 output from the comparison value generator 29 and, based on the comparison result, outputs a control signal S4. The control signal S4 includes control signals S4a and S4b. The clock pulse generator 27 a clock pulse C2 based on the control signal S4.

The multiplexer 28 selects the clock pulse C1 or C2 based on the select signal from the select signal generator 31 so as to output the pixel clock pulses PCLK.

The comparator 29 receives externally input phase data and a status signal output from the status signal generator 30 and, based on these signals, outputs the comparison values V1 and V2. The phase data is the data indicating what amount the phase of the pixel clock pulse is needed to be shifted in order to correct, for example, for undesired variations in the scanning caused by characteristics of scanning lenses, undesired displacements of dots caused by variations in the revolution of a polygon mirror, and also undesired displacements of dots caused by a chromatic aberration of laser light. The phase data in this example is a 2-bit digital value. The status signal generator 30 detects a rising edge of each pixel clock pulse PCLK when the bit 0 of the externally input phase data is 1 and toggles its output signal high and low as a status signal. The select signal generator 31 detects a falling edge of each pixel clock pulse PCLK when the bit 0 of the externally input phase data is 1 and toggles its output signal high and low as a select signal.

Figure 12:
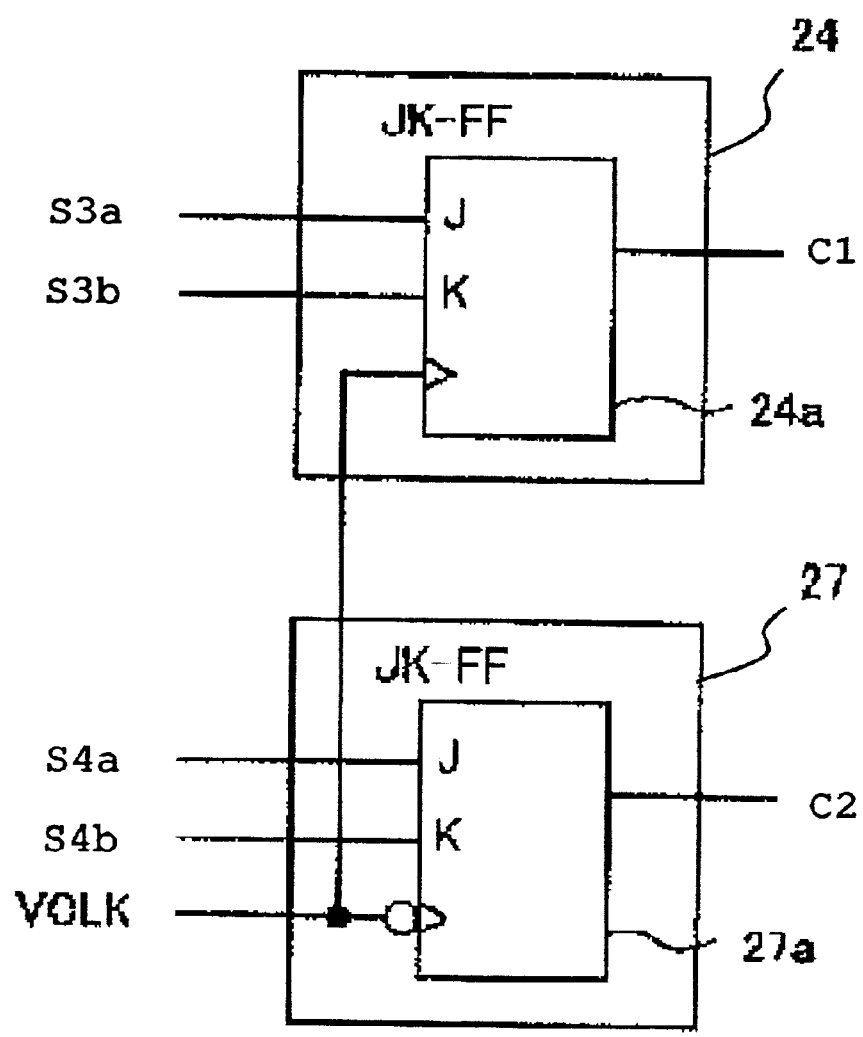
FIGS. 12 and 13 are schematic illustrations for explaining exemplary structures of clock pulse generator used in the pixel clock pulse generator of FIG. 11.
Figure 13:
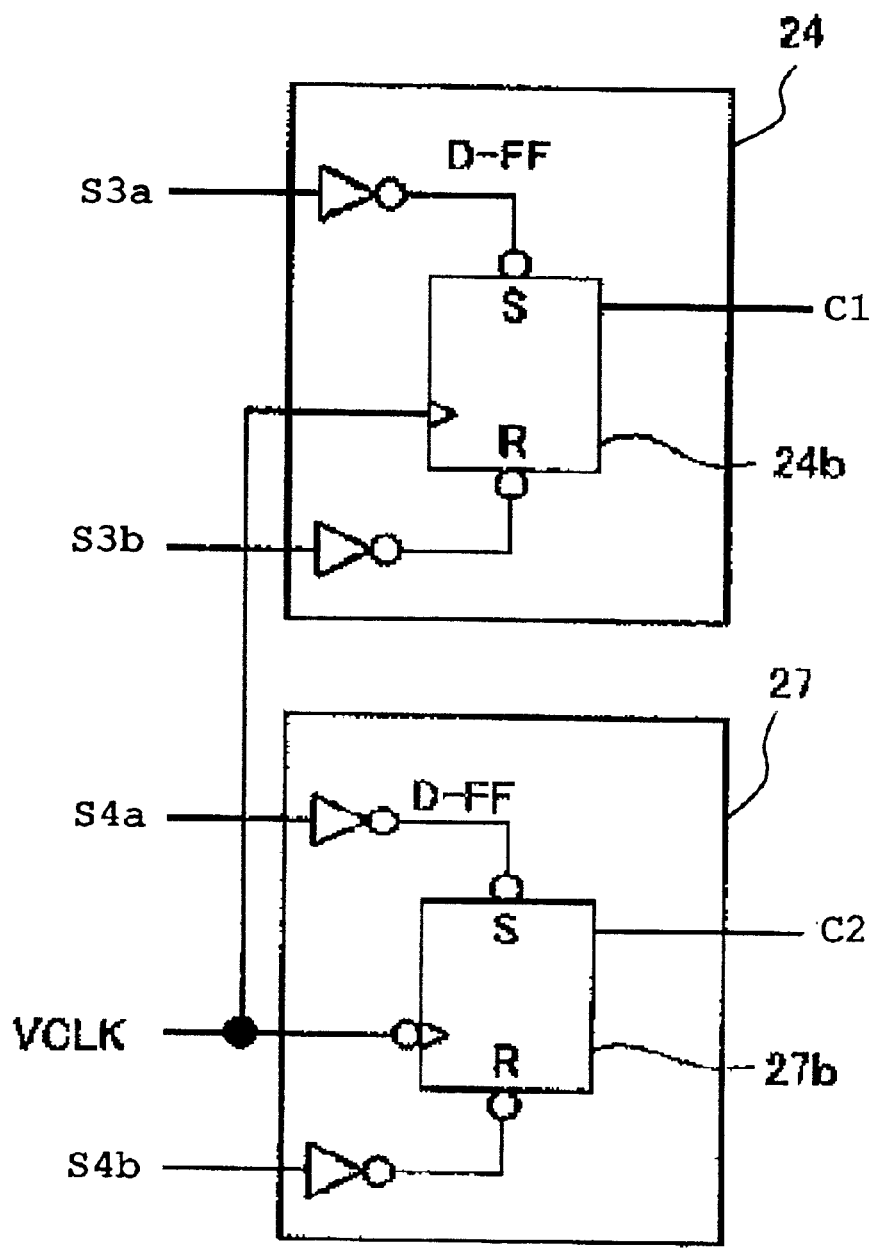

One exemplary circuit of the clock pulse generators 24 and 27 uses a JK type flip-flop circuit (often referred to as a JK-FF), as shown in FIG. 12. In FIG. 12, the clock pulse generator 24 includes a JK-FF 24a which is activated when detecting a rising edge of each clock pulse VCLK and the clock pulse generator 27 includes a JK-FF 27a which is activated when detecting a falling edge of each clock pulse VCLK. Another exemplary circuit of the clock pulse generators 24 and 27 uses a D type flip-flop circuit (often referred to as a D-FF) having set and reset terminals, as shown in FIG. 13. In FIG. 13, the clock pulse generator 24 includes a D-FF 24a which is activated when detecting a rising edge of each clock pulse VCLK and the clock pulse generator 27 includes a D-FF 27a which is activated when detecting a falling edge of each clock pulse VCLK.

Referring to FIGS. 14–17, operations of the pixel clock pulse generator 20 are explained. In this discussion, the pixel clock pulse generator 20 is configured to generate the pixel clock pulses PCLK of which frequency is one-fourth the frequency of the high frequency clock pulses VCLK, having a clock cycle at a basic 50% duty ratio. The clock cycle at the basic 50% duty ratio can be shifted by a time length of a plus one-eighth or a minus one-eighth of the PCLK clock cycle. The relationship between the amount of the phase shift and the externally input phase data is shown in a data table of FIG. 14 and the relationship between the inputs and outputs of the comparison value generator 29 is shown in a data table of FIG. 15.

Figure 16:
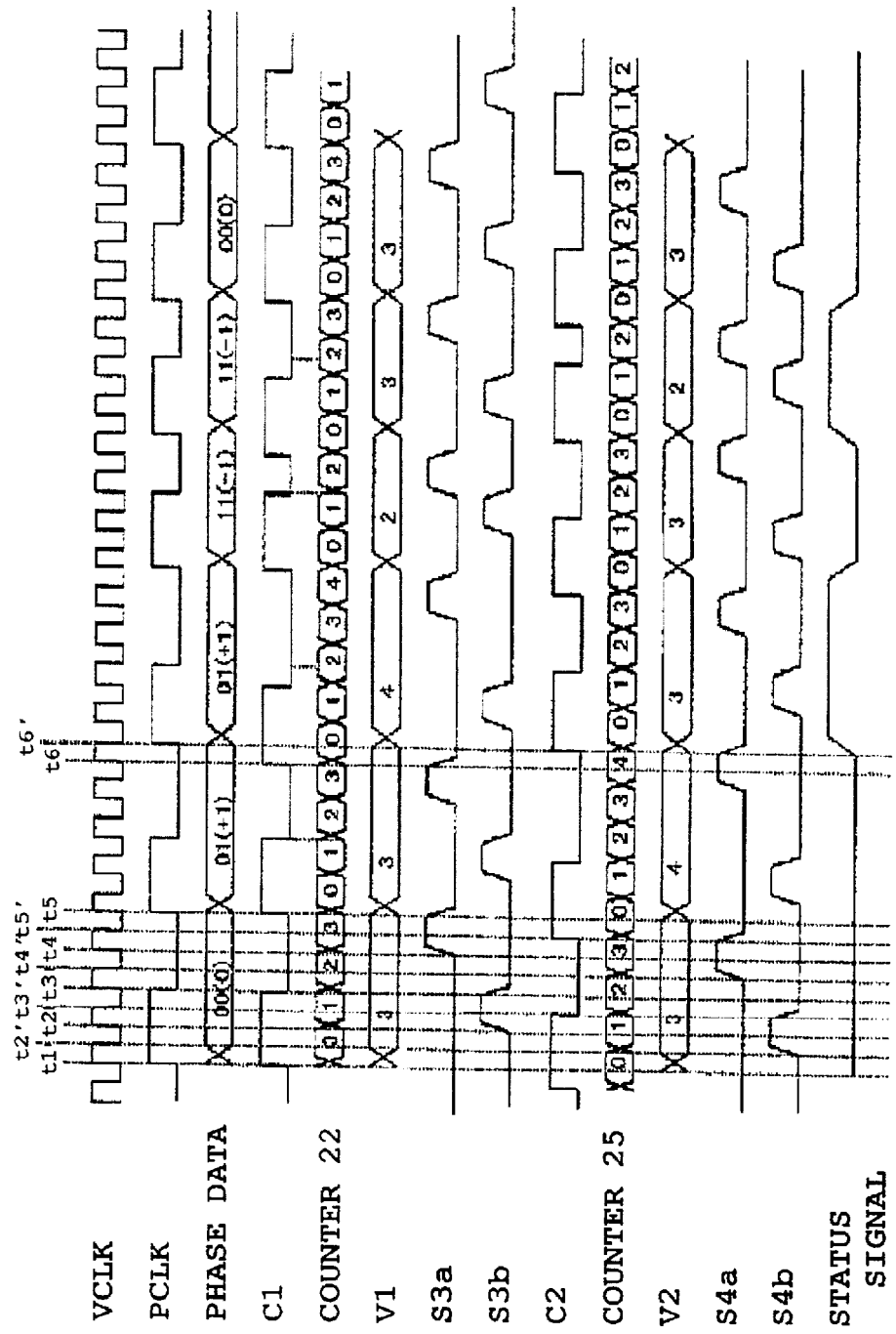
FIGS. 16 and 17 are time charts for explaining the operations of the pixel clock pulse generator of FIG. 11.

As shown in FIG. 16, the external input phase data 00 indicating that the amount of the phase shift is 0 is initially given in synchronism with the pixel clock pulse PCLK at a time t1. The comparison value generator 29 generates comparison values V1 and V2 at a time t1 on a basis of the phase data 00 and the status signal which is initially given as 0. As shown in the data table of FIG. 15, the comparison values V1 and V2 are both 3. A way how the comparison value generator 29 generates the comparison values V1 and V2 will be explained in detail later.

The comparison value V1 is compared with the count value output from the counter 22 by the comparator 23, and the comparison value V2 is compared with the count value output from the counter 25 by the comparator 26. The counter 22 counts the number of VCLK at the rising edge thereof. In the comparison, the comparator 23 uses a fixed value 1, for example, to compare it with the count value output from the counter 22 and, when a match occurs, outputs the control signal S3b at a time t2. The comparator 23 also compares the comparison value V1, i.e., a value 3 with the count value output from the counter 22 and, when a match occurs, outputs the control signal S3a at a time t4. At this time, the comparator 23 resets the counter 22 so that the counter 22 restarts the counting from 0. The clock pulse generator 24 changes the clock pulse C1 from its high state to its low state in synchronism with the rising edge of the clock signal VCLK at a time t3 when the control signal S3b from the comparator 23 stays high, and changes the clock pulse C1 from its low state to its high state in synchronism with the rising edge of the clock signal VCLK at a time t5 when the control signal S3a from the comparator 23 stays high.

The counter 25 is configured to count a falling edge of each VCLK. The comparator 26 uses a fixed value 1, for example, to compare it with the count value output from the counter 25 and, when a match occurs, outputs the control signal S4b at a time t2'. The comparator 26 also compares the comparison value V2, i.e., a value 3 with the count value output from the counter 25 and, when a match occurs, outputs the control signal S4a at a time t4'. At this time, the comparator 26 resets the counter 25 so that the counter 25 restarts the counting from 0. The clock pulse generator 27 changes the clock pulse C2 from its high state to its low state in synchronism with the falling edge of the clock signal VCLK at a time t3' when the control signal S4b from the comparator 26 stays high, and changes the clock pulse C2 from its low state to its high state in synchronism with the falling edge of the clock signal VCLK at a time t5' when the control signal S4a from the comparator 26 stays high.

Then, the external input phase data is changed to 01 indicating that the amount of the phase shift is a one-eighth of the pixel clock pulse PCLK at a time t5. The comparison values V1 and V2 output from the comparison value generator 29 are changed to 3 and 4, respectively, according to the data table of FIG. 15, since the status signal stays 0. The comparison value V1 is compared with the count value output from the counter 22 by the comparator 23 and the comparison value V2 is compared with the count value output from the counter 25 by the comparator 26, in manners similar to those as described above. After that, the comparator 23 outputs the control signal S3 including control signals S3a and S3b which changes the high/low status of the clock pulse C1 at a time t6 and the comparator 26 outputs the control signal S4 including control signals S4a and S4b which changes the high/low status of the clock pulse C2 at a time t6', in manners similar to those as described above.

As shown in FIG. 12, the clock pulse generators 24 and 27 may be configured with the JK-type flip-flop circuits, i.e., the JK-FFs 24a and 27a, respectively. In this case, the JK-FF 24a of the clock pulse generator 24 is configured to receive the control signals S3a and S3b with the J and K input terminals, respectively, and to operate by the rising edge of each VCLK. Likewise, the JK-FF 27a of the clock pulse generator 27 is configured to receive the control signals S4a and S4b with the J and K input terminals, respectively, and operates by the falling edge of each VCLK. With this configuration, the clock pulse generators 24 and 27 can cause the clock pulses C1 and C2, respectively, to transition between their high and low states.

These clock pulse generators 24 and 27 may alternatively be configured with the D-type flip-flop circuits, i.e., the D-FFs 24b and 27b, respectively, as shown in FIG. 13. In this case, the D-FF 24b of the clock pulse generator 24 is configured to receive the inversed control signals S4a and S4b with the set and reset input terminals, respectively, and to operate by the rising edge of each VCLK. Likewise, the D-FF 27a of the clock pulse generator 27 is configured to receive the inversed control signals S4a and S4b with the set and reset input terminals, respectively, and operates by the falling edge of each VCLK. With this configuration, the clock pulse generators 24 and 27 can cause the clock pulses C1 and C2, respectively, to transition between their high and low states.

That is, the clock pulses C1 and C2 are generated with the transitions of the clock pulses C1 and C2 between their high and low states conducted in accordance with the outputs from the comparison value generator 29. The thus-generated clock pulses C1 and C2 are in turn switched by the multiplexer 28 and consequently the pixel clock pulses PCLK are generated. Here, the multiplexer 28 selects the clock pulse C1 when the select signal from the select signal generator 31 is 0, and selects the clock pulse C2 when the select signal from the select signal generator 31 is 1.

Figure 17:
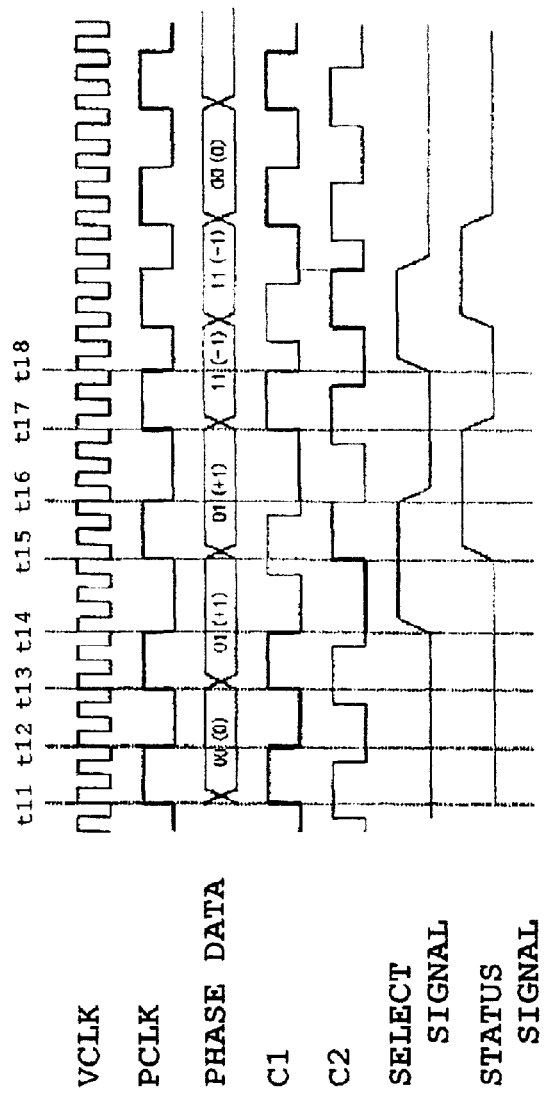

Referring-to FIG. 17, the switching operations with respect to the phase data (i.e., the amount of the phase shift) and the clock pulses C1 and C2 are explained. As shown in FIG. 7, the time chart starts at a time t11 at which the pixel clock pulse PCLK is output under the exemplary conditions that the select signal output from the select signal generator 31 is 0 and the multiplexer 28 selects the clock pulse C1. Subsequently, at a time t12, the select signal generator 31 outputs the select signal under the condition that the external input phase data is 00, that is, the phase shift is 0. At this time, the bit 0 of the external input phase data is 0 and therefore the select signal is not toggled and remains 0, so that the clock pulse C1 is output as the pixel clock pulse PCLK. In this case, the pixel clock pulse PCLK has the phase shift of 0, as indicated in the data table of FIG. 14.

Then, at a time t13, the external input phase data is changed to 01, for example. As the data bit 0 of the phase data is changed to 1, the select signal is toggled from 0 to 1 at a time t14 by the select signal generator 31. As a result, the clock pulse C2 is output as the pixel clock pulse PCLK which has the phase shift of +1/8PCLK, as indicated in the data table of FIG. 14. Then, at a time t15, the external input phase data remains unchanged as 01, for example. As the data bit 0 of the phase data also remains unchanged as 1, the select signal is toggled from 1 to 0 at a time t16 by the select signal generator 31. As a result, the clock pulse C1 is output as the pixel clock pulse PCLK which has the phase shift of +1/8PCLK, as in the data table of FIG. 14. Then, at a time t15, the external input phase data is changed to 11, for example. As the data bit 0 of the phase data remains unchanged as 1, the select signal is toggled from 0 to 1 at a time t18 by the select signal generator 31. As a result, the clock pulse C2 is output as the pixel clock pulse PCLK which has the phase shift of −1/8PCLK, as indicated in the data table of FIG. 14.

In this way, the clock pulses C1 and C2 are generated in accordance with the phase data and are switched so that the pixel clock-pulses PCLK are output with the phase shift in steps of +1/8PCLK and −1/8PCLK, i.e., in half pitch steps of the high frequency clock pulse VCLK.

Next, operations of the comparator 29 of the pixel clock pulse generator 20 is explained. In this example, the external input phase data includes four bits b0–b3, for example. The most significant bit b3 indicates the polarity of the phase shift and the rest (i.e., the bits b0–b2) represents an absolute amount of the phase shift, for example. The status signal 1 or 0 respectively indicates whether the pixel clock pulse PCLK rises at the rising or falling edge of the high frequency clock pulse VCLK. In addition, the comparison values V1 and V2 are set to the same value X, for example, when the amount of the phase shift is 0.

At this time, the comparison values V1 and V2 are output in the following manners. Firstly, when the bit b0 of the phase data is 0, regardless of the status signal, the comparison values V1 and V2 have the same value and are expressed as follows;

$$V1, V2 = X + P/2,$$

wherein P represents the phase shift amount including the polarity thereof.

Secondly, when the bit b0 of the phase data is 1 and when the status signal is 0, the comparison values V1 and V2 are expressed as follows;

$$V1 = X + ((P/2)-1)/2,$$

$$V2 = X + ((P/2)+1)/2,$$

wherein P represents the phase shift amount including the polarity thereof, and when the bit b0 of the phase data is 1 and when the status signal is 1, the comparison values V1 and V2 are expressed as follows;

$V1 = X + ((P/2)+1)/2,$ $V2 = X + ((P/2)-1)/2,$ wherein P represents the phase shift amount including the polarity thereof.

The example of FIG. 14 is made up with 2-bit phase data, for the sake of simplicity, which has the bit b1 indicating the polarity (i.e., a plus or a minus) of the phase shift and the bit b0 indicating the absolute amount of the phase shift (i.e., 1/8PCLK). As an exception, the phase data 00 indicates by itself that the amount of the phase shift is 0. This can be the same in the case a bit number greater than 2 is applied to the phase data. For example, when the phase data is composed of 4 bits, such as b0–b3, the phase data 0000 indicates by itself that the amount of the phase shift is 0.

In FIG. 11, if the inversed clock pulses VCLK are input to the counter 23 and the clock pulse generator 27, it becomes possible to replace these counter 23 and clock pulse generator 27 with the counter 22 and the clock pulse generator 24. Consequently, the cost of the circuits may be reduced.

In this way, according to the present preferred embodiment, it becomes possible to control the pixel clock pulses in finer steps of the high frequency clock pulses VCLK without the needs of an extremely high frequency basic clock pulse. For example, with the above configuration, the pixel clock pulse generator 20 can generate the pixel clock pulses PCLK with the phase shift in half pitch steps of the high frequency clock pulses VCLK.

Figure 18:
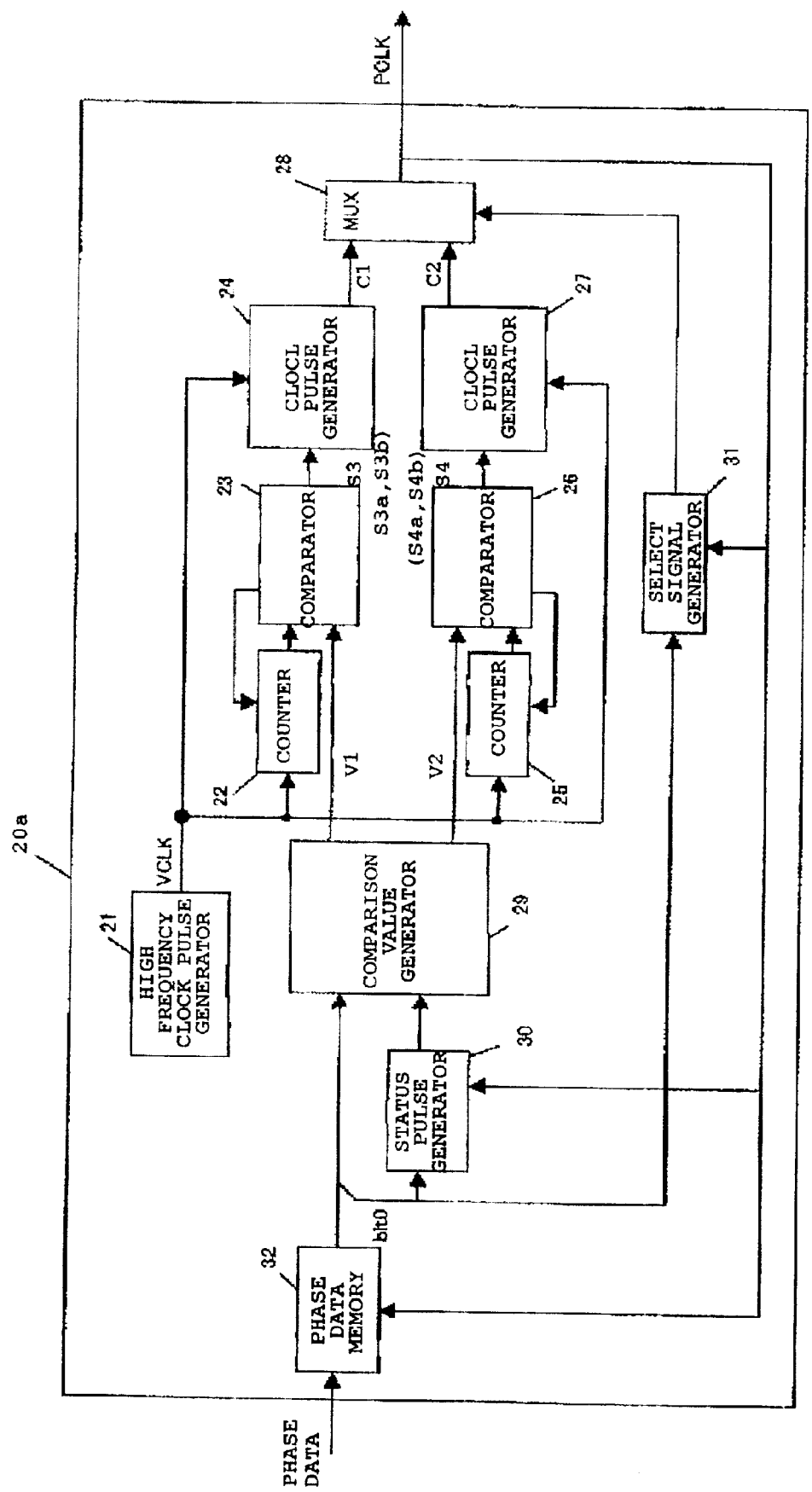
FIGS. 18 and 19 are schematic block diagrams of other pixel clock pulse generators according to preferred embodiments of the present invention.

FIG. 18 shows a pixel clock pulse generator 20a which is made on a basis of the pixel clock pulse generator 20 of FIG. 11. The pixel clock pulse generator 20a of FIG. 18 has a structure similar to that of the pixel clock pulse generator 20 of FIG. 11, except for an addition of a phase data memory 32. Each phase data is made into correspondence with an amount of the phase shift, as shown in FIG. 6. The phase data memory 32 is similar to the phase data memory 16 of FIG. 7 and prestore a plurality of phase data externally input therein. From the phase data memory 32, the plurality of phase data can be read one by one in synchronism with the pixel clock pulses PCLK and are input to the comparator 29, the status signal generator 30, and the select signal generator 31.

When the phase data are the data for correcting, for example, for undesired variations in the scanning caused by characteristics of scanning lenses and are therefore needed to be identical in each line, in using such phase data, it is preferable to prestore a line of the phase data in the phase data memory 32 and to sequentially read the phase data in accordance with the order of the addresses of the phase data memory 32 each time the line is scanned. With the transmission of the thus-read phase data to the comparator 29, the status signal generator 30 and the select signal generator 31, it becomes unnecessary to repeat an external input of the same line of the phase data for each line. As a result, external circuits (not shown) may have a less load.

Figure 19:
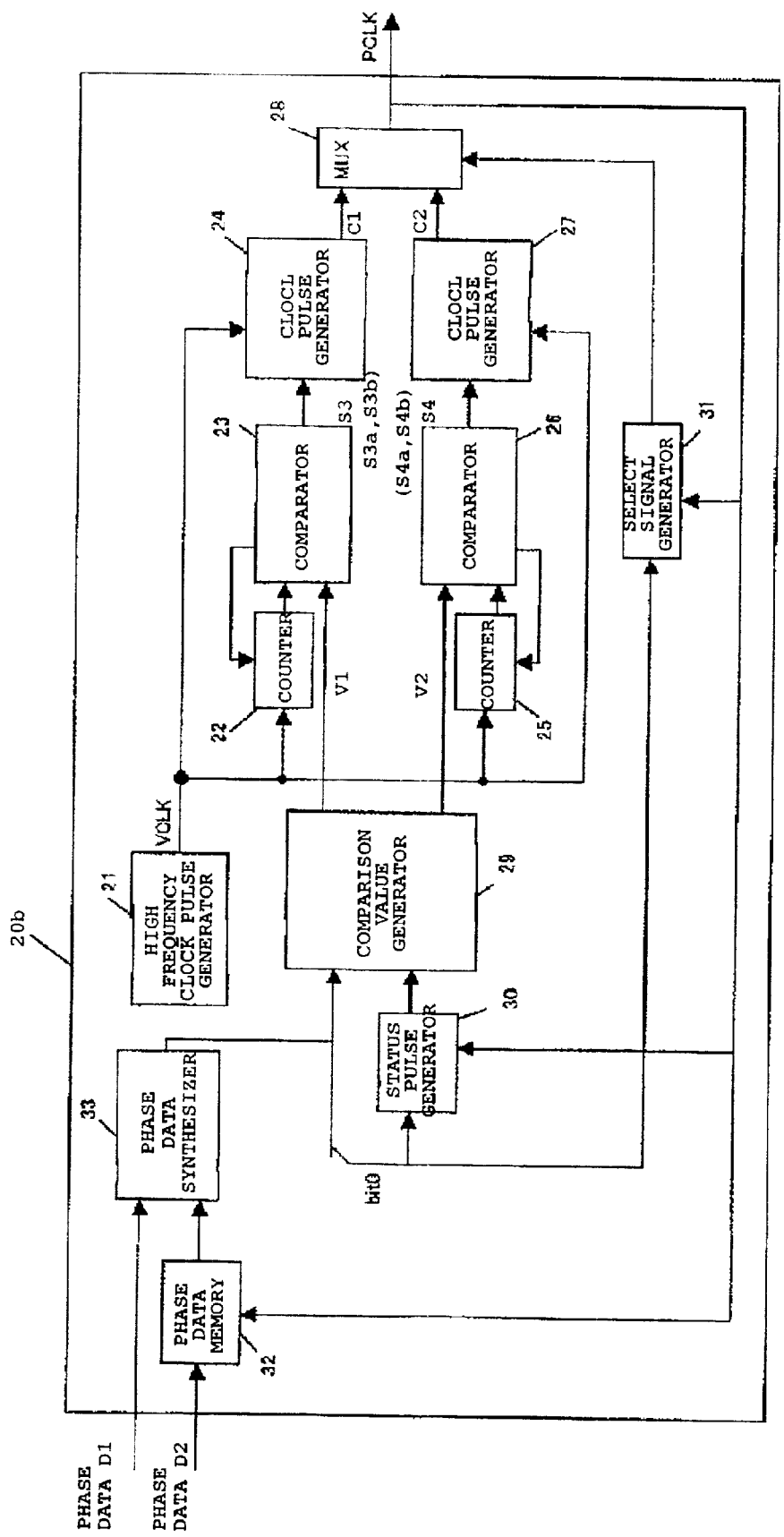

FIG. 19 shows a pixel clock pulse generator 20b which is made on a basis of the pixel clock pulse generator 20a of FIG. 18. The pixel clock pulse generator 20b of FIG. 19 has a structure similar to that of the pixel clock pulse generator 20a of FIG. 18, except for an addition of a phase data synthesizer 33. As shown in FIG. 19, the pixel clock pulse generator 20b has the phase data synthesizer 33 in a stage following the phase data memory 32. The phase data memory 32 is externally preset with a plurality of phase data D2. In synchronism with the pixel clock pulses PCLK, the phase data are read from the phase data memory 32 one by one and are in turn input to one input terminal of the phase data synthesizer 33. The other input terminal of the phase data synthesizer 33 receives an external input, i.e., phase data D1, per line. The phase data synthesizer 33 synthesizes the external input phase data D1 and the phase data D2 output from the phase data memory 32 and outputs synthesized phase data to the comparator 29, the status signal generator 30, and the select signal generator 31. In this procedure, the phase data synthesizer 33 performs a calculation as follows;

the phase data=(phase data $D1$+phase data $D2$)−7.

With this configuration, the pixel clock pulse generator 20b can correct for undesired variations varying from line to line, such as the variations in the revolution of the polygon mirror, as well as variations undesired but fixed between lines, such as the variations in the scanning caused by characteristics of the scanning lenses.

Figure 20:
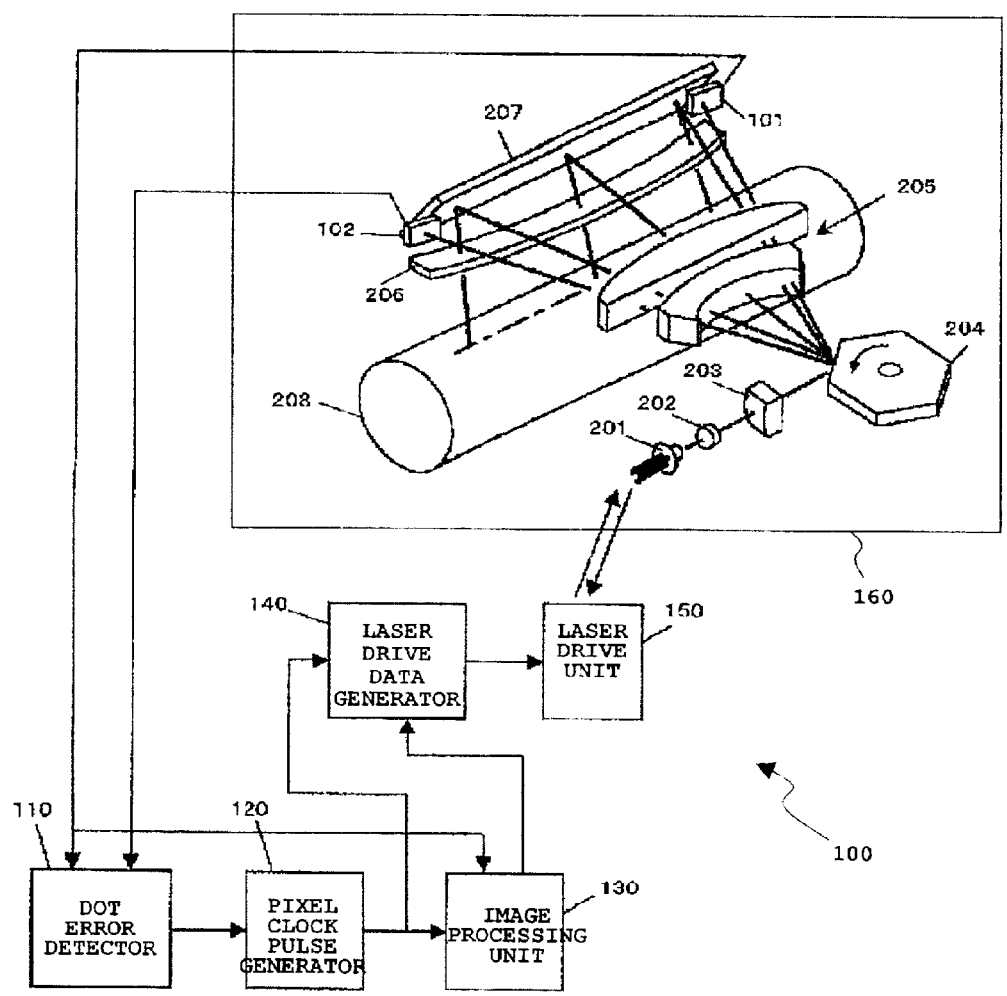
FIG. 20 is a schematic block diagram of an image forming apparatus using a multiple laser beam scanning apparatus according to a preferred embodiment of the present invention.

Next, an image forming apparatus 100 according to a preferred embodiment of the present invention is explained with reference to FIG. 20. FIG. 20 shows the image forming apparatus 100 which includes the pixel clock pulse generators 20b of FIG. 19. As an alternative, one of the pixel clock pulse generators 10, 10a–10e, 20, and 20a may also be used in place of the pixel clock pulse generator 20b. The image forming apparatus 100 further includes a dot error detector 110, an image processing unit 130, a laser drive data generator 140, a laser drive unit 150, and a light scanning mechanism 160. The light scanning mechanism 160 includes a laser diode 201, a collimate lens 202, a cylinder lens 203, a polygon mirror 204, an fè (ef-theta) lens 205, a toroidal lens 206, a mirror 207, a photosensitive member 208, and sensors 101 and 102.

In the light scanning mechanism 160 of the image forming apparatus 100, a laser beam emitted from the laser diode 201 passes through the collimate lens 202 and the cylinder lens 203 and is then brought to act as a cyclic scanning laser beam covering a predetermined wide area by the polygon mirror 204. Then, the cyclic scanning laser beam passes the fè lens 205 and the toroidal lens 206, and is then reflected by the mirror 207 to fall on the surface of the photosensitive member 208. Thereby, the cyclic scanning laser beam scans the surface of the photosensitive member 208 to generate an electrostatic latent image thereon. The sensors 101 and 102 are arranged to detect the cyclic scanning laser beam passing through start and end edges, respectively, of the predetermined wide area and to generate respective detection signals which are input to the dot error detector 110. The dot error detector 110 calculates a time period that the laser light beam scans an area between the sensors 101 and 102 to seek an amount of deviation from the predetermined wide area with reference to, for example, a reference time period. Based on the amount of deviation sought, the dot error detector 110 generates phase data for correcting the deviation from the predetermined wide area and sends the phase data to the pixel clock pulse generator 20b. The output signal of the sensor 101 is also sent to the image processing unit 130 which uses it as a line synchronous signal.

If the pixel clock pulse generator 20b does not include a phase data memory, the dot error detector 110 is needed to send the phase data line by line to the pixel clock pulse generator 20b. However, the pixel clock pulse generator 20b has the phase data memory 32, the dot error detector 110 can previously perform the calculation of the phase data and provide beforehand the pixel clock pulse generator 20b with the phase data sought.

In addition to the generation of the phase data (i.e., the phase data D1) for correcting the undesired variations that are even from lint to line, such as the variations in scanning caused by characteristics of the scanning lenses used, the dot error detector 110 also generates the phase data (i.e., the phase data D2) for correcting the undesired variations that change from line to line caused by the variations in the revolution of the polygon mirror, for example. Upon generating such phase data D2, the dot error detector 110 sends them to the pixel clock pulse generator 20b since it has the phase data synthesizer 33. In a case of a multiple beam scanning apparatus (later explained), plural lines of the phase data can simultaneously be generated with plural sets of the sensors 101 and 102.

After receiving the phase data from the dot error detector 110, the pixel clock pulse generator 20b generates the pixel clock pulses PCLK based on the received phase data in the manner as set forth. Then, the pixel clock pulse generator 20b sends the pixel clock pulses PCLK to the image processing unit 130 and the laser drive data generator 140. The image processing unit 130 generates image data with reference to the pixel clock pulses PCLK and sends the image data to the laser drive data generator 140. Upon receiving the image data, the laser drive data generator 140 generates laser drive data, i.e., laser modulation data, with reference to the pixel clock pulses PCLK to drive the laser diode 201 through the laser drive unit 150. Thereby, the image forming apparatus can form an electrostatic latent image without causing an undesired displacement.

Figure 21:
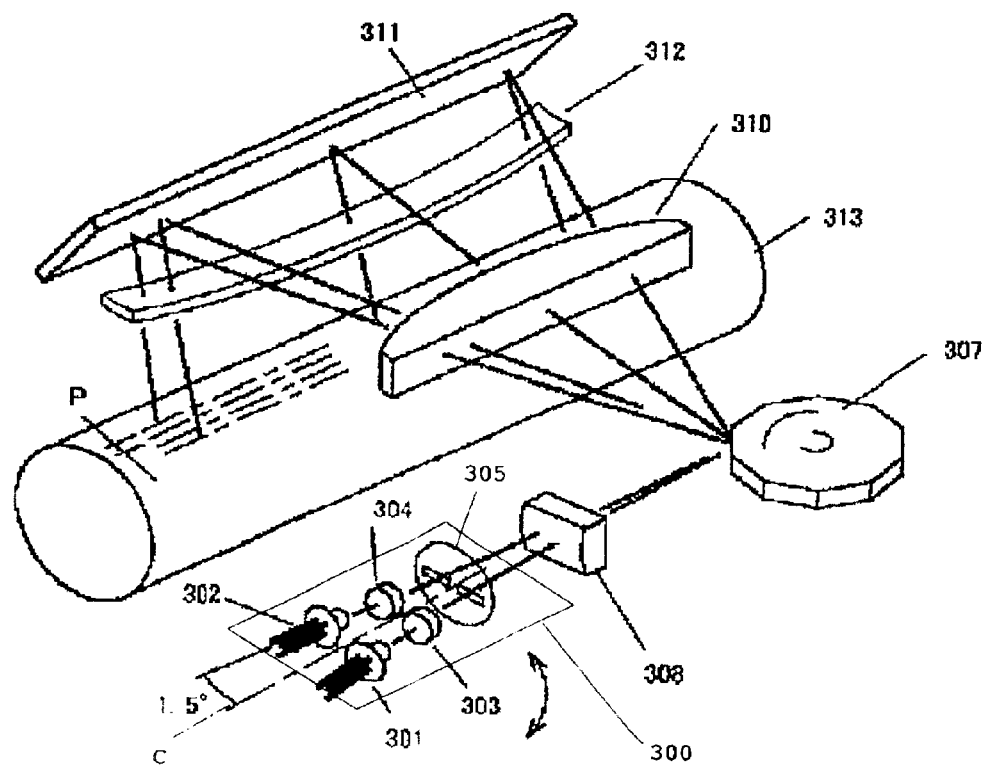
FIGS. 21 and 22 are illustrations for explaining a structure and an operation of the multiple laser beam scanning apparatus of FIG. 20.
Figure 22:
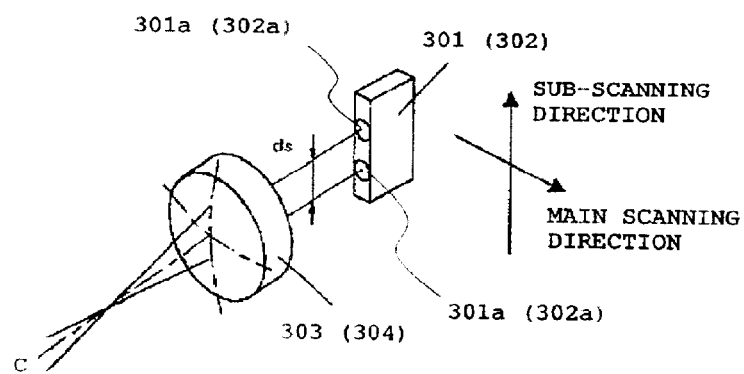

Referring now to FIGS. 21 and 22, a multiple laser beam scanning apparatus 200 according to a preferred embodiment of the present invention is explained. As shown in FIG. 21, the multiple laser beam scanning apparatus 200 is provided with a laser light source unit 300 that includes semiconductor laser arrays 301 and 302, collimate lenses 303 and 304, and an aperture 305. The aperture 305 is fixed to an optical housing (not shown) of the laser light source unit 300, and has two slits for the laser beams from the laser arrays 301 and 302 to regulate the size of the laser beams. As shown in FIG. 22, the two semiconductor laser arrays 301 and 302 include twin monolithic laser diodes 301a and 302a, respectively, and are coupled with collimate lenses 303 and 304, respectively. The twin laser diodes 301a and 302a are arranged at positions with a distance ds of 25 im therebetween and symmetric in a sub-scanning direction with respect to a light shaft C of the collimate lenses 303 or 304.

In FIG. 21, the two semiconductor laser arrays 301 and 302 are arranged at such positions as to have common light shafts with collimate lenses 303 and 304, respectively, and to have light emission angles symmetric relative to the light shaft C in the main scanning direction. Each of the emission angles is 1.5 degrees, for example, as shown in FIG. 21. Thereby, the twin laser beams from the respective laser arrays 301 cross each other at a reflection point on the surface of a polygon mirror 307. The twin laser beams emitted from each of the laser arrays 301 pass through a cylinder lens 308 and are simultaneously reflected by the polygon mirror 307. Then, through an fè (ef-theta) lens 310, a mirror 311, and a toroidal lens 312, the laser beams scans the surface of a photosensitive member 313. Thereby, an electrostatic latent image can be formed on the surface of the photosensitive member 313. A line of print data for each laser beam are stored in a buffer memory of the image processing unit 130 and are read out from the buffer memory each time the reflection mirror of the polygon mirror 307 is changed. Therefore, four lines of print data can simultaneously be recorded.

Figure 23:
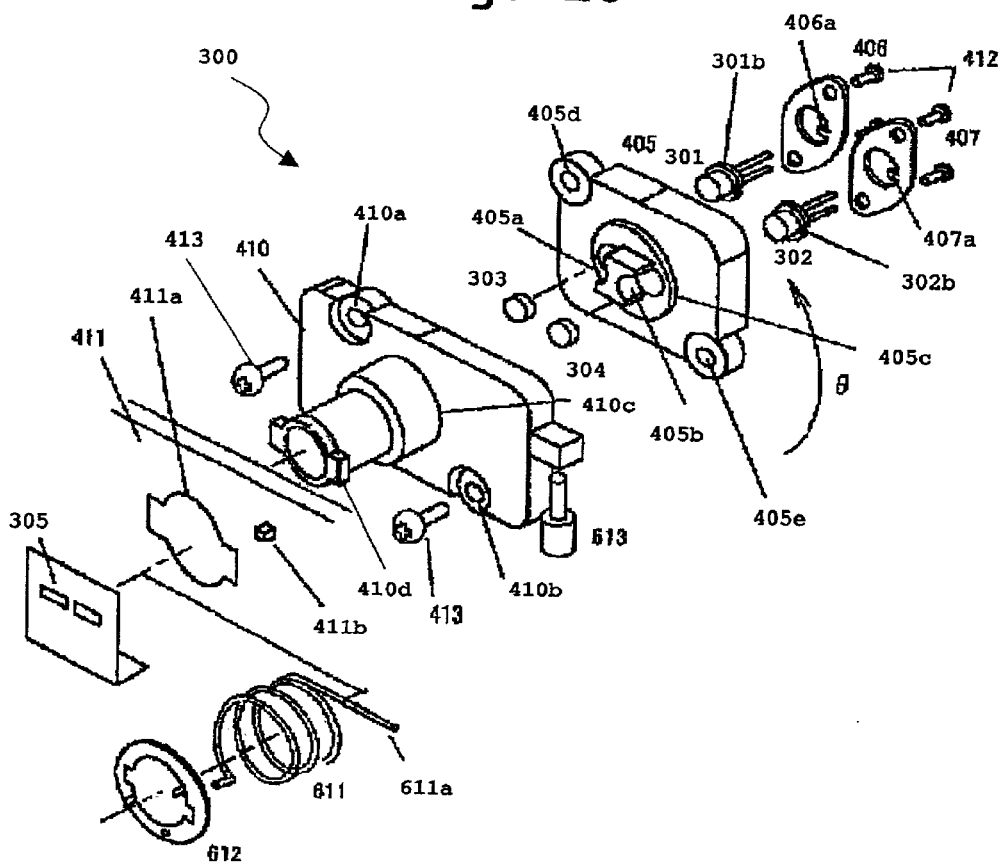
FIGS. 23 and 24 are illustrations for explaining another multiple laser beam scanning apparatus according to a preferred embodiment of the present invention.

FIG. 23 illustrates a more detailed structure of the laser light source unit 300. As illustrated in FIG. 23, the laser light source unit 300 includes a base 405 for mounting the laser arrays 301 and 302. The base 405 is provided with two holes (not shown) in the rear side of the base 405 with an angle of 1.5 degrees relative to the light shaft C (see FIG. 21) in the main scanning direction. The laser arrays 301 and 302 are inserted into the two holes of the base 405, and respective cylindrically-shaped heatsinks 301b of the laser array 301 and 302b of the laser array 302 are engaged with the respective two holes. The laser arrays 301 and 302 have notches (not shown) which are engaged with projections 406a and 406b of mounting members 406 and 407 so that the laser arrays 301 and 302 are arranged at appropriate positions. The laser arrays 301 302 engaged with the mounting members 406 and 407, respectively, are fixed to the base 405 with screws 412 from the back of the mounting members 406 and 407. The base 405 has half-moon-shaped guides 405a and 405b in front thereof into which the collimate lenses 303 and 304 are inserted and engaged. After being engaged with the half-moon-shaped guides 405a and 405b, the collimate lenses 303 and 304 are adjusted to make the diverging laser beams parallel laser beams, and are then fixed.

In the example being explained, the above-mentioned two holes (not shown) for engaging the laser arrays 301 and 302 and the half-moon-shaped guides 405a and 405b are provided to the base 405 so that the laser beams emitted from the laser arrays 301 and 302 cross each other in a plane in the main scanning direction, as described above.

The base 405 has a cylindrical portion 405c which is engaged with a holder 410. The base 405 is fixed to the holder 410 with screws 413 which are engaged with screw holes 405d and 405e of the base 405 through screw holes 410a and 410b of the holder 410. Thereby, the base 405 is fixed to the laser light source unit 300.

The holder 410 has a cylindrical portion 410a which is engaged with a wall 411 of the optical housing (not shown) provided to the laser light source unit 300. More precisely, the cylindrical portion 410a is inserted into a reference hole 411a of the wall 411. A spring 611 is inserted relative to the cylindrical portion 410a projected from the front surface of the wall 411. A stopper 612 is engaged with a projection portion 410d. Thereby, the holder 410 is held in close contact to the rear surface of the wall 411.

Figure 24:
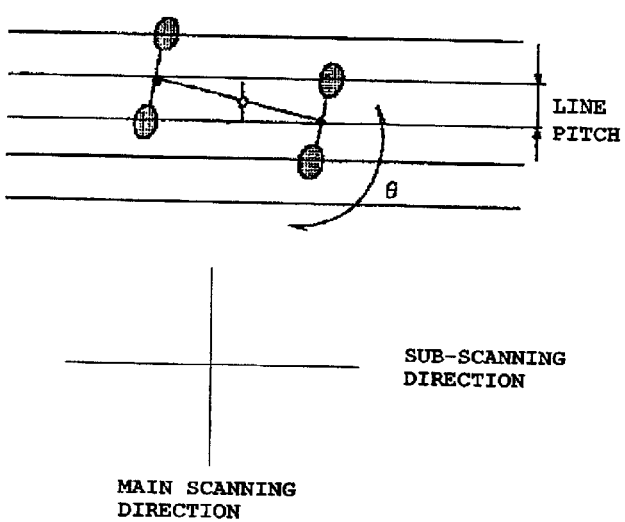

The spring 611 has an end 611a which is engaged with a projection 411b of the wall 411 so that a rotational force for rotating about an axis of the cylindrical portion 410c. An adjustment screw 613 is provided to stop the above-mentioned rotational force. This arrangement facilitates to rotate the whole laser light source unit 300 by an angle è about the light axis. With the arrangement, the two lines of beam spots are adjusted such that the four beam spots are displaced by a line pitch in the main scanning direction, as shown in FIG. 24.

The aperture 305 is provided with slits for each laser array and is fixed to the optical housing (not shown) of the laser light source unit 300 to regulate the size of the laser beams.

Figure 25:
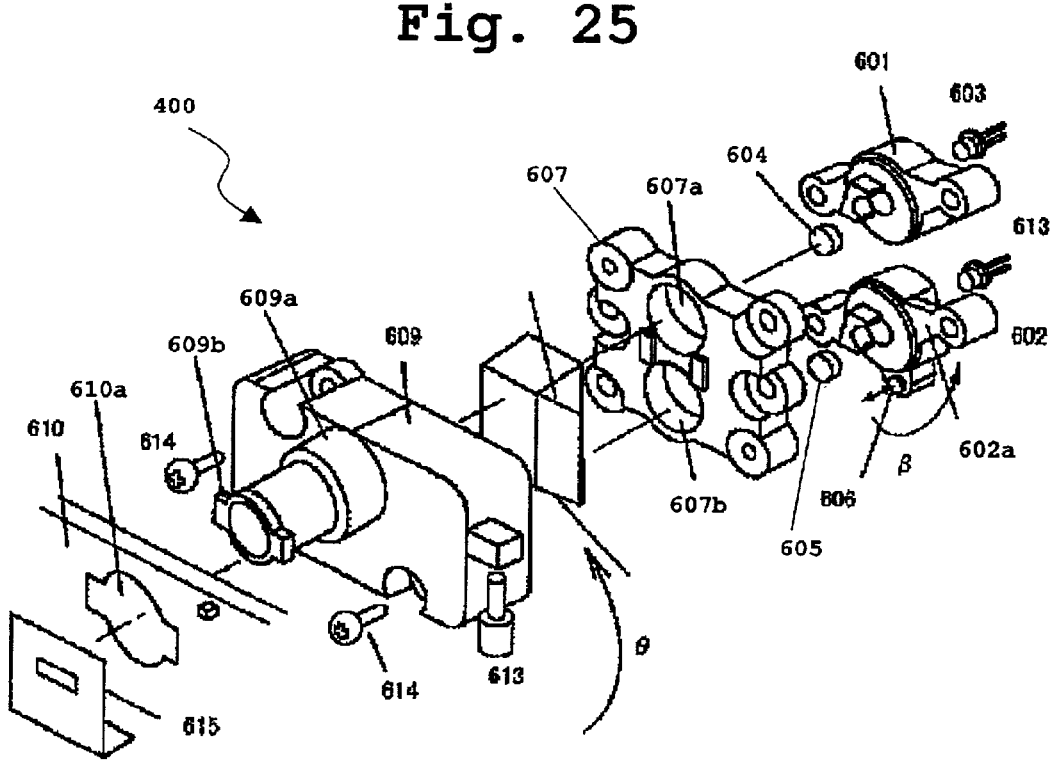
FIGS. 25 and 26 are illustrations for explaining another multiple laser beam scanning apparatus according to a preferred embodiment of the present invention.
Figure 26:
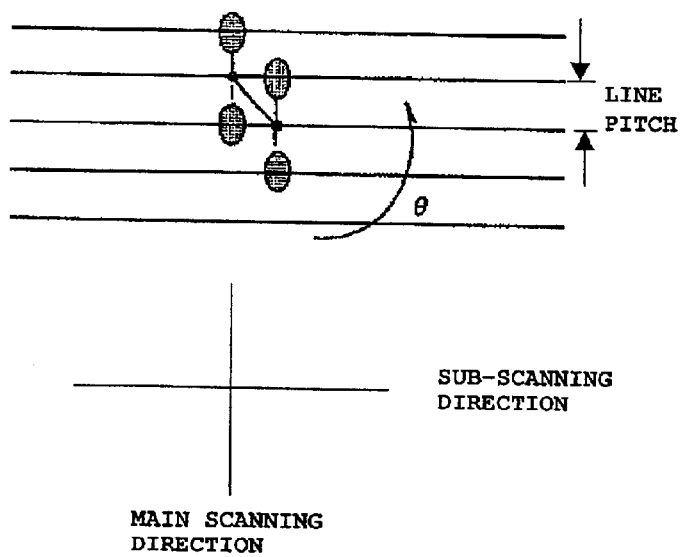

FIG. 25 illustrates a laser light source unit 400 according to a preferred embodiment of the present invention. The laser light source unit 400 has an exemplary structure to synthesize laser beams emitted by two semiconductor laser arrays. As illustrated in FIG. 25, a first light source set of a laser array 603 and a collimate lens 604 and a second light source set of a laser array 613 and a collimate lens 605 are held with bases 601 and 602, respectively, as in the case of the laser light source unit 300. The bases 601 and 602 are engaged with a common flange 607 at holes 607a and 607b, respectively, provided to the common flange 607, and are fixed with screws (not shown). The base 602 is provided with an adjustment screw 606 which is screwed in and out from the rear side so that an amount of projection in the front side can be adjusted. With this adjustment, arm portions 602a of the base 602 are twisted so that the second light set is tilted by an angle â. Thereby, the two lines of beam spots can be adjusted such that the four beam spots are displaced by a line pitch in the main scanning direction, as shown in FIG. 26.

A prism 608 including a parallelogrammatic cross-section pillar and a triangular cross-section pillar reflects the beams from the second light source with an inclined surface 608a. The beams are then reflected by a beam splitting surface 608b and run in close to the laser beams from the first light source. Such close laser beams are reflected by the polygon mirror simultaneously and continuously. Thereby, the laser beams form respective beam spots on the photosensitive member. An aperture 615 is fixed to an optical housing (not shown), as in the case of the laser light source unit 300. In the example being explained, the laser beams from the laser arrays 603 and 613 are brought to substantially overlay each other and therefore the common aperture 615 is used. A flange 607 is held by a holder 609 and is mounted to the optical housing such that a cylinder 609a of the holder 609 is engaged with a reference hole 610a of a wall 610, as in the case of the laser light source unit 300. With this arrangement, the entire laser light source unit 400 can be rotated so that a formation of the beam spots is appropriately tilted.

In FIG. 25, reference numerals 614 denote screws for fixing the flange 607 to the holder 609, and reference numeral 616 denotes an adjustment screw for adjusting a tilt angle è, as in the case of the laser light source unit 300.

Figure 27:
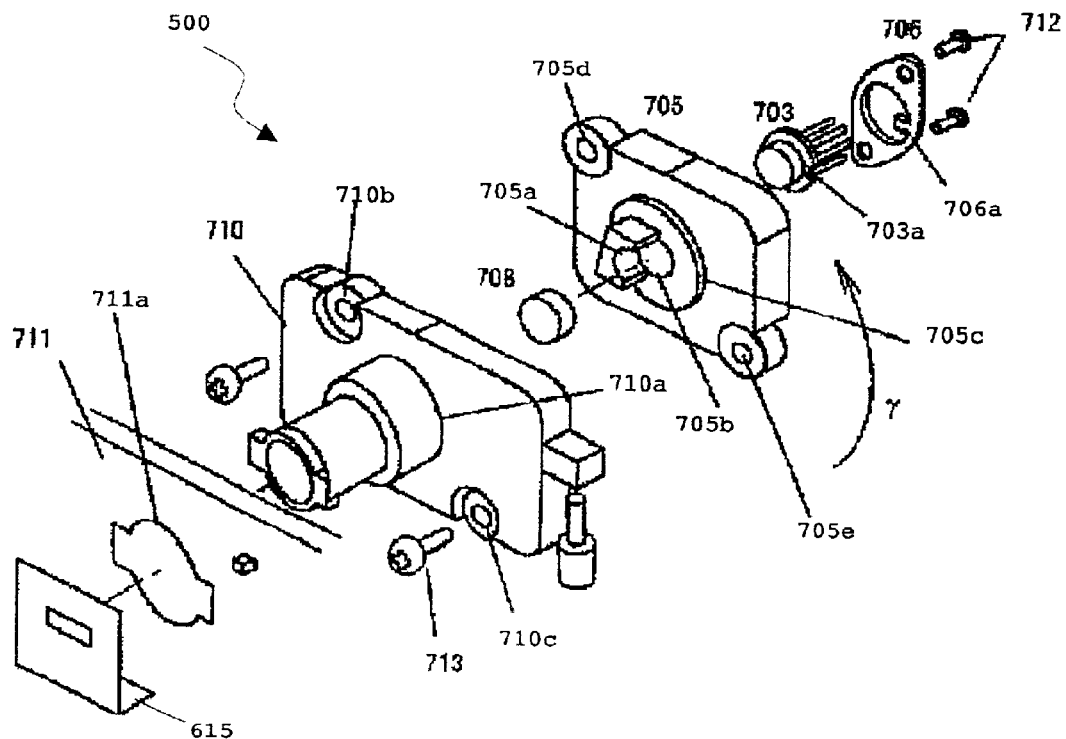
FIGS. 27 and 28 are illustrations for explaining another multiple laser beam scanning apparatus according to a preferred embodiment of the present invention.
Figure 28:
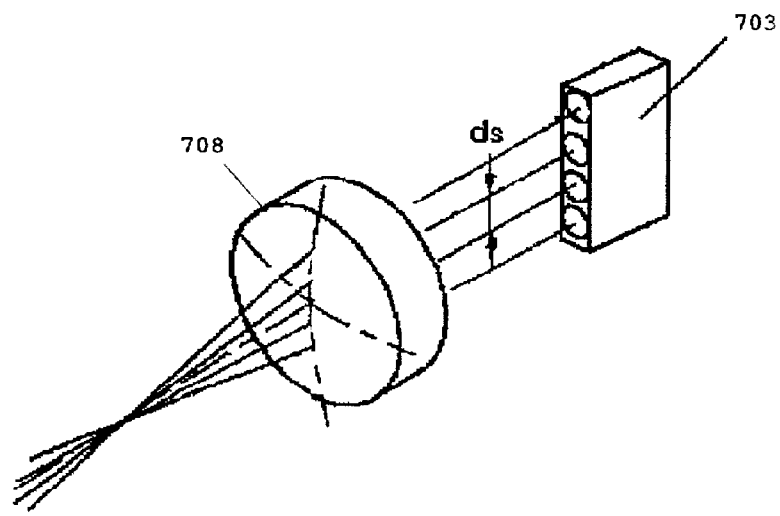

FIG. 27 illustrates a laser light source unit 500 which adopts a four channel semiconductor laser array 703, as illustrated in FIG. 28. A structure of the laser light source unit 500 is similar to each of those of the laser light source unit 300 of FIG. 23 and the laser light source unit 400 of FIG. 25 and therefore a repetitive description for the laser light source unit 500 is omitted.

Figure 29:
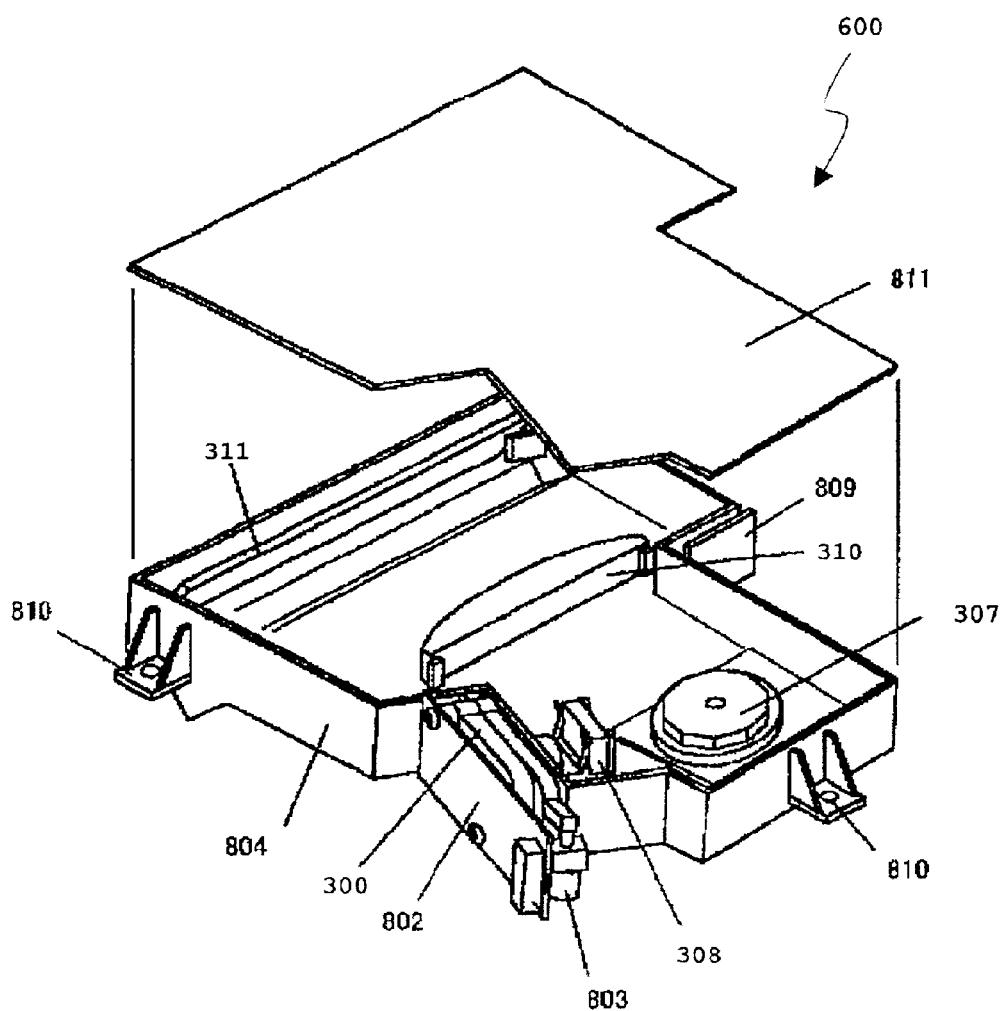
FIG. 29 is an illustration for explaining still another multiple laser beam scanning apparatus according to a preferred embodiment of the present invention.

FIG. 29 illustrates a multiple laser beam scanning apparatus 600. The multiple laser beam scanning apparatus 600 includes, for example, the multiple laser beam scanning apparatus 200 of FIG. 21 which includes the laser light source unit 300. In this example, the multiple laser beam scanning apparatus 200 is enclosed by an optical housing 804, except for the photosensitive member 313 which is arranged outside and under the optical housing 804. To an external wall of the optical housing 804, a printed circuit board 802 including a controlling circuit for controlling the semiconductor laser is mounted at a position close to the laser light source unit 300. The laser light source unit 300 is brought to contact the wall surface, orthogonal to the light shaft, of the optical housing 804 with the above-mentioned spring 611 (see FIG. 23). The laser light source unit 300 can be tilted with an adjusting screw 803 engaged with a projection formed in the wall of the optical housing 804. Inside the optical housing 804, various components of the multiple laser beam scanning apparatus 200 are arranged, except for the photosensitive member 313, as illustrated in FIG. 29. A printed circuit board 809 having the sensors for detecting the cyclic scanning laser beam to make synchronization is also mounted to the external wall of the optical housing 804. The optical housing 804 is sealed with a cover 811 and is fixed to a frame member of a host apparatus (e.g., an image forming apparatus) with screws using projections 810 of the optical housing 804.

Figure 30:
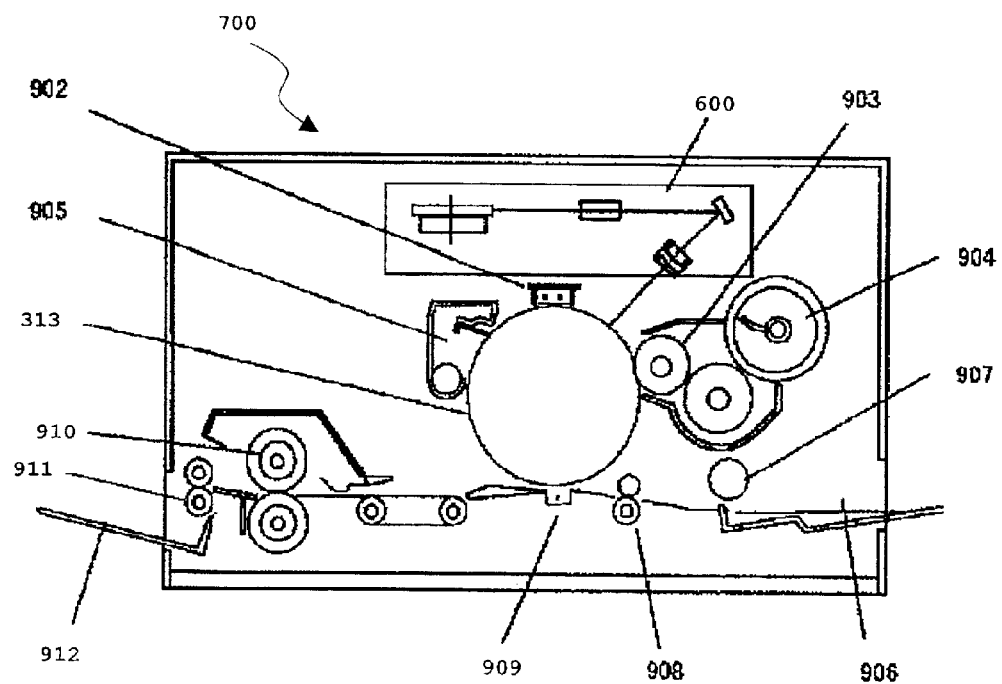
FIG. 30 is an illustration for explaining another image forming apparatus using the multiple laser beam scanning apparatus of FIG. 21.

FIG. 30 illustrates an image forming apparatus 700 including the above-described multiple laser beam scanning apparatus 600, for example. In the image forming apparatus 700, a charger 902, a development unit 903, a toner cartridge 904, a cleaning unit 905, a recording sheet cassette 906, a feed roller 907, a pair of registration rollers 908, a transfer charger 909, a pair of fixing rollers 910, a pair of ejection rollers 911, and an ejection sheet tray 912. The charger 902 evenly provides a relatively high charge to the surface of the photosensitive member 313. The development unit 903 develops with toner an electrostatic latent image formed by the multiple laser beam scanning apparatus 600 on the photosensitive member 313. The toner cartridge 904 contains toner therein. The cleaning unit 905 removes residual toner off the surface of the photosensitive member 313. These components of the charger 902, the development unit 903, the toner cartridge 904, and the cleaning unit 905 are arranged around the photosensitive member 313, as illustrated in FIG. 30.

In the image forming apparatus 700, the multiple laser beam scanning apparatus 600 forms an electrostatic latent image with a plurality of lines in a simultaneous fashion in each scanning on the surface of the photosensitive member 313. A recoding sheet is transferred from the recording sheet cassette 906 by the feed roller 907. Then, the recording sheet is stopped and is again transferred in synchronism with the rotation of the photosensitive member 313 by the pair of registration rollers 908. When the recording sheet is brought to pass by the photosensitive member 313, a toner image is transferred onto the recording sheet by the transfer charger 909. Then, the toner image on the recording sheet is fixed onto the recording sheet by the pair of fixing rollers and is ejected to the ejection sheet tray 912 by the pair of ejection rollers 911.

Figure 31:
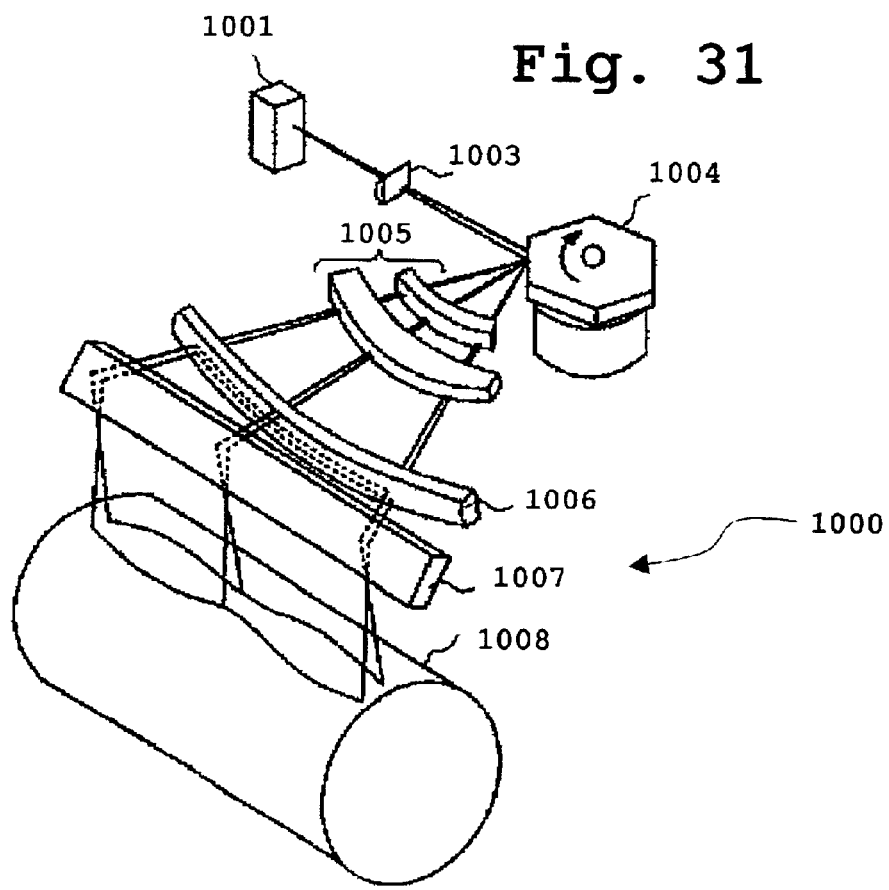
FIG. 31 is an illustration of an image forming apparatus according to an embodiment of the present invention.

Next, an image forming apparatus 1000 according to another preferred embodiment of the present invention is explained with reference to FIG. 31. FIG. 31 illustrates a main part of the image forming apparatus 1000 which includes a light source unit 1001, a cylindrical lens 1003, a polygon mirror 1004, focusing lenses 1005 and 1006, a mirror 1007, and a photosensitive member 1008. The light source unit 1001 includes two light emitting elements and two coupling lenses for coupling ray bundles diverging from the respective light emitting elements so that the diverging ray bundles are converted into ray bundles of parallel, or low diverging, or converging (i.e., light beams) suitable for an optical control system. This function of the lens is called "coupling."

In this example, the ray bundles passing through the coupling lenses are converted into two parallel light beams and are emitted from the light source unit 1001. Then, the two parallel light beams are focused on a deflection surface of the polygon mirror 1004 by the cylindrical lens 1003 in an approximate linear form extended in the main scanning direction.

The two parallel light beams are deflected towards the focusing lenses 1005 and 1006 in a constant-angular-velocity-like manner according to revolution of the polygon mirror 1004 at a constant velocity. After passing through the focusing lenses 1005 and 1006, the two parallel light beams are reflected by the mirror 1007. By the action of the-focusing lenses 1005 and 1006, the two parallel light beams form respective light spots on a photosensitive surface of the photosensitive member 1008. The two parallel light beams scan two respective scanning lines in the photosensitive surface of the photosensitive member 1008. The two light spots are formed with a predetermined distance (i.e., a scanning pitch) from each other in the sub-scanning direction.

Relative positions of the two light emitting element are determined such that a desired scanning pitch is obtained in response to a synthesized magnification ratio M in the sub-scanning direction of the focusing lens system (i.e., the cylindrical lens 1003 and the focusing lenses 1005 and 1006).

Figure 32:
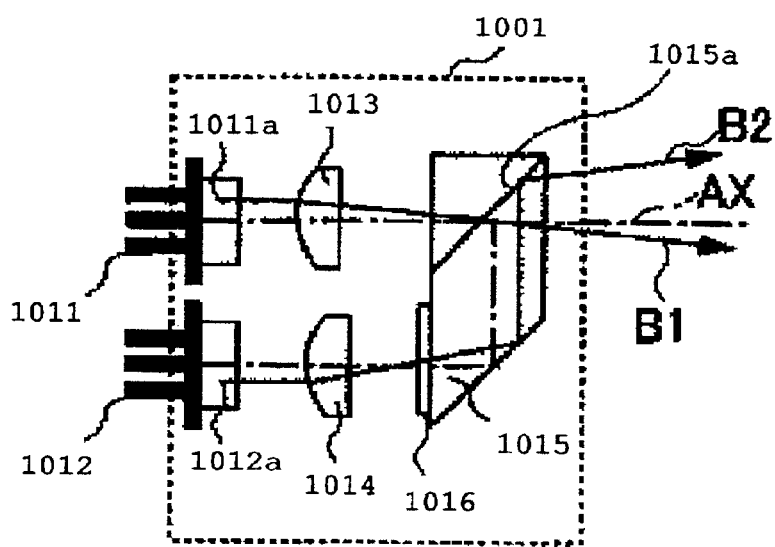
FIG. 32 is an illustration of a light source unit used in the image forming apparatus of FIG. 31.

As illustrated in FIG. 32, the light source unit 1001 includes semiconductor laser elements 1011 and 1012 (e.g., a laser diode), coupling lenses 1013 and 1014, a beam synthesizing prism 1015, and a half-wave length plate 1016. The diverging ray bundles emitted from the two semiconductor laser elements 1011 and 1012 are converted into the two parallel light beams by the corresponding coupling lenses 1013 and 1014, respectively. The respective two parallel light beams are synthesized with the beam synthesizing prism 1015. The beam synthesizing prism 1015 includes a polarization split film 1015a, and the two parallel light beams pass through the polarization split film 1015a.

As illustrated in FIG. 32, the half-wave length plate 1016 rotates the polarization surface of the light beam through the coupling lens 14 by 90 degrees from the initial state, and the light beam is reflected in turn by the surface of the beam synthesizing prism 1015 and the polarization split prism 1015a and is emitted from the beam synthesizing prism 1015.

The coupling lenses 13 and 14 are arranged such that their light shafts indicated by chain lines in FIG. 32 are parallel to each other and, through the beam synthesizing prism 1015, the light shafts are synthesized into a single light shaft AX.

In the light source unit 1001, the vertical direction of FIG. 32 (i.e., the direction the semiconductor laser elements 11 and 12 are aligned) corresponds to the sub-scanning direction of the image forming apparatus 1000. The semiconductor light elements 11 and 12 have light emitting parts 11a and 12a, respectively, which deviate from the light shafts of the corresponding coupling lenses 13 and 14 in opposite directions along the sub-scanning direction. Therefore, after the two ray bundles passing through the beam synthesizing prism 1015 and become light beams B1 and B2, the light beams B1 and B2 are emitted from the beam synthesizing prism 1015 with angles relative to the light shaft AX in opposite directions along the sub-scanning direction.

However, the light source is not limited to the light source unit 1001 and may adopt other light source available if necessary. For example, it is possible to configure the light source with a semiconductor laser array having a plurality of light emitting elements arranged in a monolithic array fashion. With this configuration, a plurality of diverging ray bundles emitted from the light emitting elements are converted with a common coupling lens into light beams. It is also possible to configure a light source unit with a plurality of semiconductor laser arrays.

Due to a thermal or electric cross talk, the space between two adjacent light emitting points of the semiconductor laser array is limited. Generally, the space is made smaller up to approximately 14 µm. In addition, making variations of the spaces between two adjacent light emitting points available causes demerits in cost-wise.

However, the optical scanning systems available offer a variety of recording densities and scanning widths, as well as of magnification ratios. Accordingly, a semiconductor laser array is tilted so as to obtain a desired scanning pitch on the photosensitive surface. Thus, the pitch of the light emitting elements in the sub-scanning direction is made desirable.

FIGS. 33A and 33B illustrate an exemplary pitch of the light emitting points. As illustrated in FIGS. 33A and 33B, this semiconductor laser array has four light emitting points. When the semiconductor laser array is arranged straight in the vertical direction, the pitch between two adjacent light emitting points in the sub-scanning direction has a value P, as illustrated in FIG. 33A. However, when the semiconductor laser array is tilted with an angle è, the pitch between the two adjacent light emitting points in the sub-scanning direction has a value Pcosè, as illustrated in FIG. 33B. In this way, the scanning pitch in the sub-scanning direction can be made desirable.

However, if the semiconductor laser array is tilted, as illustrated in FIG. 33B, the light emitting points are displaced with a space d in the main scanning direction and consequently starting points for scanning on the photosensitive surface are deviated in the main scanning direction. Accordingly, an amount of deviation on the photosensitive surface is the space d multiplied by a magnification ratio in the main scanning direction of the total optical scanning system.

Even when the semiconductor laser array is not tilted, a displacement of the light emitting points may occur due to unavoidable errors during the fabrication of the semiconductor laser array. Therefore, the starting points for scanning on the photosensitive surface are deviated in the main scanning direction, as in the foregoing case.

The deviations of the light emitting points in the main scanning direction may appear as an inferior quality of a formed image. Accordingly, it is necessary to correct for the starting points of scanning light beam spots on the photosensitive surface. Various examples of the light source unit adopting an method and apparatus for appropriately performing the above-mentioned correction.

Figure 34:
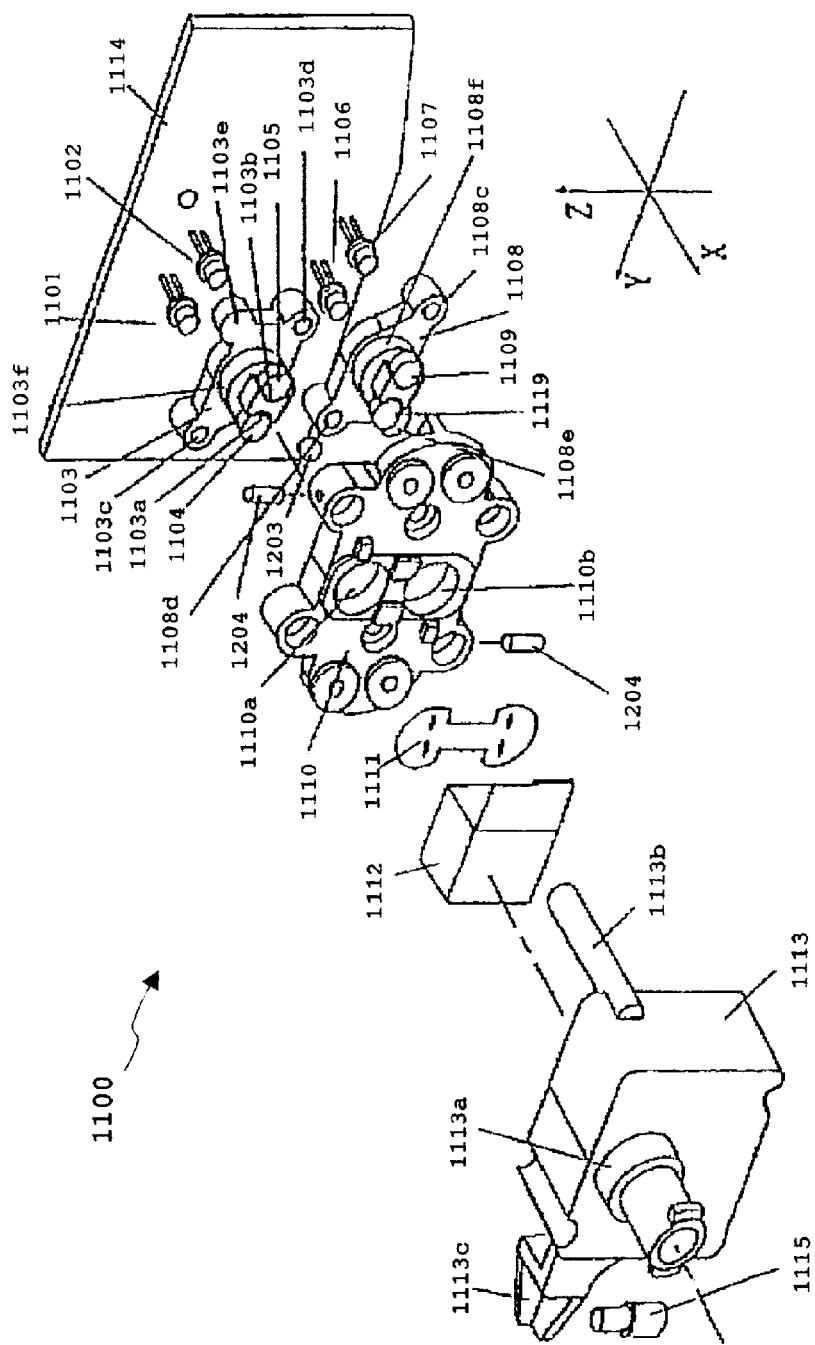
FIG. 34 is a perspective exploded view of a light source unit according to an embodiment of the present invention.

Referring to FIG. 34, a four-beam light source unit 1100 is explained. FIG. 34 is an exploded view of the four-beam light source unit 1100. As illustrated in FIG. 34, laser diodes 1101 and 1102 are inserted under pressure into respective holes (not shown) formed with a space of 8 mm therebetween in the main scanning direction in a rear side of an aluminum die-cast supporting member 1103. The laser diodes 1101 and 1102 are aligned symmetric with respect to a first light emission axis. Collimate lenses 1104 and 1105 are arranged in a way such that X positioning is made to adjust the diverging ray bundles emitted from the respective laser diodes to be parallel light beams and that each of Y and Z positioning is made to direct the diverging ray bundles emitted from the respective laser diodes in a predetermined direction. After that, a UV cure adhesive agent, for example, is filled to gaps between the laser diodes 1101 and 1102 and supporting portions 1103a and 1103b, respectively, correspondingly formed in a U-like shape on the supporting member 1103. Thereby, the laser diodes 1101 and 1102 are fixed. This light source assembly including the laser diodes 1101 and 1102 is referred to as a first light source assembly.

Likewise, laser diodes 1106 and 1107 are inserted into a supporting member 1108 and are fixed with the UV cure agent. Thus, a second light source assembly is prepared.

The first and second light source assemblies are fixed to a base member 1110 in the following way. The supporting members 1103 and 1108 include cylinder portions 1103f and 1108f, respectively, which have center axes matching with the respective light emission axes of the first and second light source assemblies arranged symmetric relative to the X axis. The cylinder portions 1103f and 1108f are inserted from the rear side of the base member 1110 into holes 1110a and 1110b, respectively, formed in the base member 1110. Then, positioning portions 1103c, 1103d, and 1103e of the supporting member 1103 and positioning portions 1108c, 1108d, and 1108e of the supporting member 1108 are used as references for contacting the base member 1110 and are fixed with screws (not shown) from the front side of the base member 1110. Thereby, the first and second assemblies are fixed to the base member 1110.

The base member 1110 holds a plate 1111 having apertures corresponding to the laser diodes 1101, 1102, 1106, and 1107 and a beam synthesizing prism 1112 for emitting light beams from the laser diodes 1106 and 1107 in close proximity to the light axes of the laser diodes 1101 and 1102. The thus-structured assembly is held by a holding member 1113 and a resultant structure is referred to as a base unit.

The above-mentioned base unit is mounted to an optical housing (not shown) that accommodates this base unit as well as an optical scanning system (not shown), in a way such that the center of a cylinder portion 1113a of the holding member 1113 matches the light axis of the optical scanning system. Thus, the plurality of laser beams are caused to properly enter the optical scanning system. A lever 1113c of the holding member 1113 can be moved upwards and downwards with an adjusting screw 1115 so that the above-described base unit can be turned about the cylinder portion 1113a. Thereby, the beam array can be adjusted to match the scanning line which may be displaced due to positioning errors of the optical scanning system.

A board 114 is a printed circuit board on which drive circuits for driving the laser diodes 1101, 1102, 1106, and 1107 are formed, and is fixed to a pillar 1113b of the holding member 1113. The leads of the laser diodes 1101, 1102, 1106, and 1107 are soldered to the corresponding drive circuits of the board 114 so that the circuits are connected.

In this example being explained, a semiconductor laser array having a plurality of light emission elements arranged in a monolithic fashion may be applied.

In the above-described light source unit having a plurality of light emission elements, the light emission elements or the light emission points have oscillation wave lengths different from each other. Therefore, the magnification ratios of the scanning light running along the scanning lines of the photosensitive surface are deviated according to the chromatic aberration of the focusing lenses 1005 and 1006. As a result, the scanning width differs by the light emission elements or the light emission points.

Further, in the above-described light source unit having the plurality of light emission elements, the positions of the light emission points are deviated in the main scanning direction, as in the case the semiconductor laser array is inclined, as illustrated in FIGS. 33A and 33B. Therefore, when the laser beams emitted from the light emission points reach the photosensitive surface, the positions for the laser beams to start the scanning are deviated in the main scanning direction. Such deviations of the scanning start positions on the photosensitive surface in the main scanning direction may appear in an inferior output image quality, as in the case the semiconductor laser array is inclined, as illustrated in FIGS. 33A and 33B. Therefore, it is necessary to correct for the scanning start positions in this case.

The above-described deviations of the light emission points can be expressed, in other words, as "erroneous conditions that the positions of the light emission points of the laser diodes differ relative to an axis orthogonal to the deflection scanning plane (i.e., the main scanning direction) ." Under such erroneous conditions, that is, when the positions of the light emission points of the laser diodes are not aligned on an axis orthogonal to the deflection scanning plane, the positions for the light emission points to start the scanning on the photosensitive surface are deviated in the main scanning direction and, as a result, the image may appear to have jagged edge portions.

In addition to the above-described case that the semiconductor laser array is inclined, the above-described problematic phenomena that the scanning widths are caused to be different and the scanning star positions are needed to be corrected for may occur in other cases in which the light emission positions on the semiconductor array chip are displaced due to fabrication errors or, when a light source unit is made up with a plurality of light sources, the plurality of light sources are displaced due to assembling errors.

Figure 35:
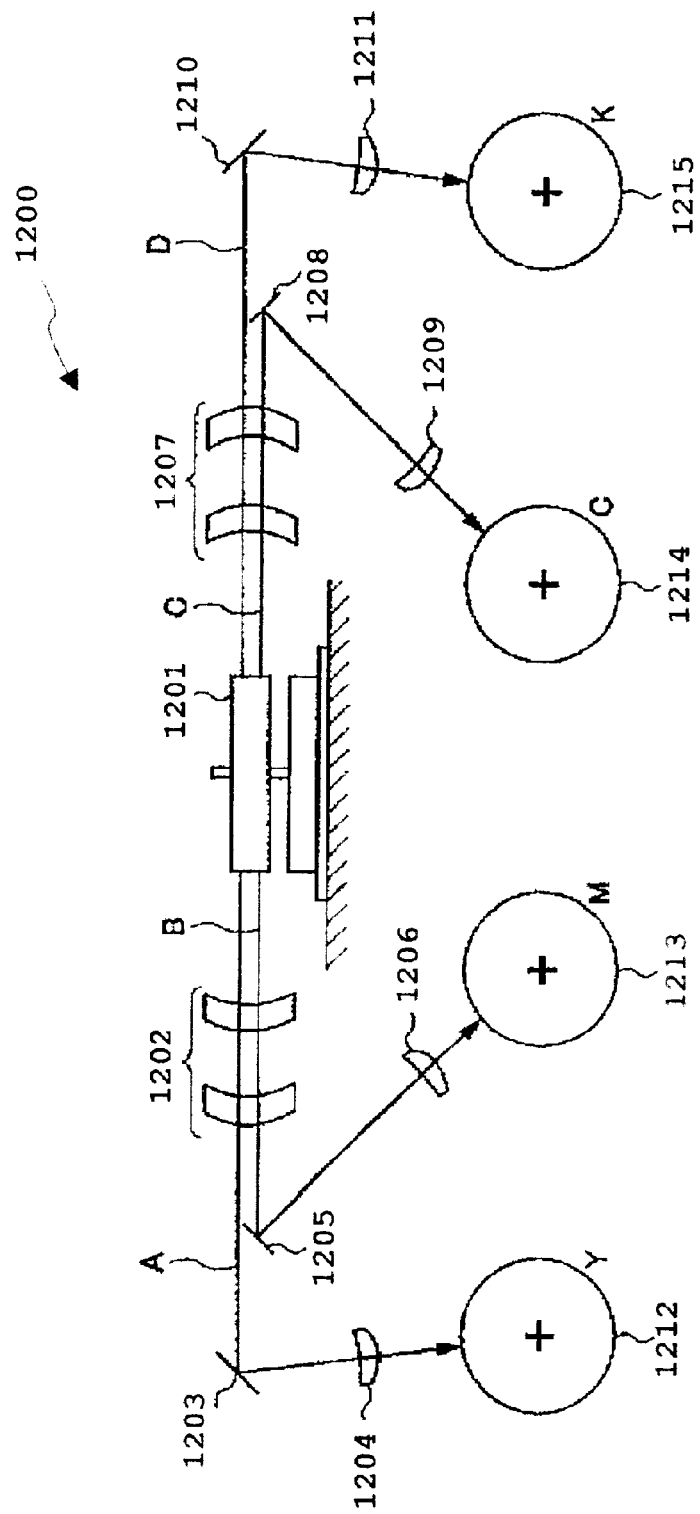
FIG. 35 is an illustration of a tandem-structured image forming apparatus according to an embodiment of the present invention.

Next, a tandem-structured image forming apparatus 1200 is explained with respect to FIG. 35. In the image forming apparatus 1200 illustrated in FIG. 35, laser beams A, B, C, and D emitted from light sources (not shown) are deflected by deflection reflecting surfaces of a common rotating polygon mirror 1201. Then, the laser beams A, B, C, and D are directed via respective lens and mirror systems to respective photosensitive members as the laser beams A, B, C, and D are deflected in a constant-angular-velocity-like manner by the polygon mirror 1201 that revolves at a constant velocity. The number of the laser beams A, B, C, and D deflected corresponds to the number of photosensitive members. These four laser beams A, B, C, and D may be the laser beams synthesized based on those emitted from a plurality of light sources or the laser beams emitted from a semiconductor laser array.

The polygon mirror 1201 of FIG. 35 corresponds to the polygon mirror 1004 of FIG. 31. Each set of focusing lenses 1202 and 1207 correspond to the focusing lens 1005 of FIG. 31. Each of mirrors 1203, 1205, 1208, and 1210 corresponds to the mirror 1004 of FIG. 31. Each of focusing lenses 1204, 1206, 1209, and 1211 corresponds to the focusing lens 1006 of FIG. 31. Each of photosensitive members 1212, 1213, 1214, and 1215 corresponds to the Photosensitive member 1008. The tandem-structured image forming apparatus 1200 includes these four sets of image forming mechanisms, as illustrated in FIG. 35.

In a laser control operation of the image forming apparatus 1200, the laser beam A, for example, is deflected by the polygon mirror 1201 and is then brought to pass through lens 1205. After that, the laser beam A is reflected by the mirror 1203 towards the lens 1204. Then, the laser beam A passes through the lens 1204 and impinges on a photosensitive surface of the photosensitive member 1212. Thereby, the laser beam A generates a light spot on the photosensitive surface of the photosensitive member 1212 and scans a scanning line in the photosensitive surface of the photosensitive member 1212 with the light spot. Likewise, the laser beam B is brought to form a light spot on the photosensitive surface of the photosensitive member 1213. Also, the laser beams C and D are brought to form respective light spots on the photosensitive surfaces of the photosensitive members 1214 and 1215, respectively. In this tandem-structured image forming apparatus of FIG. 35, the four laser beams are caused to scan the respective four photosensitive surfaces at the same time. The photosensitive members correspond to colors of yellow (Y), magenta (M), cyan (C), and black (B). With such a configuration, this image forming apparatus forms toner images of yellow, magenta, cyan, and black colors on the respective four photosensitive members at the same time and then overlays the images on one to another into a single color image on a recording sheet through an image transferring process. In the image transferring process, the thus separately prepared four color images are sequentially transferred onto a recoding sheet.

Figure 36A:
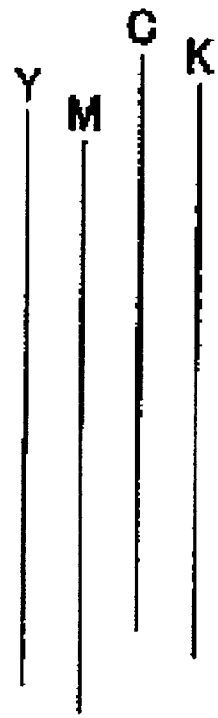
FIGS. 36A and 36B are illustrations for explaining the deviations in the scanning lines in the case of using multiple laser light beams.
Figure 36B:
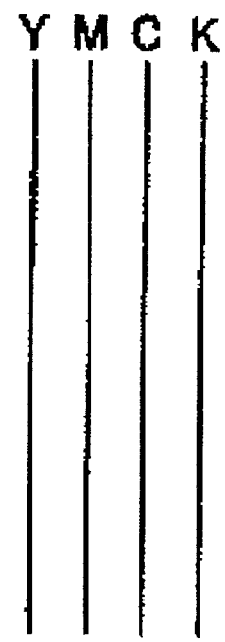

FIGS. 36A and 36B illustrates how the four scanning lines, that is, the four color images of Y, M, C, and B are overlaid on one to another. In FIGS. 36A and 36B, the four scanning lines appear to be placed with spaces between two adjacent ones in the sub-scanning direction. However, they are usually overlaid on one to another in actual conditions. FIG. 36A shows conditions that the four scanning lines are not precisely overlaid on one to another. This is the case where an appropriate correction according to the present invention is not performed. The deviations in the scanning width of the scanning lines appear to be deviations of an image or of colors in an image. However, when an appropriate correction according to the present invention is conducted, the four scanning lines can precisely be overlaid on one to another, as illustrated in FIG. 36B. In this case, a high quality color image can be output, as a result.

In addition, even if the scanning widths of the scanning lines match with each other, an image quality may be degraded when an arbitrary position on the scanning lines is deviated from a desired position. To prevent this problem, each position (i.e., each dot) on the scanning lines is needed to be located at a desired position with a precise accuracy. That is, it is required that an error in the magnification ratio at each position on an output image is corrected.

Therefore, an error in the magnification ratio at each position on an output image is desired to be zero or as close to zero as possible. Accordingly, in an optical scanning system, it is required that an assessment value with respect to deviations from an ideal position, called an error in the magnification ratio, is made as small as possible. Also, it is required that an assessment value obtained by a time differentiation on an error in the magnification ratio, called a linearity, is made as small as possible.

Each of an error in the magnification ratio and a linearity is ordinarily desired to be a value smaller than ±1%. However, when a higher image quality is sought the value is required to be smaller than ±0.5%, and when a printing-level high image quality is desired the value required to be smaller than ±0.1%.

A preferable image quality may be obtained using a relationship 1;

$$(h(t)-h_0(t))/h_0(t)<0.01, \quad (1)$$

wherein t represents a predetermined time period, h(t) represents a scanning length at an arbitrary position A during a time period t, and $h_0(t)$ represents an ideal scanning length at an arbitrary position A during a time period t. The linearity is a limit of the above-indicated relationship 1 as t approaches 0, that is, a result that the relationship 1 is subjected to a time differentiation, and is expressed as a relationship 2;

$$(dh(t)-dh_0(t))/dh_0(t). \quad (2)$$

Figure 37A:
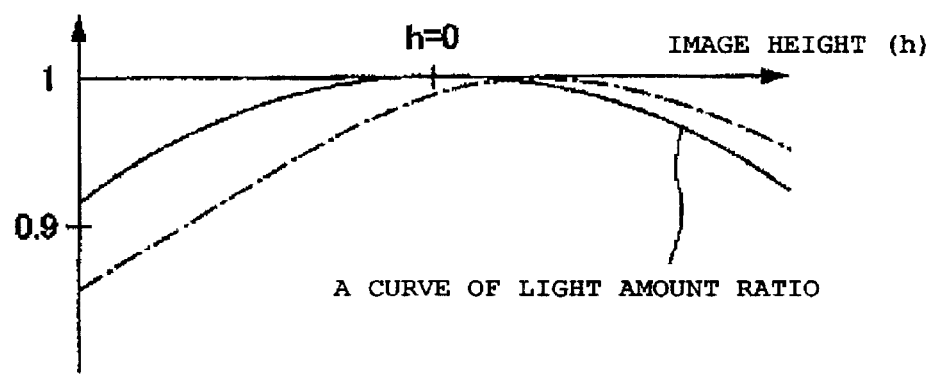
FIGS. 37A and 37B are illustrations for explaining a correction of the scanning light amount along the scanning line on a photosensitive surface.

In an optical scanning system, a rotating polygon mirror converts a light beam into a scanning light beam and therefore an incident angle and a reflection angle of the scanning light beam relative to the optical components such as the polygon mirror, scanning lenses, and so on are continuously varied during one scanning process in accordance with a position on a scanning line. Because of this, transmittancy and reflectivity generally tends to be deviated and consequently a light radiation amount of the scanning light beam scanning on the scanning surface is varied in accordance with a position on the scanning line in the scanning surface. This results in a phenomenon called a shading that causes differences of light radiation amount among images depending upon the heights of the images, as illustrated in FIG. 37A. Such differences of FIG. 37A causes variations in density and leads up to a degradation in a quality of images. Therefore, an appropriate correction is needed to seek a high image quality.

FIG. 37A demonstrates a relationship between a light radiation amount ratio of the light beam spot running on the photosensitive surface and an image height. In FIG. 37A, the light radiation amount ratio is presented in the vertical axis and the image height is presented in the horizontal axis. A peak value of the light radiation amount ratio is set to 1, and the scanning light amount with respect to each image height is represented by a ratio relative to the peak value 1.

In a multiple-beam optical system having a plurality of light emission points, more complicated factors are involved although it depends on the structure of the optical system. For example, the multiple scanning light beams run different paths and therefore optical components that the multiple scanning light beams pass by and through between the light emission points and the photosensitive surface are positioned with slight displacements to each other. Also, deflection directions of the multiple scanning light beams are slightly different from each other. Accordingly, the light radiation amount may be different even when the image heights are the same. This is demonstrated by a chained curve of FIG. 37A in relation to the solid curve. As such, when the light radiation amounts of the scanning light beams are different relative to the same image height, the difference of the light radiation amounts clearly appear in an image typically when the optical system is employed in a color image forming apparatus. Consequently, the difference of the light radiation amounts becomes a factor of degradation in an image quality.

Figure 37B:
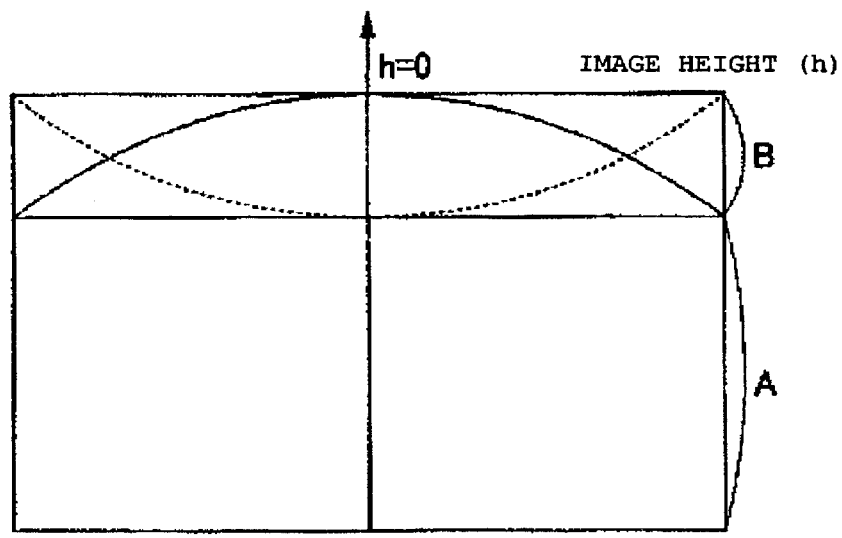

A correction is accordingly needed for the light radiation amounts among the various image heights on the scanning surface. As shown in FIG. 37B, when the solid line represents the light radiation amount of the scanning light beam, the light source is controlled to emit the light such that a correction light amount indicated by a dotted line is added to the light amount indicated by the solid line.

In FIG. 37B, when the lowest light radiation amount is represented by I(A), the highest light radiation amount is represented by I(A+B), and the correction light amount is represented by $\ddot{A}$, the following equation is satisfied;

$$\ddot{A}=I(A+B)/I(A). \quad (3)$$

When an output power of the light emission is multiplied by the correction amount $\ddot{A}$, a resultant value is used to control the light source, thereby conducting the appropriate correction of the light radiation amount.

The unevenness of the scanning light amount among the image heights may differ from one optical system to another, but it may not greatly differ among the same optical systems. Therefore, data of the differences of the scanning light amount among the image heights are previously stored and are used when the correction is conducted. Such data is referred to as shading data and the correction using the shading data is referred to a shading correction.

For example, a circuit shown in FIG. 57 (explained later) controls a peak value of an output light intensity and a bias current of a laser diode and, in this circuit, the shading data are used to correct operation data output from a D/A 1401 based on pixel data of each line, in a way as shown in FIG. 37B.

Referring to FIGS. 38–41, an exemplary relationship between a light modulation pulse and an exposure energy is explained in both cases where the above-described shading correction according to the present invention is performed and where it is not performed. In FIG. 38, P2 represents a light modulation pulse in the case the shading correction is not performed. Also, D2 represents an exposure energy when a beam profile is expressed in a Gaussian distribution in an optical system where laser light from a laser diode is corrected into a parallel light beam by a collimate lens and the parallel light beam is then focused on a photosensitive surface via a scanning optical system. On the other hand, when the shading correction according to the present invention is performed, the light modulation pulse will have a pattern, as indicated by P1. When an exposure is performed with this pattern of the light modulation pulse P1, the exposure energy distribution in the same optical system will have a curve, as indicated by D1.

FIG. 39 shows another exemplary relationship between the light modulation pulse and the exposure energy where the width of a light modulation pulse P4 is made narrower in comparison with the light modulation pulse P2 of FIG. 38, wherein the shading correction according to the present invention is not performed. In this case, the exposure energy distribution will have a curve D4. FIG. 39 also indicates a pattern of a light modulation pulse P3 when the shading correction is performed, and a curve of an exposure energy D3 when the exposure is made with the pattern of the light modulation pulse P3.

Figure 40:
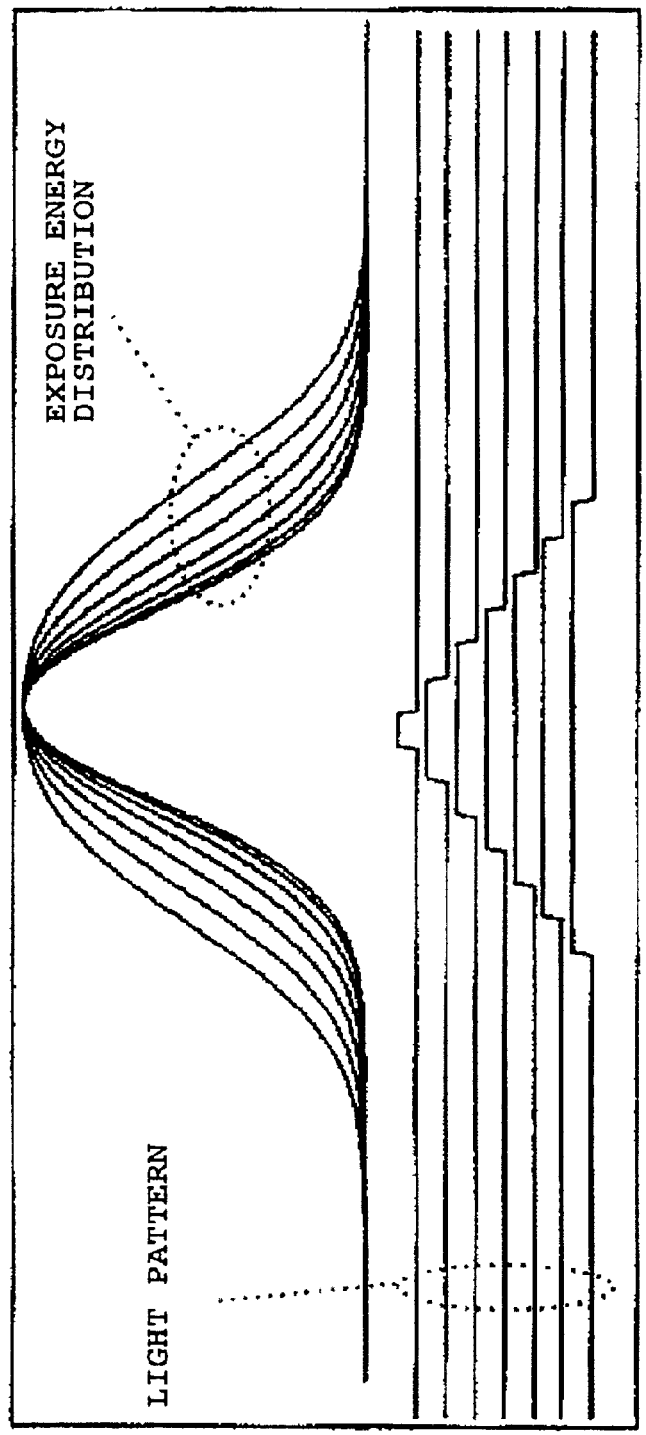

When the shading correction according to the present invention is not performed and the light modulation pulse (i.e., P2 or P4) is stepwise changed, the exposure energy distribution curve (i.e., D2 or D4) will accordingly be changed, as shown in FIG. 40. Likewise, when the shading correction according to the present invention is performed and the light modulation pulse (i.e., P1 or P3) is stepwise changed, the exposure energy distribution curve (i.e., D1 or D3) will accordingly be changed, as shown in FIG. 41.

Figure 41:
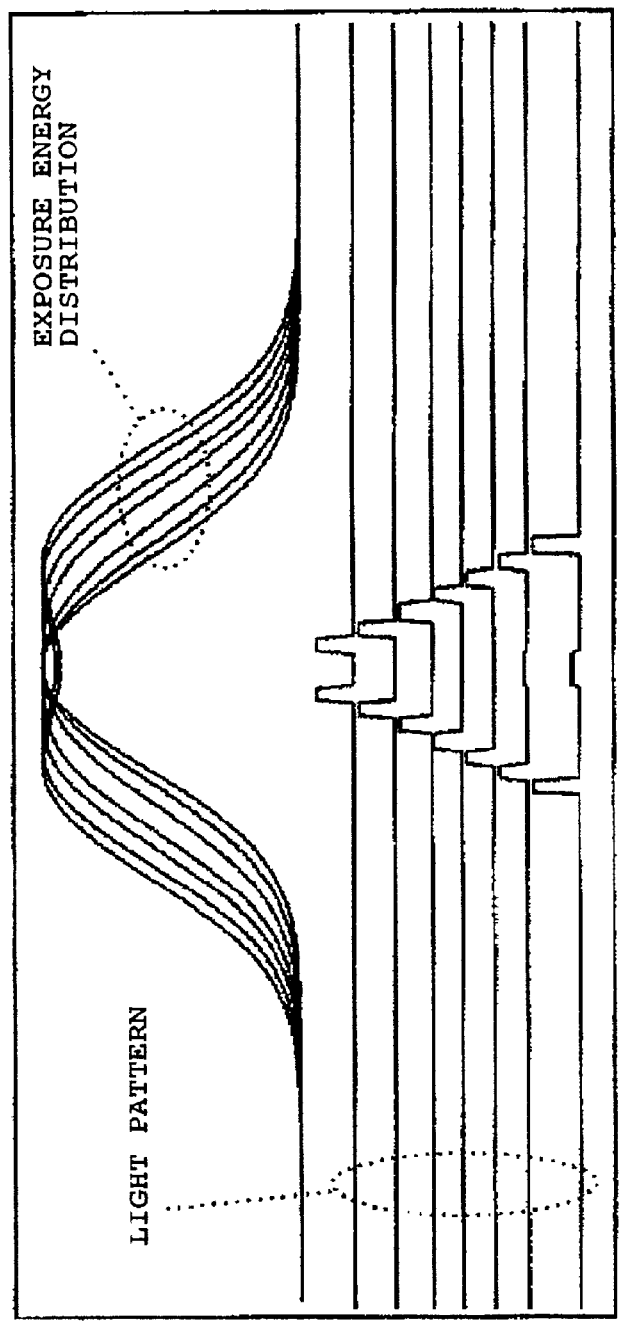

The patterns of the light modulation pulses made according to the present invention, as shown in FIG. 41 are composed of a train of first thin and bilaterally symmetric light pulses, such as the light modulation pulse P3 of FIG. 39, and a second pulse for eradiating light in the center of the light modulation pulse.

To narrow the width of the exposure energy distribution, it is preferable to shorten the interval of the first thin and bilaterally symmetric light pulses. To expand the width of the exposure energy, it is preferable to expand the interval of the first thin and bilaterally symmetric light pulses. In this case, the second pulse suppresses a reduction of the light radiation amount around the center of the exposure energy distribution.

It should be understood from the above description that an exposure with the light modulation pulse according to the present invention assures a steep exposure energy Redistribution which can be achieved with an exposure by a light beam having a diameter reduced by approximately 20%. That is, the shading correction according to the present invention can make the surface potential distribution on the photosensitive member as close as that of the case where the light beam has the reduced beam diameter. As a result, it becomes possible to generate an improved image in granularity (i.e., a signal-to-noise ratio).

In the above preferred embodiments, the laser beam modulation is explained with reference to the examples of the optical scanning system. However, the present invention can also be applicable to an apparatus in which an object to be exposed to the laser beam is rotated, such as an optical disc apparatus, for example.

Figure 42:
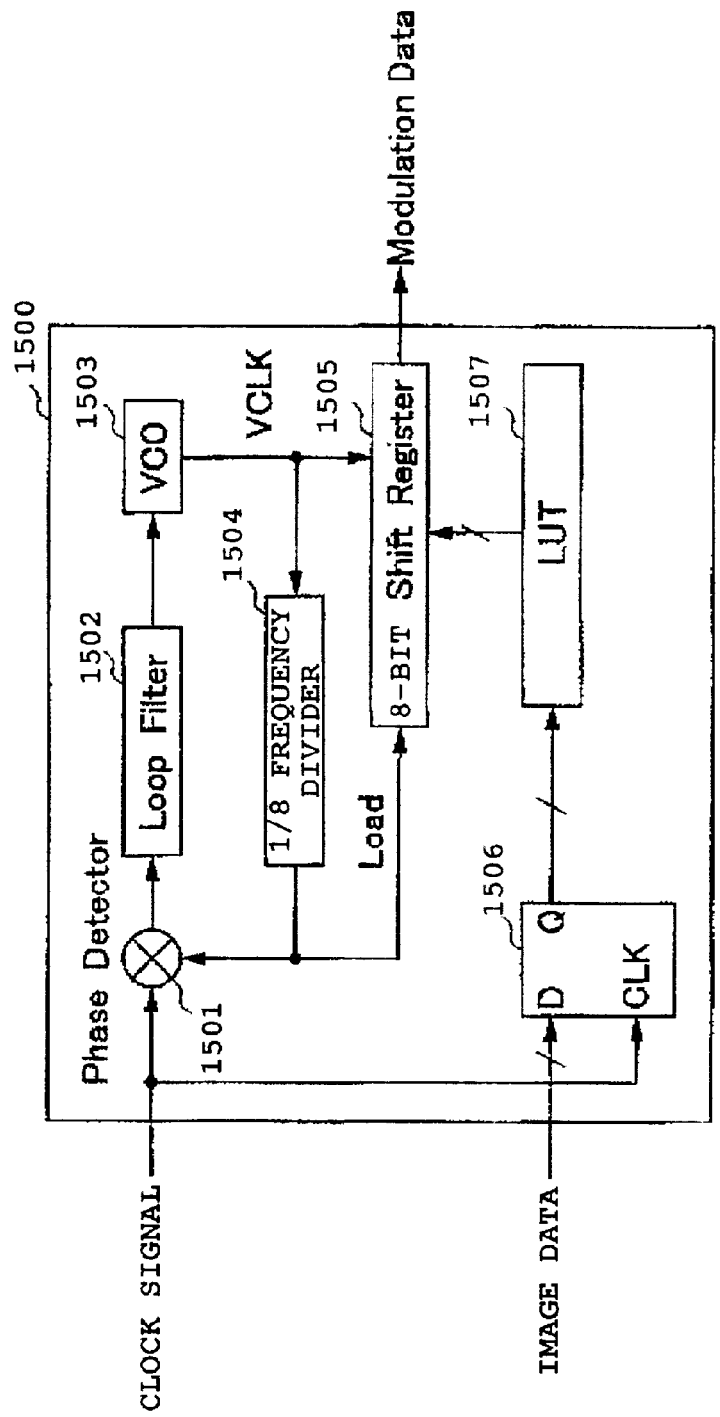
FIG. 42 is a block diagram of a pulse modulator according to an embodiment of the present invention.

Referring to FIG. 42, a pulse modulator 1500 is explained for generating modulation data to produce a light modulation pulse train such as those shown in FIG. 41. FIG. 42 shows a block diagram of the pulse modulator 1500 which includes a phase detector 1501, a loop filter 1502, a VCO (voltage controlled oscillator) 1503, a 1/8 frequency divider 1504, an 8-bit shift register 1505, a D-type flip-flop circuit 1506, and an LUT (look-up table) 1507. The phase detector 1501 includes a PLL (phase-locked loop) (not shown).

In FIG. 42, a basic clock signal is used to transfer image data. Image data is 8-bit data and is converted by the LUT 1507 to data corresponding to a train of modulation pulses so as to be loaded to the 8-bit shift register 1505 in response to a load signal. The phase detector 1501, the loop filter 1502, the VCO 1503, and the 1/8 frequency divider 1504 generate a clock signal VCLK having a clock frequency eight times as fast as the basic clock signal. The LUT 1507 generates modulation data and outputs in synchronism with the clock signal VCLK via the 8-bit shift register 1505.

Figure 43:
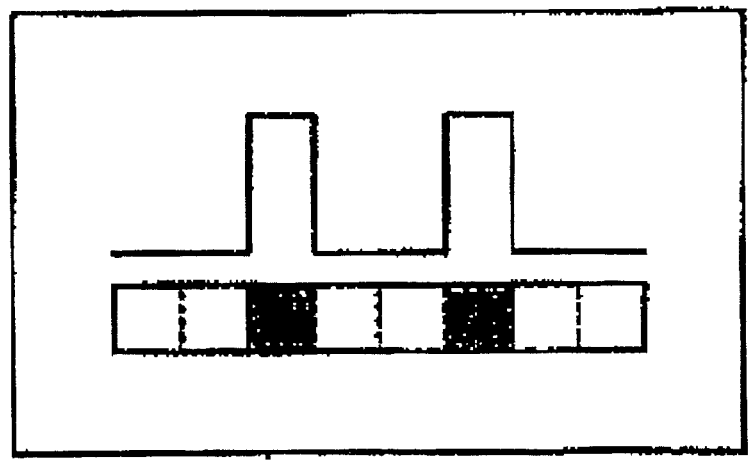
FIGS. 43 and 44 are illustrations showing examples of modulation data.
Figure 44:
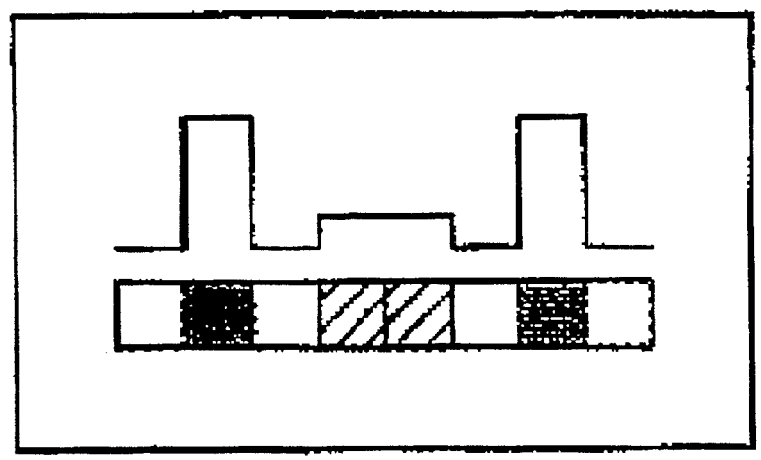

FIG. 43 shows the modulation data for generating the light modulation pulse P3 of FIG. 39, for example. Also, FIG. 44 shows the modulation data for generating the light modulation pulse P1 of FIG. 38.

In this way, the pulse modulator 1500 is configured to convert the image data with the LUT 1507. Therefore, when the optical laser scanning system is changed, it is not necessary to change the pulse modulator 1500 and only a simple change of the data of the LUT 1507 is needed to generate the light modulation pulses as shown in FIG. 38 or FIG. 39.

Accordingly, the above-described configuration provides a great flexibility to generate the light modulation pulses with which a high quality image with a superior granularity can be reproduced.

Figure 45:
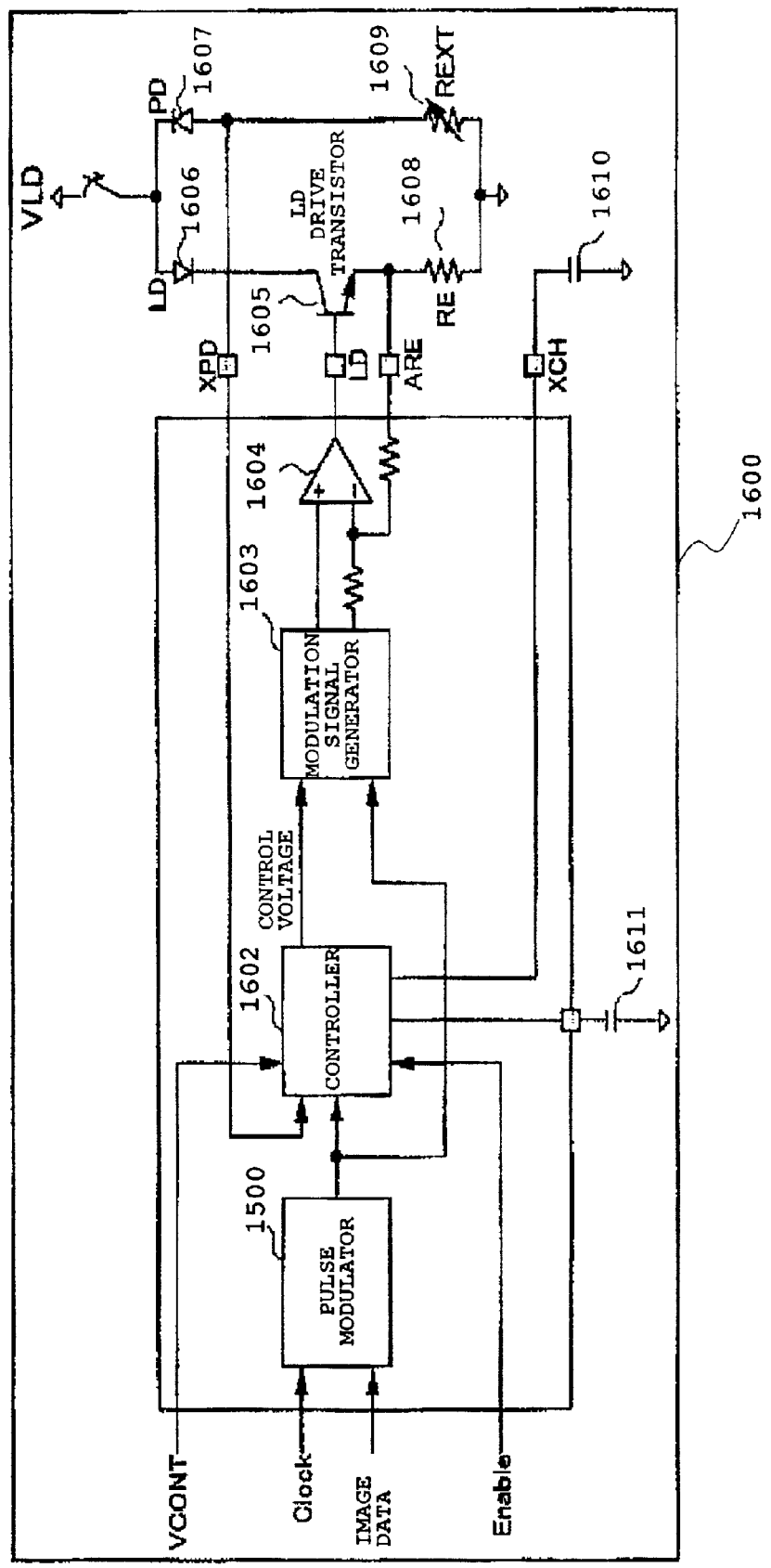
FIG. 45 is a block diagram of an LD controller according to an embodiment of the present invention.

Referring to FIG. 45, an LD (laser diode) controller 1600 is explained. The LD controller 1600 controls a laser diode with modulation in accordance with the modulation data sent from the pulse modulator 1500 of FIG. 42. As shown in FIG. 42, the LD controller 1600 includes the pulse modulator 1500, a control circuit 1602, a modulation signal generator 1603, a differential amplifier 1604, an LD drive transistor 1605, a laser diode (LD) 1606, a photoreceptor (PD) 1607, a resister 1608 having a resistance value RE, a variable resister 1609 having a resistance value REXT, and capacitors 1610 and 1611.

When the LD 1606 is driven to emit light at a light power $P_0$, for example, the light is captured by the PD 1607 which consequently produces and outputs a current in response to the amount of light. Then, the current produced by the PD 1607 is converted into a voltage through the variable resistor 1609. After that, the converted voltage is transmitted to the controller 1602 through a terminal XPD. The controller 1602 outputs a control voltage on a basis of a comparison result with respect to the voltage input through the terminal XPD and an input signal VCONT, thereby controlling the light power $P_0$, for example. The value of the control voltage output by the controller 1602 is held by the capacitor 1610 connected to the controller 1602 via a terminal XCH.

Likewise, when the LD 1606 is driven to emit light at a light power $P_1$, the controller 1602 outputs the control voltage to control the light power $P_1$ and the output voltage value is held by the capacitor 1611. The light power is modulated in multiple steps on the assumption that the light power has the characteristic of linearity relative to the voltages provided between the light powers $P_0$ and $P_1$. Actually, this linearity accurately holds because of the general I-L (a driving current versus an output light power) characteristic of the laser diodes.

With the above-described configuration, relationships among the modulation data represented by Dn, which is the data varied at a clock speed of VCLK, an LD drive current In, voltages V1 and V2 of the capacitors 1610 and 1611, and the resistant value RE of the resistor 1608 can be expressed by an equation;

$$In=\{(V1-V2) \times Dn+V1\}/RE, \qquad (4)$$

wherein values of the light power $P_0$ and $P_1$ are defined as $P_1=P_0/2$ and the controller 1602 and the modulation signal generator 1603 are adjusted to output the modulation data Dn to satisfy upper and lower limits of −1 Dn 1.

With the above-described configuration, the LD controller 1600 can generate light modulation pulses having a desired pulse pattern to control the LD 1606 so as to produce the exposure energy distribution, as shown in FIG. 38 or 39. Accordingly, an image forming apparatus having the LD 1600 can reproduce a high quality image with a superior granularity.

The pulse modulator 1500 described with reference to FIG. 42 is the example in which the clock pulse VCLK having the frequency eight times that of the pixel clock pulse is made based on the pixel clock pulse. It should be noted that the pixel clock pulse itself is made of a reference clock pulse. In the case that the laser diode 1606 of FIG. 45 is used as a light source, a pixel clock pulse generator capable of adjusting a width of the pixel clock pulse since the exposure position (i.e., the scanning position) is deviated due to a chromatic aberration inherent in the optical scanning system, i.e., a chromatic aberration occurring through a magnification, which is caused by a phenomenon of the laser diode 1606 that oscillation cycle is skipped or differences of the oscillation wave lengths among a plurality of light emission parts.

For example, when the conditions are determined such that the number of pixels in one scanning line is 14000, a frequency of the pixel clock pulse is 60 MHz, and accuracies of the pixel positions at both ends of the scanning line are set to a value of a quarter the width of one pixel, a frequency of a reference clock pulse can be calculated in a way of 60 MHz/(14000×4)=1.07 kHz. Therefore, when a single PLL is applied, it is needed to control the PLL with a reference clock having such a frequency of approximately 1 kHz. Consequently, an amount of the phase deviation on the PLL can be detected only at a frequency in unit of 1 kHz and therefore the band width of the PLL control becomes narrowed. In such a condition, the PLL is susceptible to perturbations and, to improve the accuracies of the pixel positions, the requirements of stability to the VCO 1503 constituting the PLL becomes extremely a high level. This problem may be avoided with an application of a double PLL, for example. However, in such a circuit having a double PLL, more jitter will be produced because each PLL produces a jitter. Accordingly, in this case, a cost of manufacturing may be increased.

Figure 46:
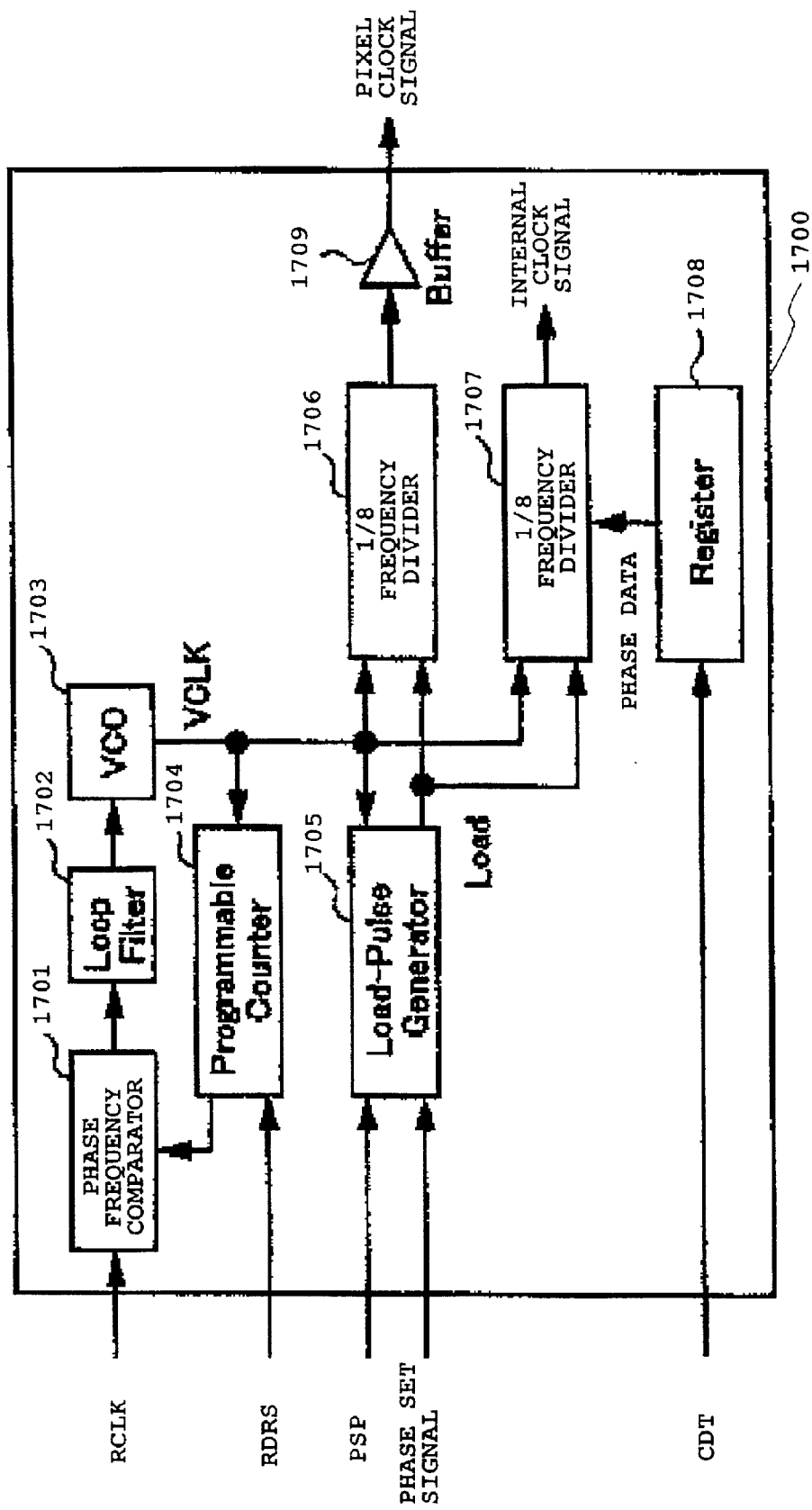
FIGS. 46 and 47 are block diagrams of pixel clock pulse generators according to embodiments of the present invention.

Referring to FIG. 46, a pixel clock pulse generator 1700 which resolves the above-described problem is explained. FIG. 46 shows a block diagram of the pixel clock pulse generator 1700 which includes a phase frequency comparator 1701, a loop filter 1702, a VCO (voltage controlled oscillator) 1703, a programmable counter 1704, a load pulse generator 1705, 1/8 frequency dividers 1706 and 1707, a register 1708, and a buffer 1709.

The programmable counter 1704 performs an N frequency division for dividing the frequency of the clock pulses VCLK into an integral submultiple N. The frequency division ratio N of the programmable counter 1704 is externally predetermined by an input signal called a frequency division ratio signal (FDRS). The phase frequency comparator 1701 compares the resultant output pulses of the N frequency division performed by the programmable counter 1704 with an input signal called a reference clock pulse (RCLK). The loop filter 1702 filters the pulses output from the phase frequency comparator 1701. The VCO 1703 changes its oscillation frequency in accordance with an output voltage from the loop filter 1702. These components which are the phase frequency comparator 1701, the loop filter 1702, the VCO 1703, and the programmable counter 1704 form a PLL (phase-locked loop) circuit.

Thus, the VCLK pulses are produced with the PLL. The load pulse generator 1705 loads phase data 0 to the 1/8 frequency divider 1706 in synchronism with inputs of a phase sync pulse (PSP) and the VCLK. As a result, the 1/8 frequency divider 1706 outputs pixel clock pulses in synchronism with the PSP and having a frequency that is 1/8 of the frequency of the VCLK.

The 1/8 frequency divider 1708 receives a clock pulse delay time signal (CDT) and outputs prestored phase data to the 1/8 frequency divider 1707 in a way similar to that of the 1/8 frequency divider 1706. Accordingly, the 1/8 frequency divider 1707 outputs clock pulses having a phase different from that of the pixel clock pulses. The output clock pulses are called internal clock pulses.

The above-described 1/8 frequency divider 1707 may not be needed when the pixel clock pulses are relatively slow. Also, in a case that a time delay occurring during the time from an output of the pixel clock pulses to an input of image data before the time of transferring image data is not critical, the 1/8 frequency divider 1707 is not required. However, with the pixel clock pulses running at a relatively high frequency, a time delay occurring during the time from an output of the pixel clock pulses to an input of image data before the time of transferring image data generally becomes critical relative to the time when image data synchronized with the output clock pulses of the pixel clock generator is loaded to an apparatus from an external data source. In such a case, the image data may improperly be loaded. To avoid this problem, the pixel clock generator is configured to vary the phase of the clock pulses for loading the image data relative to the output pixel clock pulses in accordance with, for example, the prestored phase data, as in the way the pixel clock generator 1700 is configured.

The load pulse generator 1705 enables and disables the counting operations (i.e., the frequency division) of the 1/8 frequency dividers 1706 and 1707 using a phase set signal. The load pulse generator 1705 catches a rising edge of the phase set signal with the VCLK so that the counting operations of the 1/8 frequency dividers 1706 and 1707 are stopped by one clock cycle of the VCLK. Thereby, the phases of the pixel clock pulses and the internal clock pulses can be shifted to have a lag in steps of a 1/8 clock cycle thereof.

Such a phase shift of the 1/8 clock cycle lag is conducted in a predetermined interval or an interval close to the predetermined interval during one scanning operation so that the frequency of the pixel clock pulses in one scanning operation can be adjusted in a delicate manner without largely changing the frequency itself. This is equivalent to a function that sets the variable frequency step settable to the PLL in a more precise step.

Figure 47:
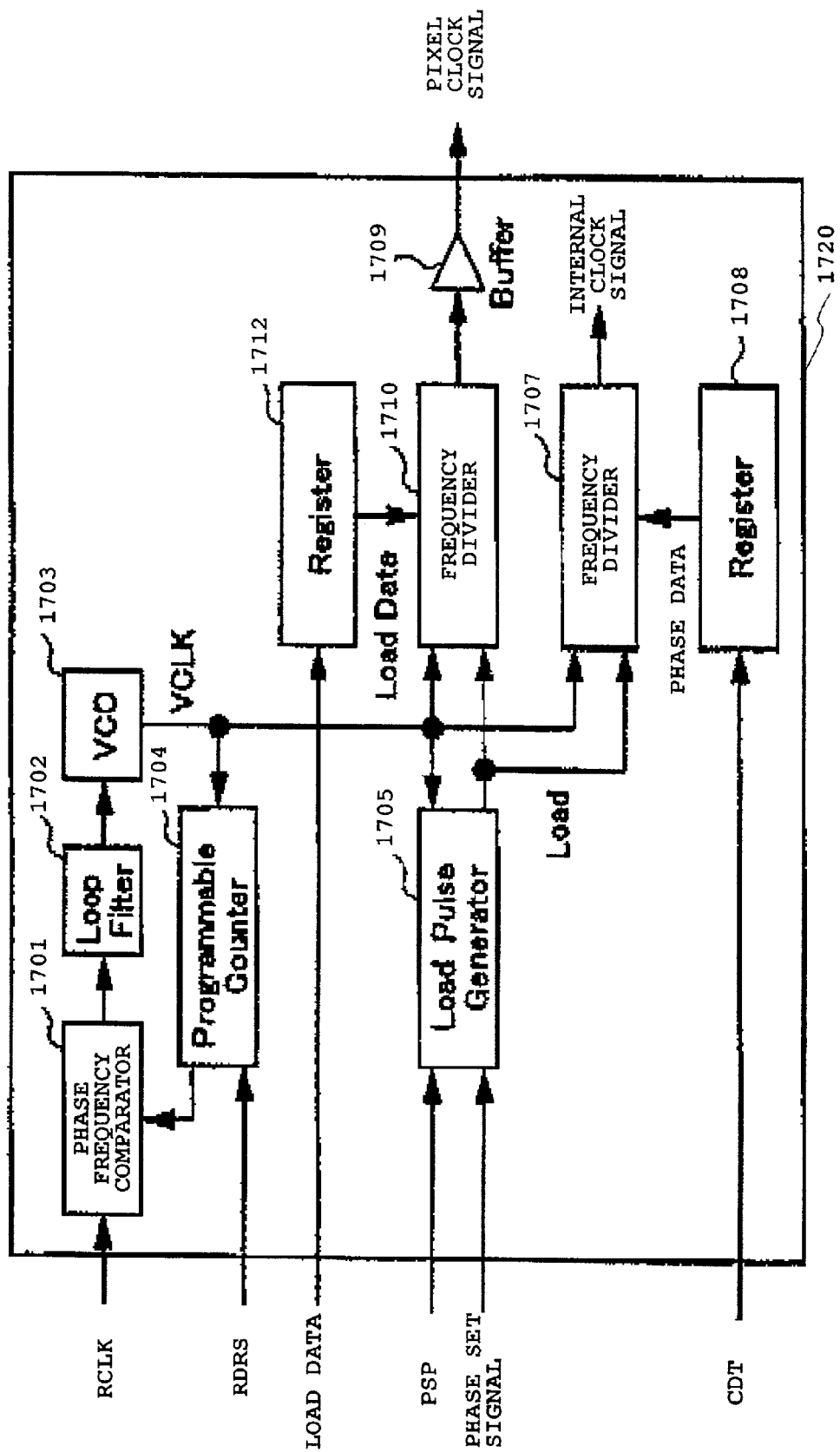

Referring to FIG. 47, a pixel clock pulse generator 1720 is explained. FIG. 47 shows a block diagram of the pixel clock pulse generator 1720 which includes components similar to those of the pixel clock pulse generator 1700 of FIG. 46, except for frequency dividers 1710 and 1711 and a register 1712. This pixel clock pulse generator 1720 is used in the case when the frequency of the pixel clock pulses is precisely adjusted to advance by a 1/8 clock cycle. The frequency divider 1710 is loaded with phase data 1, instead of 0, so that the frequency division number is changed from 8 to 7. Consequently, the clock cycle is shortened by one 1/8 cock cycle.

In the pixel clock pulse generator 1720, the frequency dividers 1710 and 1711 replace the 1/8 frequency dividers 1706 and 1707, respectively, of the pixel clock pulse generator 1700 and the register 1712 is newly added. The register 1712 is loaded with data from an external data source and output data according to the data loaded. The output data from the register 1712 is input to the frequency divider 1710 so that the frequency divider 1710 determines the frequency dividing number.

The clock cycle with an output value 7 from the register 1712 is shorter than that with the output value 8 and the clock cycle with an output value 9 is longer than that with the output value 8.

As an alternative, it is also possible to perform a delicate adjustment of the pixel clock cycle to obtain a preferable image using a method in that a pixel clock cycle is initially shortened and such pixel clock cycle is gradually delayed in steps of a 1/8 clock cycle.

Here, in a multiple beam optical scanning system using a laser diode having a plurality of light emission portions, differences in wave lengths of pulses which are oscillated by the respective light emission portions of the laser diode may cause a problem that an image position is deviated from a scanning line to a scanning line or a problem that an image has an uneven density in a highlight part thereof. This is because differences in the wave lengths of pulses produce deviations in scanning widths of the respective light beams due to a chromatic aberration inherent in the optical scanning system that scans the surface with the light beams to make a focus thereon. As a result, such a problem may degrade an output image quality.

The pixel clock pulse generator 1720 avoids the above-described problem by correcting the deviations of the scanning widths with the above-described phase shift so as to cause the scanning by the respective light emission portions to start from desired positions aligned on the scanning surface. With this correction by the phase shift, a light emission portion causing an expanded scanning is corrected to be made shorter and a light emission portion causing a shortened scanning is corrected to be made longer. On the other hand, in the case the pixel clock pulses are initially shortened, respective of light emission portions causing an expanding scanning and a shortened scanning are corrected with the change of the phase shift amount.

The market demand for a high image quality reproduction is constantly increasing and, consequently, it increases the requirements for the specification of an optical scanning system towards a high density and a high accuracy. However, to improve the performance of the optical scanning system with the conventional method, it may be needed to add extra components (i.e., a lens and a mirror) or special materials (i.e., a glass material) or components having a special surface, which increase the cost of manufacturing. In this case, a special process for making a special surface may be required, which also increases the cost of manufacturing.

The pixel clock pulse generator according to the present invention is configured to improve the most performances of the optical scanning system with allowing degradation to some extent in the constant scanning speed so that a high density and high accuracy optical scanning system can be fabricated in a relatively easy way and in a relatively low cost without the needs of the above-described cost increase factors. More specifically, by using the phase shift correction, the constant scanning speed is corrected in a range up to ±10%. The phase shift correction is advantageous in designing an optical scanning system and consequently in the cost of manufacturing as well as the process of preparing the optical components.

On the other hand, in a case that a laser diode array is tilted, the light emission points are displaced with the distance d in the main scanning direction, as explained with reference to FIGS. 33A and 33B. Accordingly, deviations occur on the scanning start positions on the photosensitive surface for the light beams emitted from the respective light emission points. In this case, the amount of each deviation on the photosensitive surface is the space d multiplied by a magnification ratio in the main scanning direction of the total optical scanning system.

Figure 48:
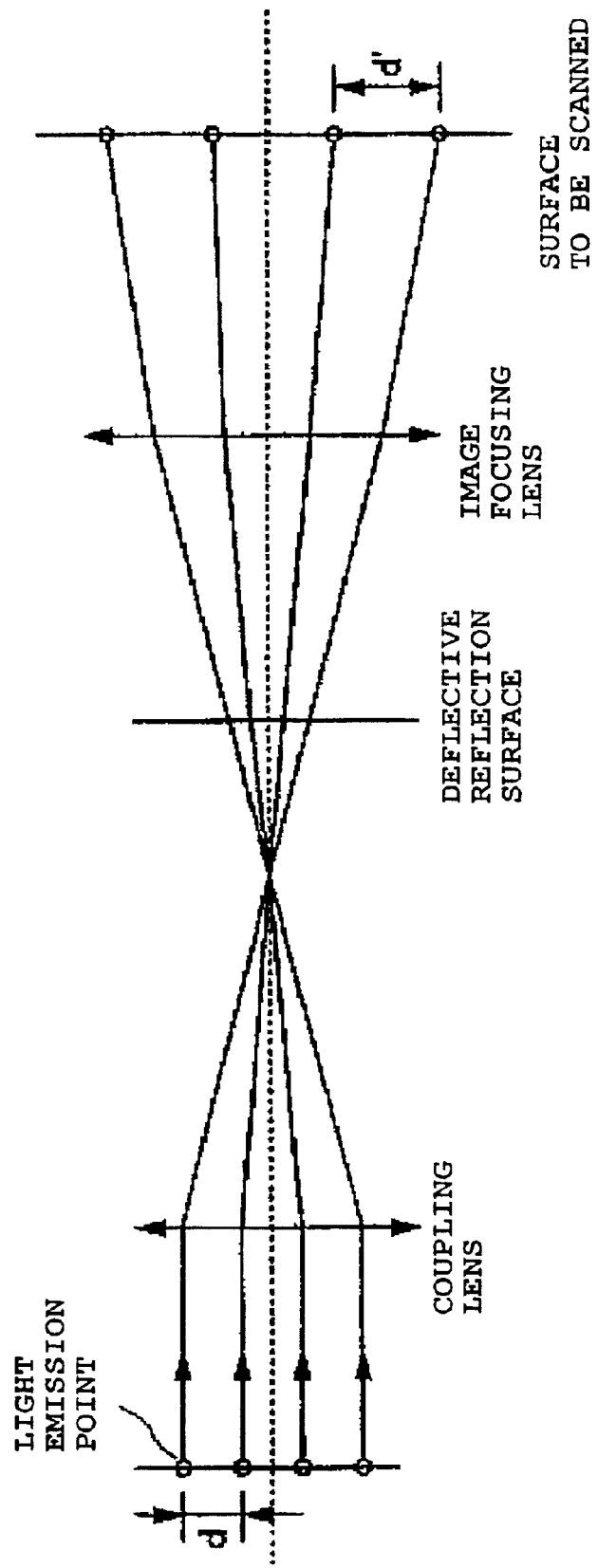
FIG. 48 is an illustration for explaining a relationship between spaces between adjacent two of a plurality of light emission points and spaced of adjacent two of a plurality of scanning laser light spots on a scanning surface.

The above-mentioned deviation of the scanning start positions is further explained in detail with reference to FIG. 48. FIG. 48 shows a relationship between spaces between two adjacent ones of a plurality of light emission points and spaces between two adjacent one of a plurality of light beam spots on the scanning surface, in a cross-section plane in the main scanning direction. In FIG. 48, two adjacent ones of the light beams are aligned in spaces d at the light emission points and, when they reach the scanning surface, the two adjacent ones of the light beams are aligned in spaces d' according to a magnification based on a ratio between focal lengths of a coupling lens and an image focus lens. That is, the scanning light beams form respective light spots on the scanning surface by a light-gathering action of the image focusing lens and run on the scanning surface. During the scanning, the two adjacent ones of the light spots run on the scanning surface with space d' in the main scanning direction. In this process, the following relationship is satisfied;

$$|d'|=|âm\ d| \qquad (5)$$

wherein âm represents the total magnification of the entire optical scanning system in the main scanning direction.

Even in a case that a laser diode array is not tilted, deviations occur on the scanning start positions on the photosensitive surface for the light beams emitted from the respective light emission points. This is because the positions of the light emission points are deviated due to fabrication errors of the laser diode array. In addition, when a light source is formed of a plurality of laser diodes, the light emission points are deviated in the main scanning direction. Therefore, when the light beams emitted from the respective light emission points reach the photosensitive surface, the scanning start positions may be deviated, as in the case where the laser diode array is tilted.

Since the above-described deviations of the scanning start positions in the main scanning direction will eventually result in a degradation of an image quality, it is needed to correct for the scanning start positions, as in the case where the laser diode array is tilted.

The above-described deviations of the light emission points can alternatively be expressed as a case in which the light emission points of the laser diode have different positions relative to an axis orthogonal to the deflection scanning plane (i.e., the main scanning direction). Under such a condition, that is, when the positions of the light emission points of the laser diodes are not aligned on an axis orthogonal to the deflection scanning plane, the positions for the light emission points to start the scanning on the photosensitive surface are deviated in the main scanning direction and, as a result, the image may appear to have jagged edge portions.

Figure 49:
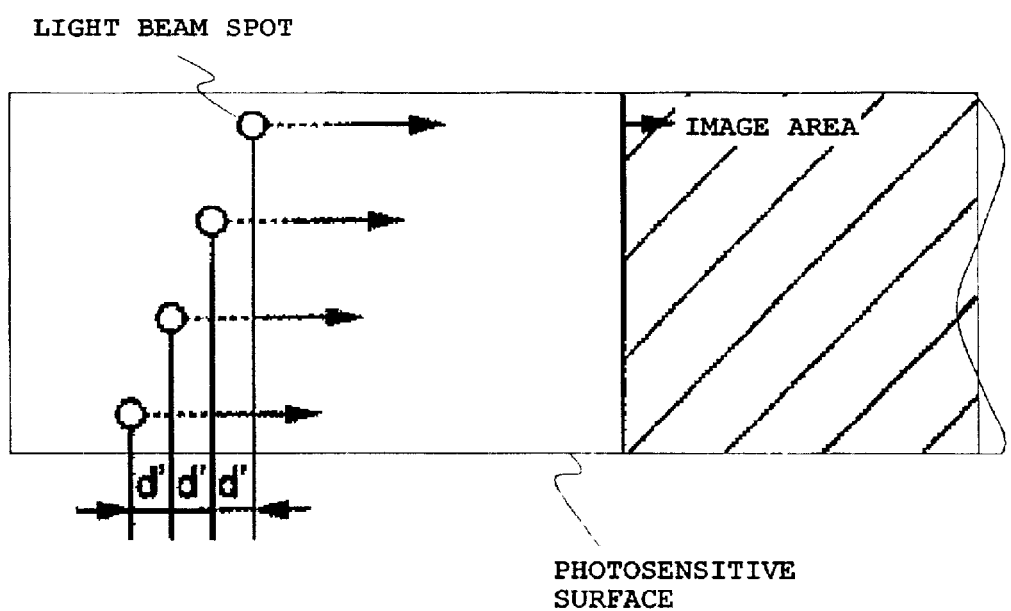
FIG. 49 is an illustration for explaining a relationship between the scanning laser light spots and an image area of the scanning surface.

This phenomenon is explained with reference to FIG. 49. FIG. 49 demonstrates the way how the light beam spots scan on the photosensitive surface to be scanned.

In FIG. 49, with the configuration of a tilted laser diode array having four laser light emission points, for example, the respective light beams spots emitted therefrom run on the photosensitive surface with the space d' between two adjacent light beam spots. In this operation, the running laser light beams are detected by a synchronous detection optical mechanism (not shown) mounted before an image region of the photosensitive surface and, according to this detection, the oscillation control of the laser diode array in accordance with the image modulation signal is started in a predetermined time period so that the laser light spots write an electrostatic latent image on the photosensitive surface in accordance with the image modulation signal. Since the laser light spots are running at different positions in the main scanning direction, there is a first laser light beam that will be first detected by the synchronous detection optical mechanism. Based on the detection of the first laser light beam, the timing of the oscillation control for all the laser light spots are taken. As a result, the start positions of the laser light beams to write an image in the image region are not aligned in the sub-scanning direction. This will eventually lead to a degradation of an image quality.

This problem can be avoided with an application of the above-described pixel clock pulse generator. That is, the pixel clock pulse generator can adjust the phase shift such that the laser light spots other than a last laser light spot which last comes into the image region of the photosensitive surface are delayed with the phase shift to start writing in the image region at the same time when the last laser light spot comes into the image region. Thereby, the writing start positions of the laser light spots are aligned in the sub-scanning direction in the image region of the photosensitive surface.

In FIG. 49, if the space d' is equivalent to the length of an N/8 clock cycle, a control signal for controlling the first laser light beam is shifted by an N/8 clock cycle multiplied by three (i.e., a 3×N/8 clock cycle) so that the writing start position of the first laser light spot can be aligned in the sub-scanning direction with that of the last laser light spot. Likewise, the second laser light beam is shifted by a 2×N/8 clock cycle and the third laser light beam is shifted by a 3×N/8 clock cycle.

The last laser light beam is used as a reference laser light beam in the above example. However, according to the present invention, a reference laser light beam is not limited to the last laser light beam but any one of the laser light beams. In using other laser light beams than the last one, an arbitrary amount of the phase shift to advance or to delay the phase.

In this way, with the laser diode array configured to be tilted, it is possible to adjust the writing start positions of the laser light spots to align in the sub-scanning direction in the image region of the photosensitive surface.

It is generally possible to set variable frequency steps in a precise manner to the PLL of FIGS. 46 and 47, for example, by an arrangement in which a relatively wide range of the frequency division is set to the programmable counter 1705 and, at the same time, the frequency of the reference clock cycle is decreased or the frequency of the VCLK is increased. However, with this arrangement, the variations in the frequency of the VCLK can only be detected by the reference clock cycle since the frequency of the reference clock cycle is decreased. This leads to a critical engineering problem with respect to a stability of the oscillation frequency of the VCO 1703.

For example, when the conditions are determined such that the number of pixels in one scanning line is 14000, a frequency of the pixel clock pulse is 60 MHz, and accuracies of the pixel positions at both ends of the scanning line are set to a value of a quarter the width of one pixel, a frequency of a reference clock pulse can be calculated in a way of 60 MHz/(14000×4)=1.07 kHz. Therefore, when a single PLL is applied, it is needed to control the PLL with a reference clock having such a frequency of approximately 1 kHz. Consequently, an amount of the phase deviation on the PLL can be detected only at a frequency in unit of 1 kHz and therefore the band width of the PLL control becomes narrowed. In such a condition, the PLL is susceptible to perturbations and, to improve the accuracies of the pixel positions, the requirements of stability to the VCO 1503 constituting the PLL becomes extremely a high level. This problem may be avoided with an application of a double PLL, for example. However, in such a circuit having a double PLL, more jitter will be produced because each PLL produces a jitter. Accordingly, in this case, a cost of manufacturing may be increased. On the other hand, the oscillation frequency of the VCO 1703 is needed to be increased since the frequency of the VCLK is increased, which is another critical engineering problem.

For the above-described problems, the pixel clock pulse generators 1700 and 1720 is able to set the frequency step to a value higher than the oscillation frequency of the VCO 1703 when the oscillation frequency of the VCO 1703 is increased or a value higher than the oscillation frequency of the VCO 1703 when the oscillation frequency of the VCO 1703 is stabilized.

Also, it is possible to resolve discontinuity of the exposure energy amount by a suspension of the laser light beams during one N/8 clock cycle for generating the phase lag based on the phase set signal.

Further, it is also possible to configure the mechanism such that the phase set signal is set during the time the laser light beams are not emitted, or to configure the mechanism such that the phase set signal is set at the position different from a scanning line to another scanning line. Also, it is possible to configure the mechanism such that the phase set signal is set only at the first line of a page. Further, it is possible to configure the mechanism such that the phase set signal is set at intervals of a predetermined or arbitrary time period during the machine power on time. In this case, the intervals of the predetermined or arbitrary time period may be measured with a built-in clock, a time counter, or the like.

In this way, the pixel clock pulse generators 1700 and 1720 are able to change the amount of the phase shift to adjust the phase of the pixel clock pulses without causing an adverse effect to the output images. In addition, the pixel clock pulse generators 1700 and 1720 are able to control the position of each pixel in a 1/8 clock cycle by increasing or decreasing the phase set signal in a constant step at the scanning start time in each scanning operation. For example, a value of the phase set signal is changed from 1/8 to 2/8, then from 2/8 to 3/8, then from 3/8 to 4/8, then from 4/8 to 5/8, then from 5/8 to 6/8, then from 6/8 to 7/8, and then from 7/8 to 0.

With the above-described configuration, it becomes possible to adjust a screen angle of an output image to reproduce an image of a high quality. In addition, the timing for changing the phase of the pixel clock pulses can be set to an arbitrary value so as to be flexible to various conditions.

Figure 50:
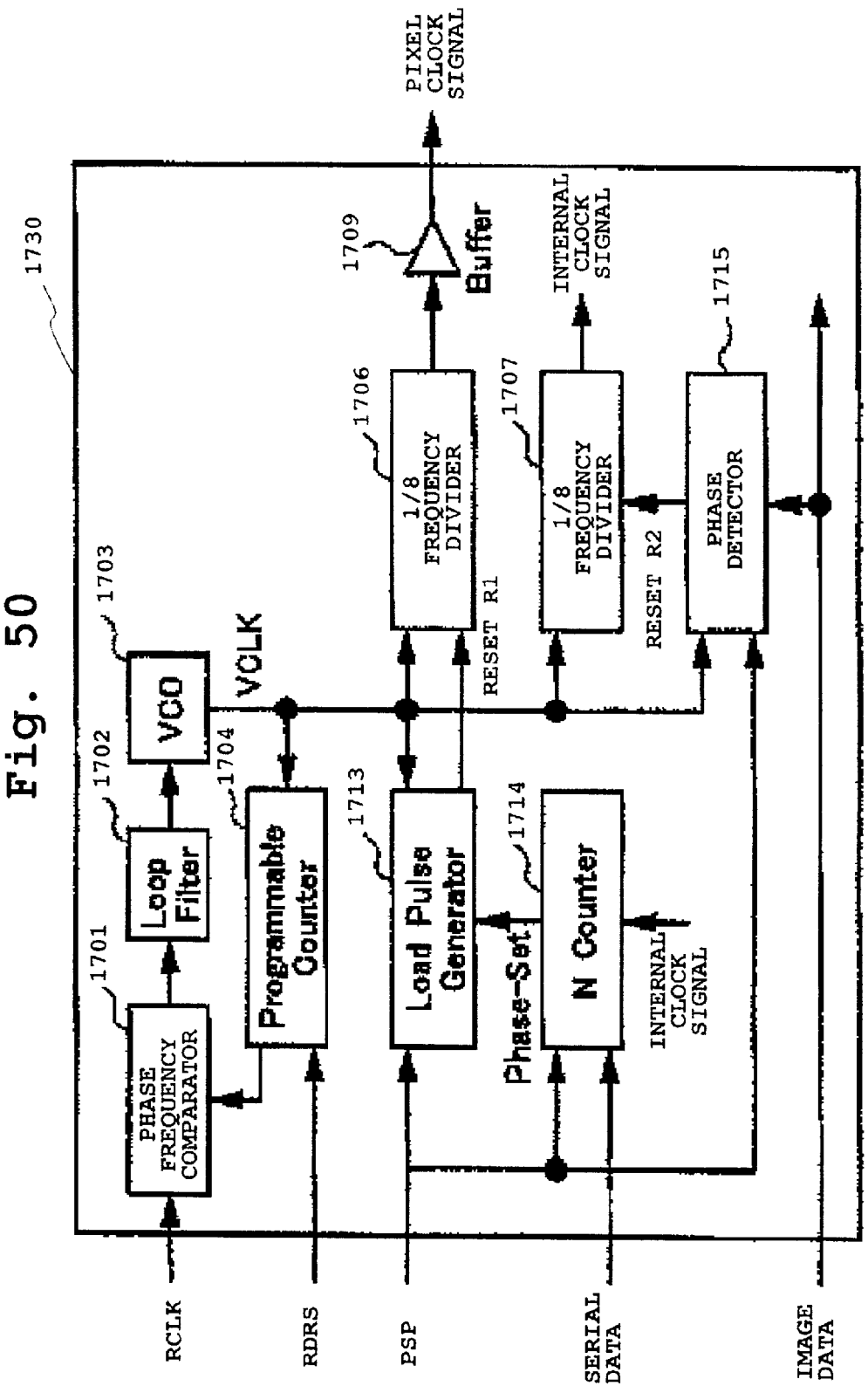
FIG. 50 is a block diagram of another pixel clock pulse generator according to an embodiment of the present invention.

Referring to FIG. 50, a pixel clock pulse generator 1730 is explained. FIG. 50 shows a block diagram of the pixel clock pulse generator 1730 which includes components similar to those of the pixel clock pulse generator 1700 of FIG. 46, except for a load pulse generator 1713, an N counter 1714, and a phase detector 1715. The pixel clock pulse generator 1730 is configured to automatically send the phase set signal each time of an N count by the N counter 1714 to delay the phase by one 1/8 clock cycle.

In the pixel clock pulse generator 1730, the optical modulation pulses are not output during the above-mentioned one 1/8 clock cycle. Even with such a configuration, the exposure energy distribution D1 shown in FIG. 38 is not discontinued. This is because of the configuration in which the laser light beams are switched off only during the time sufficiently short relative to the diameter of the laser light beams emitted by the laser diode. A condition that the timing to switch off the laser light beams is on a breakpoint of pixel contributes to discontinuation of the exposure energy distribution D1. A count value N of the N counter 1714 can be determined by an external apparatus.

The pixel clock pulse generator 1730 configured in this way can set a frequency step which cannot be set directly to the PLL, thereby setting the phase set signal in extremely small steps without changing the clock cycle.

There is another case to be considered. In this case, a deflector of a polygon scanner or the like have variations in distance from the deflective reflection surface to the rotation axis. Such variations may cause variations in the scanning widths of the laser light spots running on the photosensitive surface.

In the scanning operation, the laser diode array is driven to emit the laser light beams in accordance with a writing signal which is generated in a predetermined time period after the detection of the synchronous light. Then, the emitted laser light beams are detected so that a line of data are transmitted to each laser light beam line. By repeating such process, a latent image is written on the photosensitive surface. However, the latent image may have deviations in the scanning lengths of the respective scanning lines due to the above-mentioned problem of the deflector of the polygon scanner or the like. Such a deviation appear particularly in an edge portion of an image, as in the case of the errors of the writing magnification, and the deviations in an edge where the writing is ended appear to be a jitter around edges of an image.

The above-described deviations in the scanning widths can be corrected by shifts of the phases of the pixel clock pulses and the internal clock pulses. That is, the phase shifts are arranged such that the writing ends by the laser light spots are justified. However, it should be noted that the deviations in the scanning widths due to the deflector appear by the change of the deflective reflection surfaces and therefore in a cycle of the change of the deflective reflection surfaces. Therefore, it is needed to determine which deflective reflection surface is in the present scanning operation.

In one exemplary method for determining which deflective reflection surface is in the present scanning operation, a mark is provided to an upper part of the deflector and each time the mark is detected one rotation is realized. Further, in this method, an input signal is obtained by a synchronous detection system before a start of each scanning. With these two types of information, the determination which deflective reflection surface is in the present scanning operation can be made.

Figure 51:
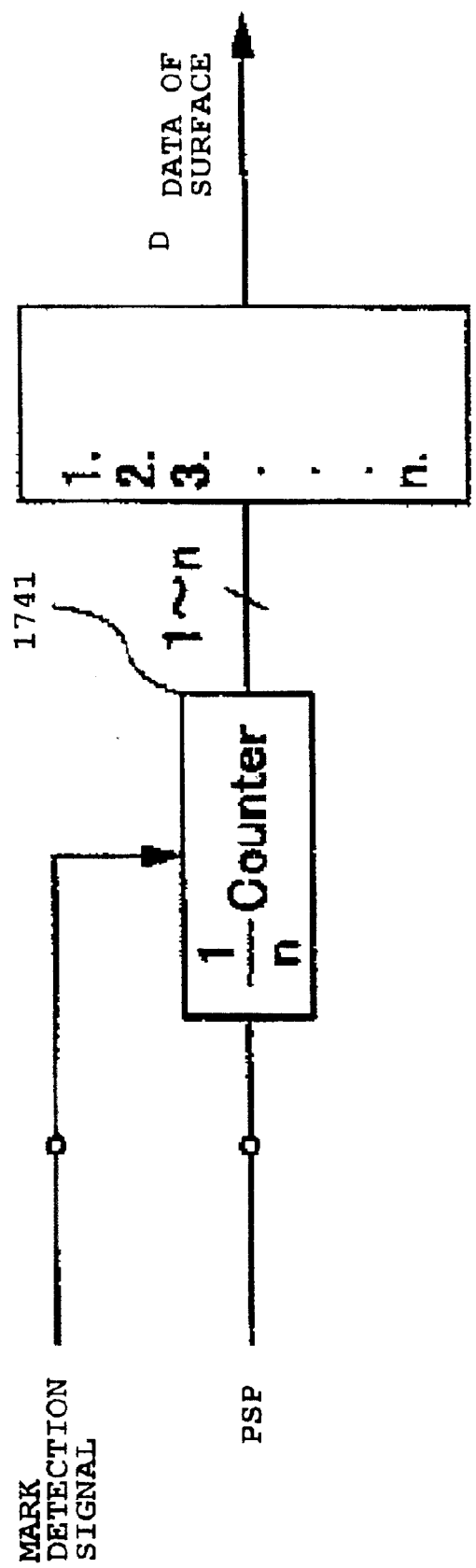
FIG. 51 is a block diagram of a circuit for determining which deflective reflection surface is currently generating the scanning laser light beams.

This operation is further explained with reference to FIG. 51. In FIG. 51, a 1/n counter 1741 is reset by a mark detection signal sent from a deflector. After setting, the 1/n counter 1741 restarts counting the phase synchronous pulse (PSP) so that first, second, third, and nth surface are counted.

After that, the 1/n counter 1741 is again reset with a mark detection signal. This process is repeated and therefore it becomes possible to determine which deflective reflection surface is in the present scanning operation.

Figure 52:
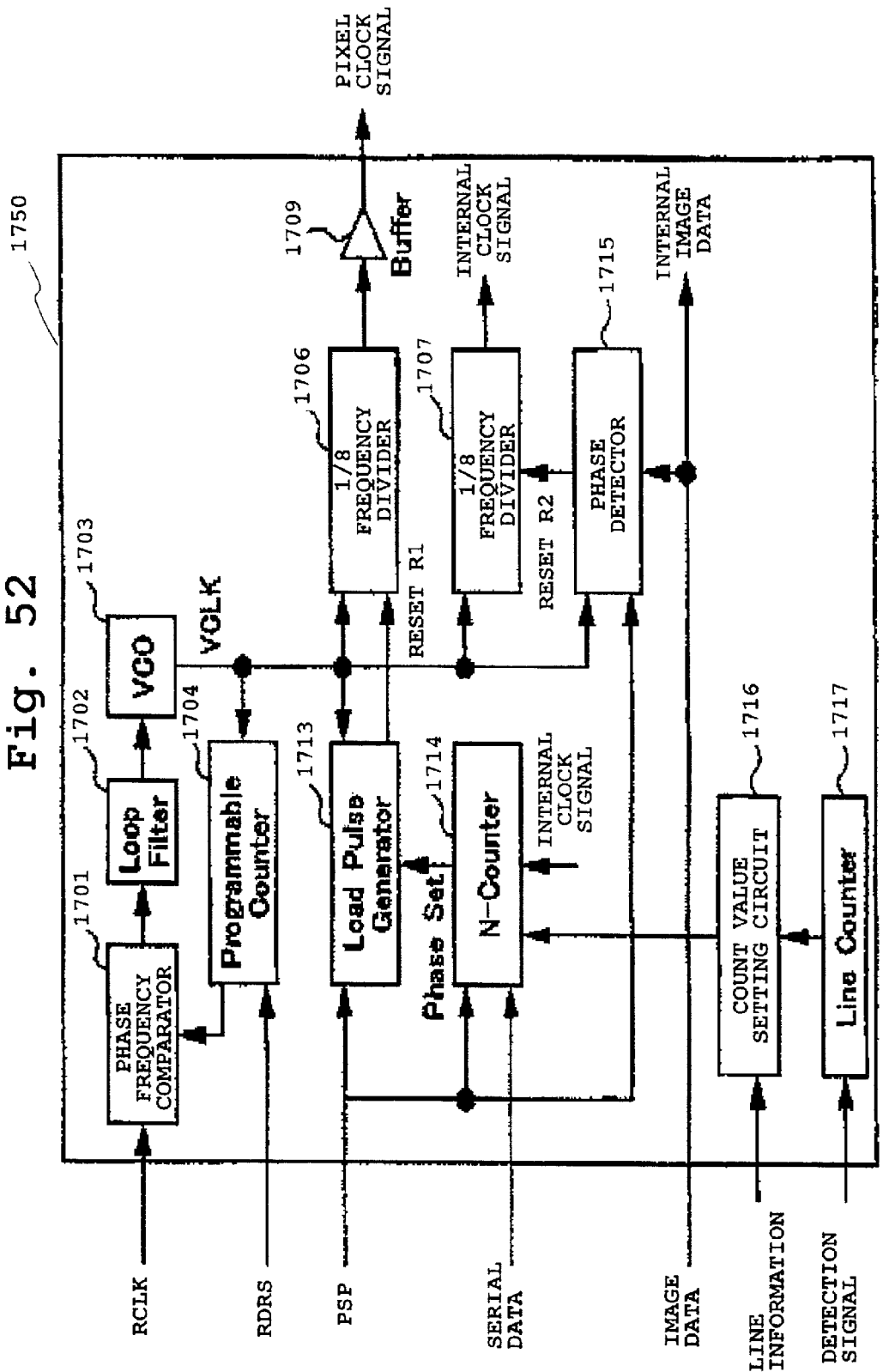
FIG. 52 is a block diagram of another pixel clock pulse generator according to an embodiment of the present invention.

FIG. 52 shows a block diagram of a pixel clock pulse generator 1750 which generates pixel clock pulses after the above-described determination which deflective reflection surface is in the present scanning operation, as shown in FIG. 51.

As shown in FIG. 52, the pixel clock pulse generator 1750 includes components similar to those of the pixel clock pulse generator 1720 of FIG. 50, except for a count value setting circuit 1716 and a line counter 1717.

In this example, the information for each deflective reflection surface is prestored as line information in an external memory or the like to solve a problem of deviations in the scanning widths due to the variations of the deflective reflection surfaces. The count value setting circuit 1716 receives the line information according to an identification signal output from the line counter 1717 for identifying which deflective reflection surface is used to scan the photosensitive surface. Then, the count value setting circuit 1716 determines a way how to shift the phases of the pixel clock pulses and the internal clock pulses on a basis of the line information. The number of the identified reflection surfaces of the deflector is determined through the operation explained with reference to FIG. 51. The count value setting circuit 1716 loads the line information according to the data (i.e., the identification data) sent from the line counter 1717 and sets a count value. The N counter 1714 generates a phase set signal based on the count value sent from the count value setting circuit 1716 and shifts the phase of a signal generated by the following circuit.

The above-described operations do not depend on the number of the light sources. Therefore, this configuration can be applied to the optical scanning system having a plurality of light sources as well as that having a single light source.

Figure 53:
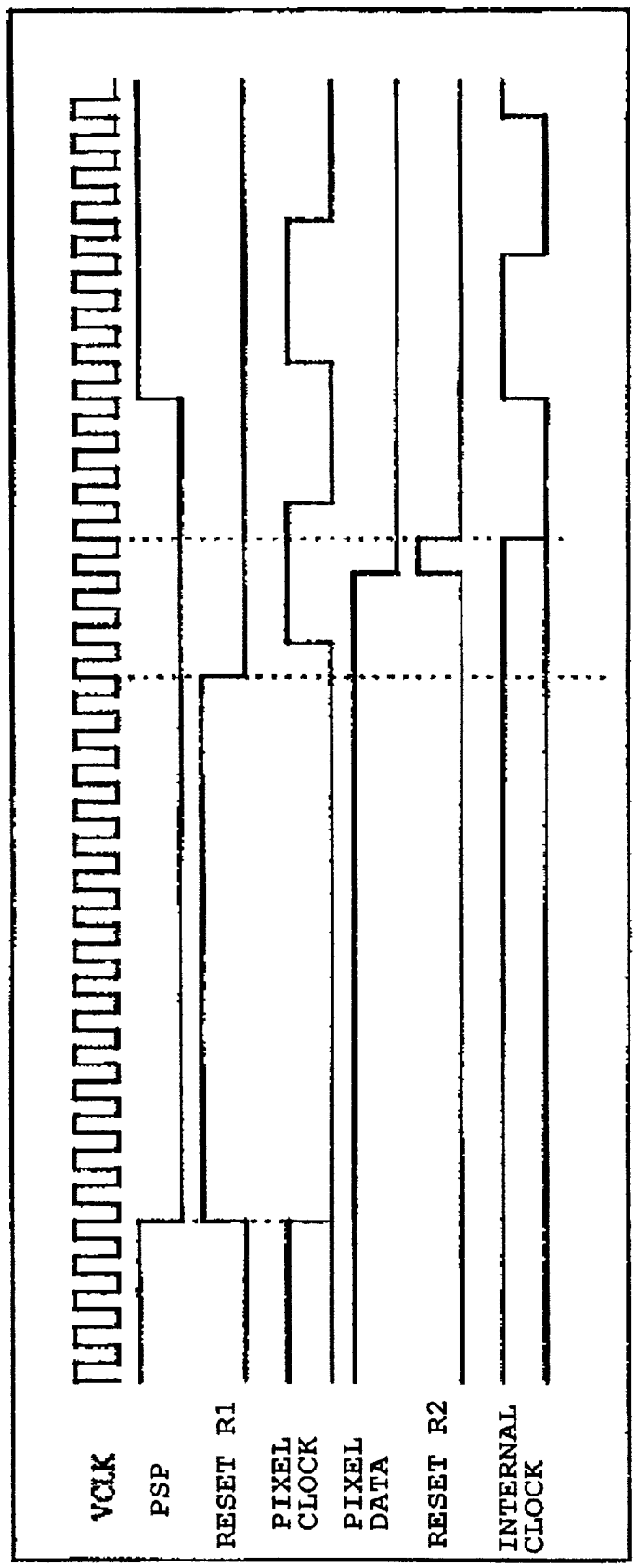
FIG. 53 is a time chart of signals operating in the pixel clock pulse generator of FIG. 46.

FIG. 53 shows operations of various signals in the pixel clock pulse generator 1730 or 1750 when the pixel clock pulse generator 1730 or 1750 controls the phase of the internal clock pulses relative to the pixel clock pulses in accordance with the phase data. In FIG. 53, signals are the VCLK, the phase synchronous pulses, a reset R1, the pixel clock pulses, image data, a reset R2, and internal clock pulses. In this case, the pixel clock pulse generator 1730 or 1750 is set to a condition that the signals operate as shown in FIG. 53 when the phase set signal is in a low state. Thus, the phase synchronous pulses are always effective when the phase set signal is low and therefore the pixel clock pulse generator 1730 or 1750 can control a relationship of the phase between the internal clock pulses and the image data. On the other hand, the phase set signal can be set into a low state only during the power-on time so that a default value of the phase difference can be maintained.

Figure 54:
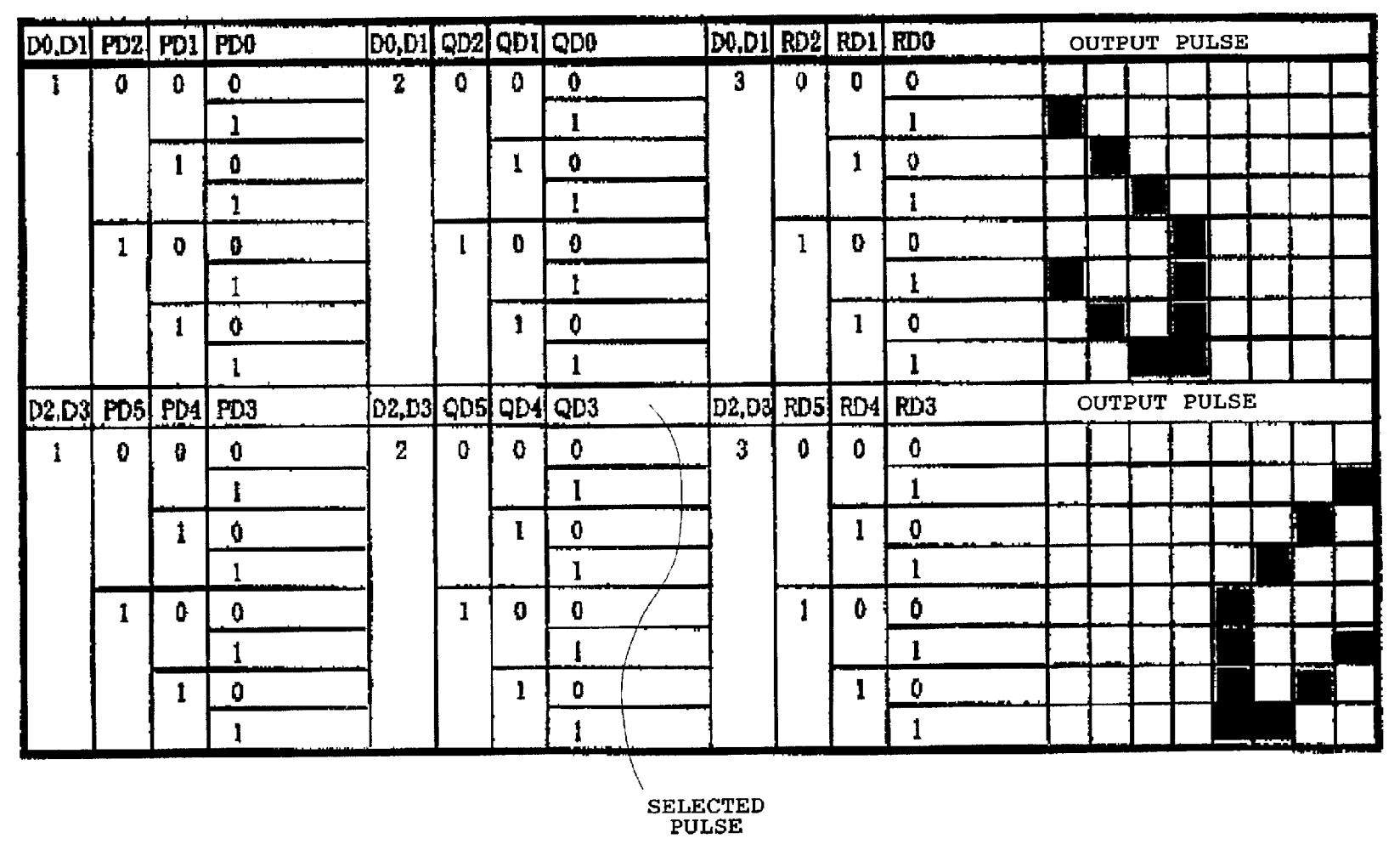
Figure 55:
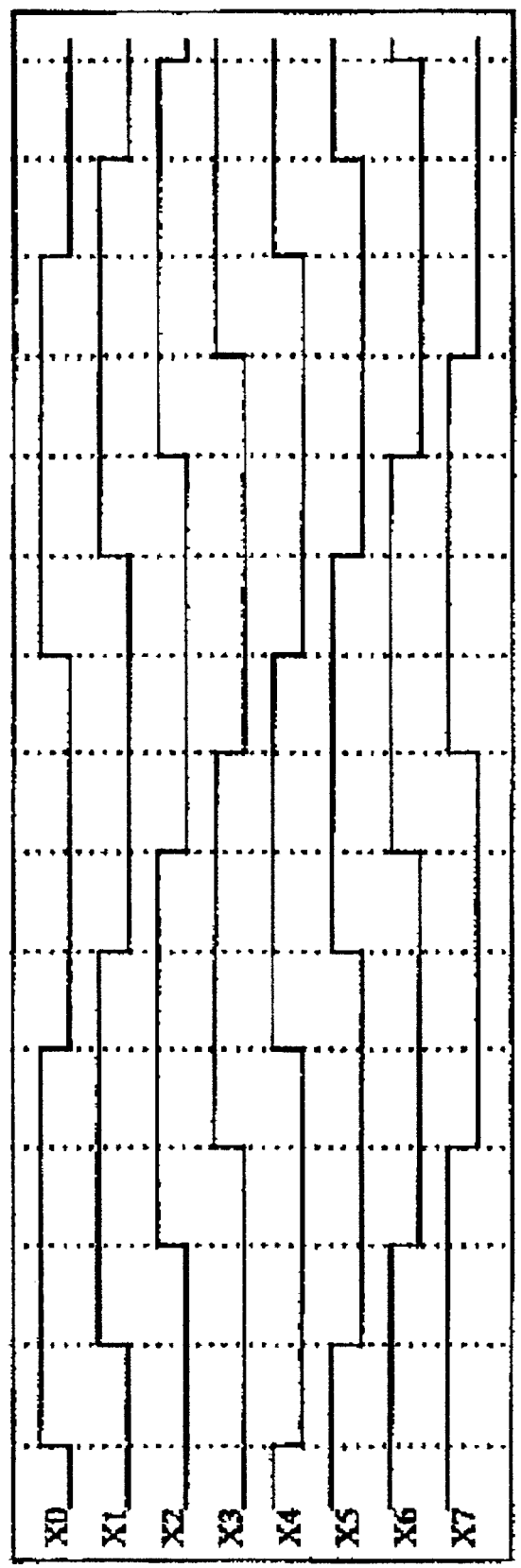
FIG. 55 is a time chart showing eight phase pulses for frequency dividing the VCLK when the modulation data shown in FIG. 54 is used.

FIG. 54 shows an example of modulation data which is output by the LUT 1507 and of which bit number is reduced relative to the case of FIG. 42. In the example being explained, independent pulses can be selected in the right and left positions to the center of a pixel. When using such particular data of FIG. 54, it is preferable to provide a lookup table for selecting the pulses of eight phases for dividing the frequency of the VCLK with eight frequency division shown in FIG. 55 rather than the pulses of the 8-bit shift register 1505 of FIG. 42. Thereby, it becomes possible to generate the pulses at arbitrary positions.

With the above-described configuration, the size of the circuit of the LUT 17 shown in FIG. 42 can be reduced and therefore it is advantageous to obtain the light modulation pulses shown in FIGS. 39 and 41 at a relatively low cost of manufacturing.

Figure 56:
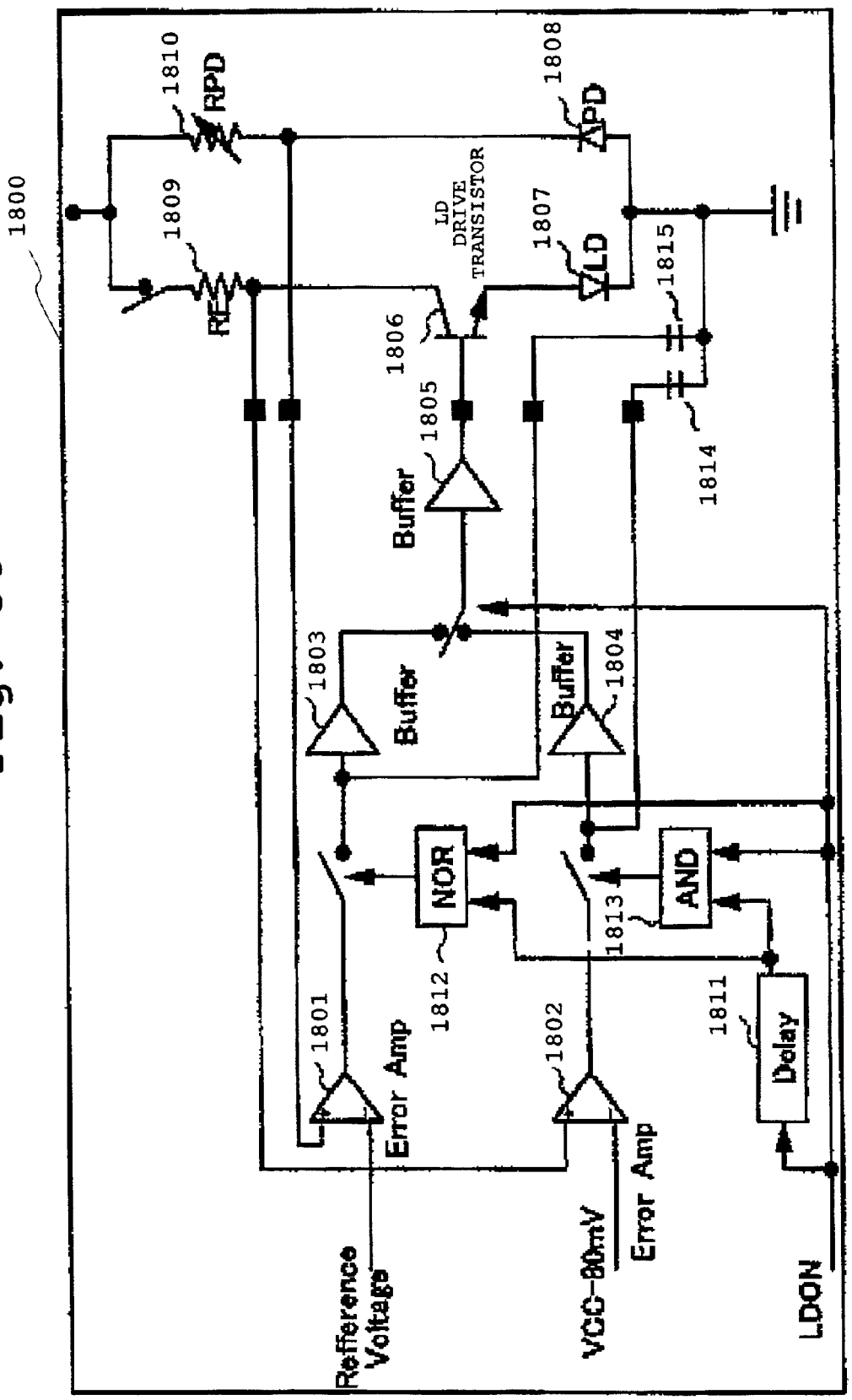
FIGS. 56–58 are block diagrams of laser control circuits according to embodiments of the present invention.

Referring to FIG. 56, a laser control circuit 1800 is explained. The laser control circuit 1800 shown in FIG. 56 controls a peak value of optical output power intensity and a bias current of a cathode-common laser diode so as to drive the laser diode.

In FIG. 56, a photoreceptor (PD) 1808 detects output light and converts the light into an electric signal according to the optical power of the detected light, and an error amplifier 1801 converts the electric signal output from the photoreceptor 1808 into a voltage to compare it with a reference voltage. A control value output from the error amplifier 1801 is held by a holding capacitor 1815.

An error amplifier 1802 controls a voltage across the terminals of a resister 1809 having a resistance value RE so that a power source voltage VCC is 80 mV. A control value output from the error amplifier 1802 is held by a holding capacitor 1814.

The error amplifier 1801 is initiated to perform the above-described control in a predetermined time period after a signal LDON for energizing a laser diode 1807 is made active. Also, the error amplifier 1802 is initiated to perform the above-described control in a predetermined time period after the signal LDON is made non-active so that a bias current is constant when the laser diode 1807 is switched off.

With the above-described control for activating the error amplifier 1801 in the predetermined time period after the activation of the signal LDON, a generation of errors according to various delay factors is avoided. The delay factors include, for example, a response time for the photoreceptor 1808 to convert the laser light emitted from the laser diode 1807 into a current, a conversion time for converting the current generated by the photoreceptor 1808 to a voltage signal, and a transmission time in which the voltage signal is transmitted to the error amplifier 1801.

Likewise, in the control of the bias current, a generation of errors according to various delay factors is avoided with the above-described control for activating the error amplifier 1802. In addition, the laser diode 1807 is connected to the emitter of a bipolar LD drive transistor 1806 so that the base voltage of the bipolar LD drive transistor 1806 is transmitted to the laser diode 1807 with a delay as less as possible. Thus, the laser control circuit 1800 of FIG. 56 is configured to control the voltage across the terminals of the laser diode 1807 to a predetermined value so as to obtain a desired optical output power and to perform a high speed modulation of the laser light beam.

Figure 57:
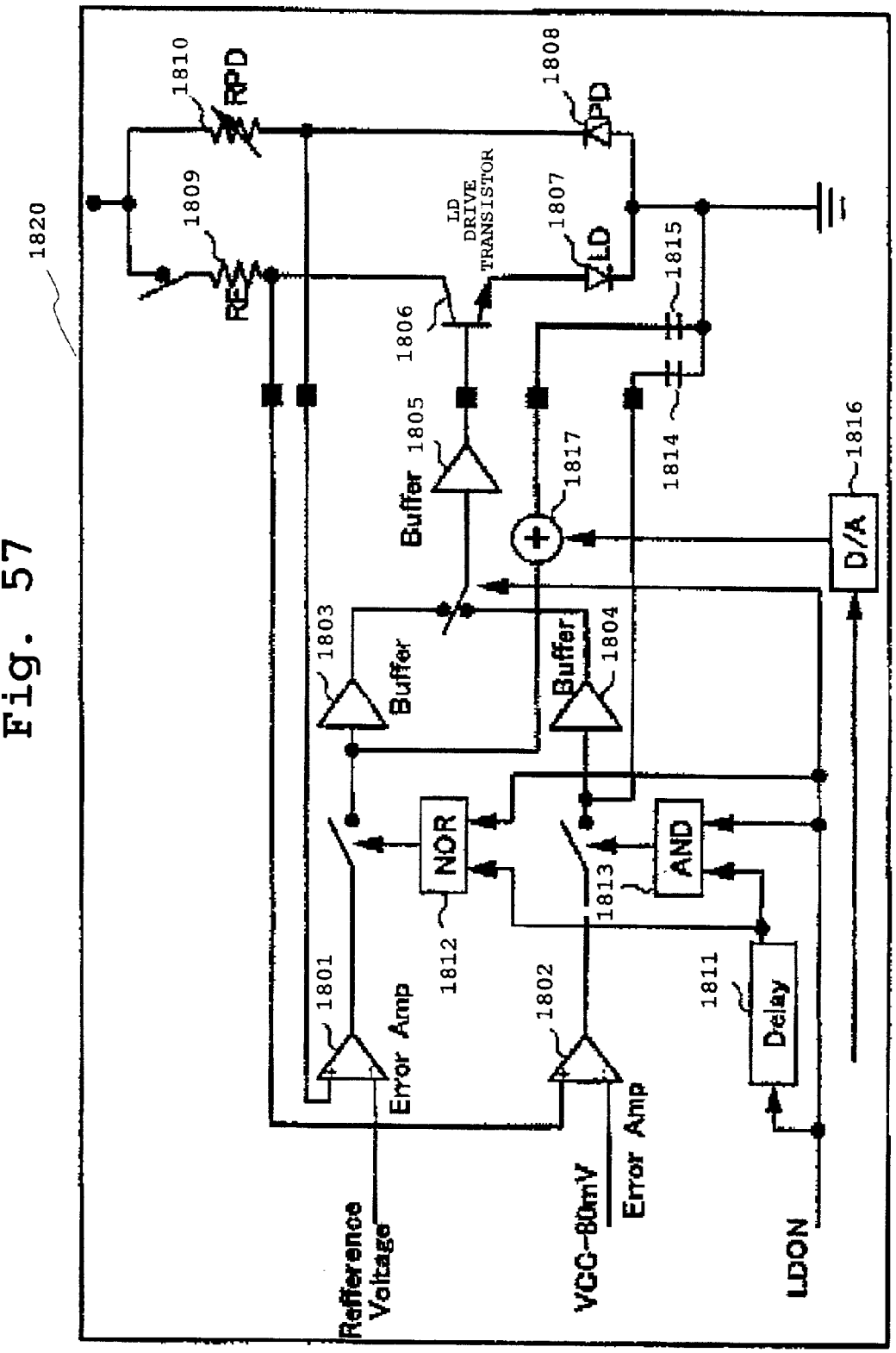

FIG. 57 shows a laser control circuit 1820. The laser control circuit 1820 of FIG. 57 has a configuration similar to that of FIG. 56, except for a D/A (digital-to-analog) converter 1816 and an adder 1817 for performing a shading correction. The shading data is externally input to the D/A converter 1816 which converts the shading data into an analog value. The adder 1817 adds the analog value output from the D/A converter 1816 to the control value held by the holding capacitor 1815. Thereby, the control voltage that controls the laser diode 1807 reflects the value of the shading data.

Figure 58:
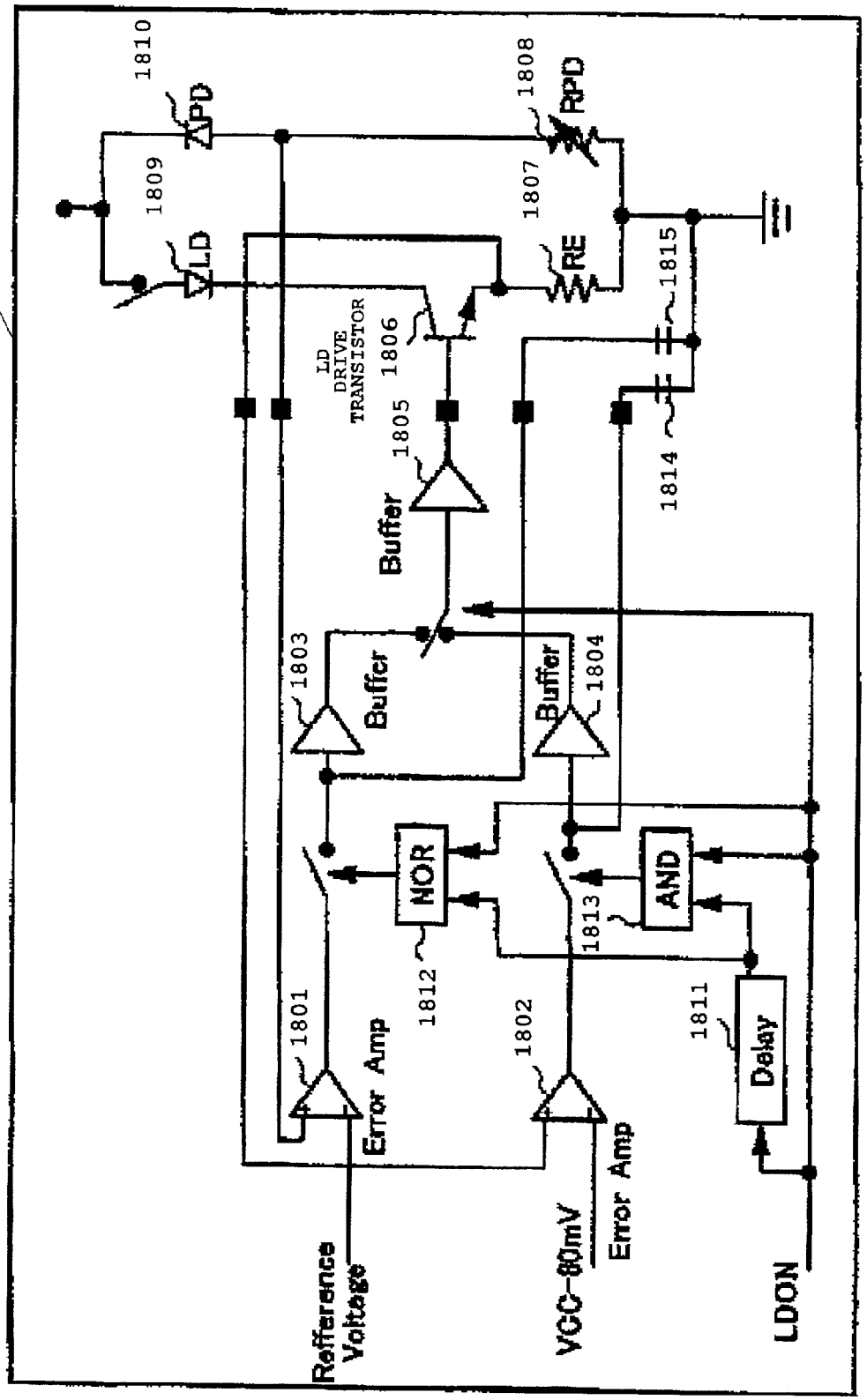

FIG. 58 shows a laser control circuit 1850. The laser control circuit 1850 of FIG. 58 has a configuration similar to that of FIG. 56, except for a connection of the laser diode which is an anode-common type. In the circuit shown in FIG. 58, the laser diode 1807 is connected to the collector of the bipolar LD drive transistor 1806. This configuration makes the circuit of FIG. 58 substantially equivalent to the circuit of FIG. 56 that uses the cathode-common laser diode. As a result, the circuits can be implemented into an integrated circuit chip to be commonly used for both the cathode-common and anode-common laser diodes.

Figure 59:
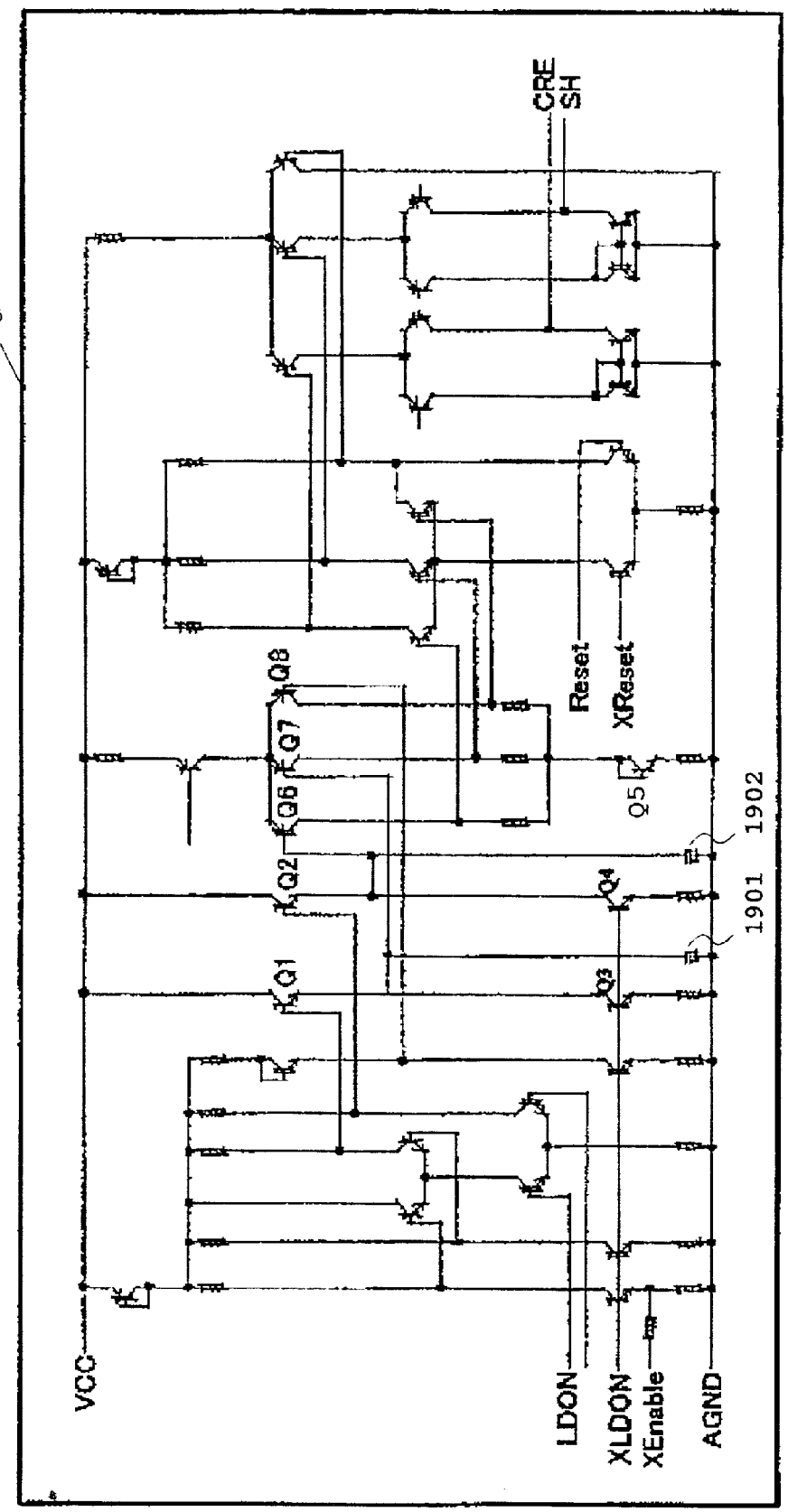
FIGS. 59 and 60 are block diagrams of LD control timing generators according to embodiments of the present invention.

Referring to FIG. 59, an LD control timing generator 1900 for generating timings for controlling the laser diode is explained. The LD control timing generator 1900 of FIG. 59 includes capacitors 1901 and 1902 and transistors Q1 Q8. In the LD control timing generator 1900 of FIG. 59, a capacitor 1901 is quickly charged when the LDON signal is in a high state and is discharged by a constant current when the LDON is in a low state to generate timings for control the laser diode. With this configuration, the LD control timing generator 1900 stops controlling the laser diode when receiving a series of thin pulses.

In comparison to a configuration having a simple delay circuit added with a logic circuit, the circuit shown in FIG. 59 is able to hold the control value relative to a series of thin pulses and therefore it is advantageously improved in an accuracy of control.

When the laser diode is implemented in the circuit with the connection as shown in FIGS. 56, 57, and 58, the terminal voltage of the photoreceptor for detecting the laser light of the laser diode is changed relative to a reference of the ground in the case of the anode-common laser diode and of the VCC in the case of the cathode-common laser diode such characteristics can be implemented into the LD control timing generator according to the present invention.

Figure 60:
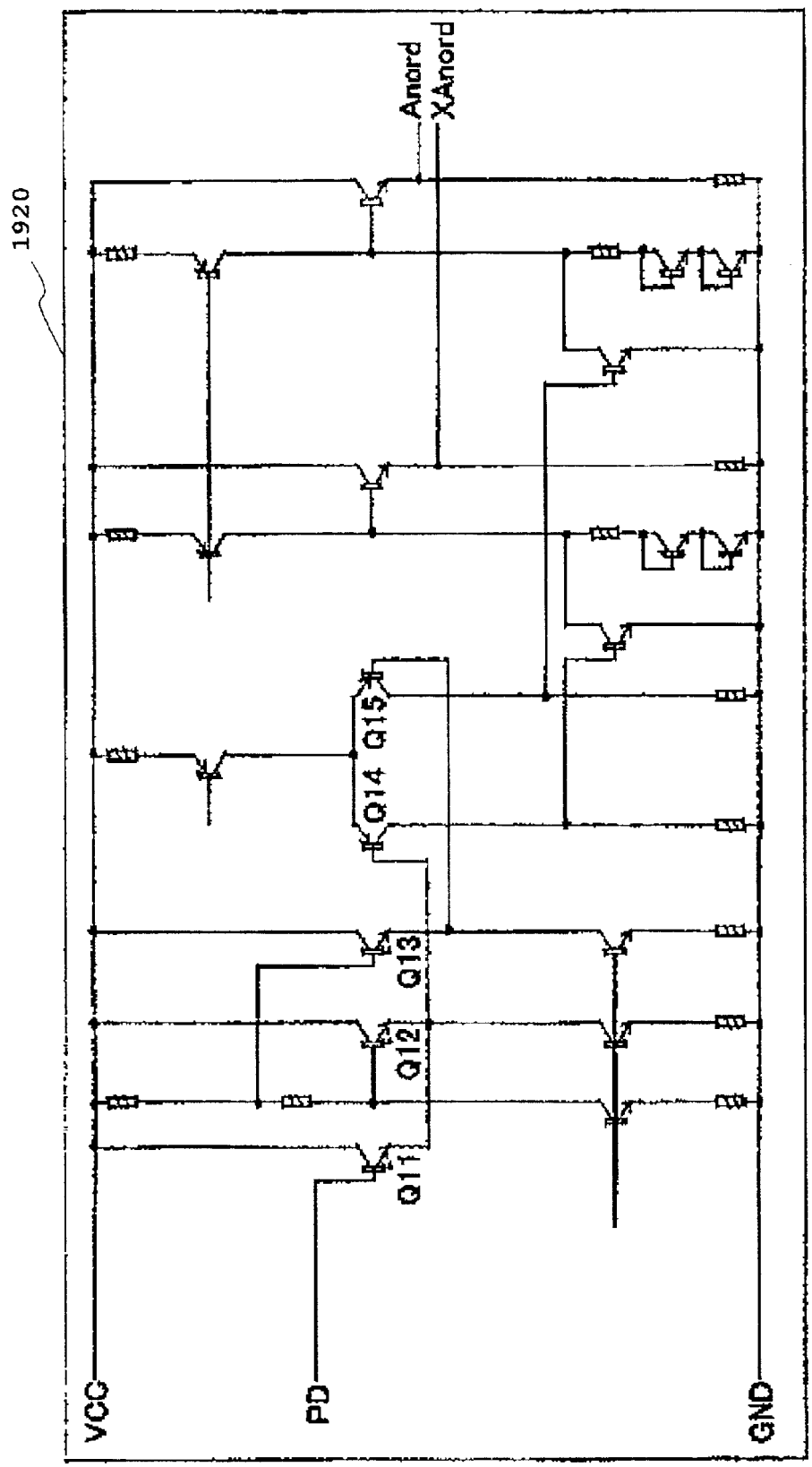

FIG. 60 shows an LD control timing generator 1920 which includes transistors Q11–Q15. The LD control timing generator 1920 is configured to connect the anode-common laser diode when the photoreceptor has the terminal voltage less than half the VCC and to connect the cathode-common laser diode when the photoreceptor has the terminal voltage not less than half the VCC. Thereby, the LD control timing generator 1920 can automatically determine whether the laser diode connected is an anode-common laser diode or a cathode-common laser diode so as to be able to change the control in accordance with the circuits shown in FIGS. 56, 57, and 58. As a result, a common circuit (e.g., an integrated circuit) can be used for both the anode-common and cathode-common laser diodes.

Next, a one-chip IC 2000 (integrated circuit) which includes the above-described various circuits associated with the laser diode control is explained with reference to FIG. 61. The one-chip IC 2000 includes the pulse modulator, the laser diode controller, the pixel clock pulse generator, the laser power controller, and the laser control timing generator, which all are explained above.

The one-chip IC 2000 is provided with two synchronous signals relative to the cases where the frequencies of the pixel clock pulses are the same so as to be able to independently control the anode-common and cathode-common laser diodes. In addition, the one-chip IC 2000 includes two circuits for controlling the laser diode to modulate the laser light beam.

Figure 61:
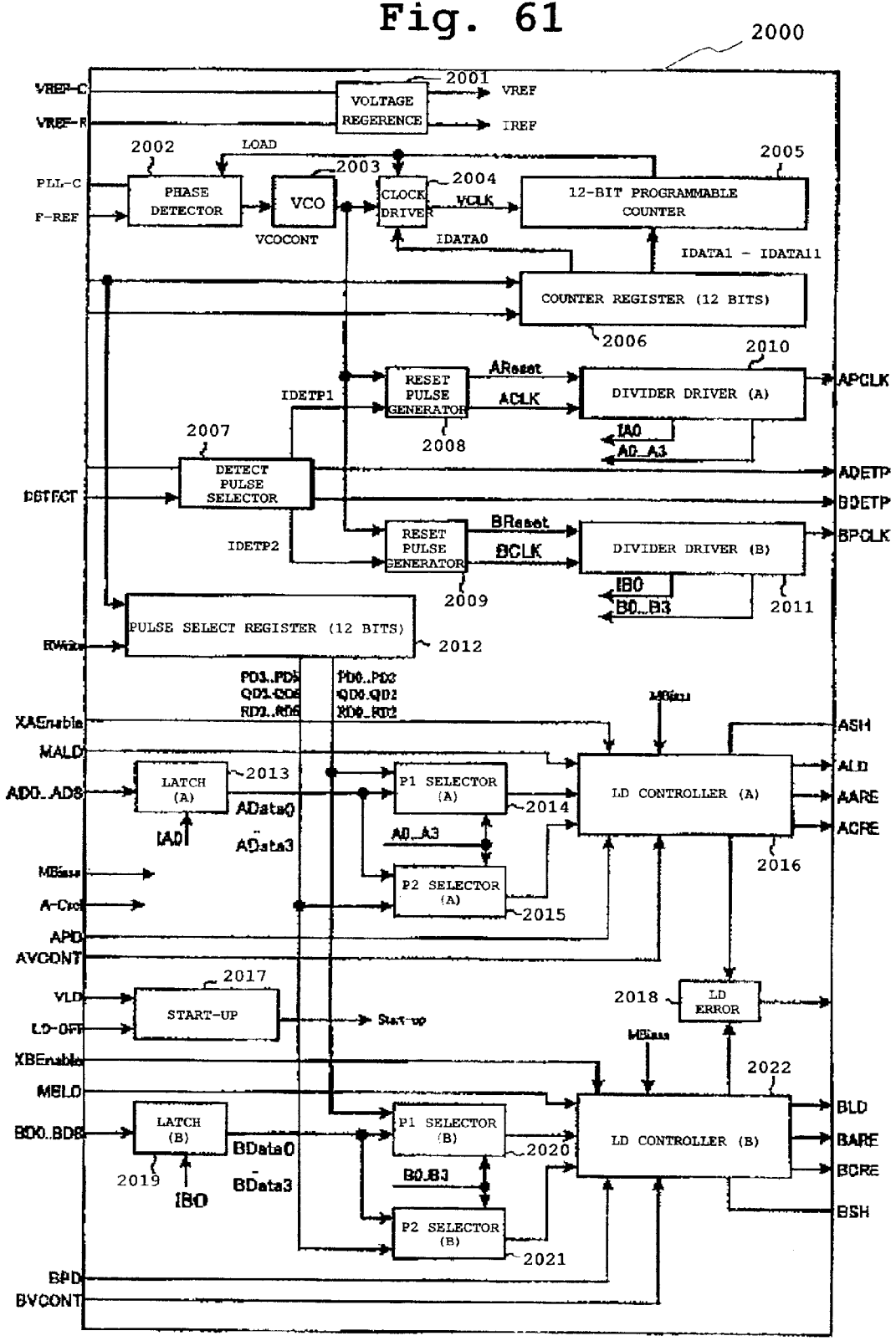
FIG. 61 is a block diagram of a one-chip IC implementing various LD control circuits according to an embodiment of the present invention.

In FIG. 61, the one-chip IC 2000 includes a PLL composed of a voltage reference 2001, a phase detector 2002, a VCO 2003, a clock driver 2004, and a 12-bit programmable counter 2005. Among the 12 bits set to a counter register 2006 having a 12-bit length, the least significant bit is set to a value such that the phase of the VCLK output from the clock driver 2004 is delayed by 180 degrees and an upper 11th bit is set to a value to determine a ratio of frequency division of the 12-bit programmable counter 2005.

With this configuration, the frequency of the clock pulses output from the VCO 2003 is a value of an input F-REF signal multiplied by a half of N which represents 12-bit data.

A reset pulse generator 2008 outputs a signal AReset and ACLK which is one of signals of CLK and inverted CLK in synchronism with a signal IDETP1. Likewise, a reset pulse generator 2009 outputs a signal BReset and BCLK which is one of signals of CLK and inverted CLK in synchronism with a signal IDETP2. A divider driver 2010 outputs a pixel clock signal APCLK which is frequency-divided by four in accordance with the signals ACLK and AReset and is synchronized with a signal ADETP. Likewise, a divider driver 2011 outputs a pixel clock signal BPCLK which is frequency-divided by four in accordance with the signals BCLK and BReset and is synchronized with a signal BDETP.

Figure 62:
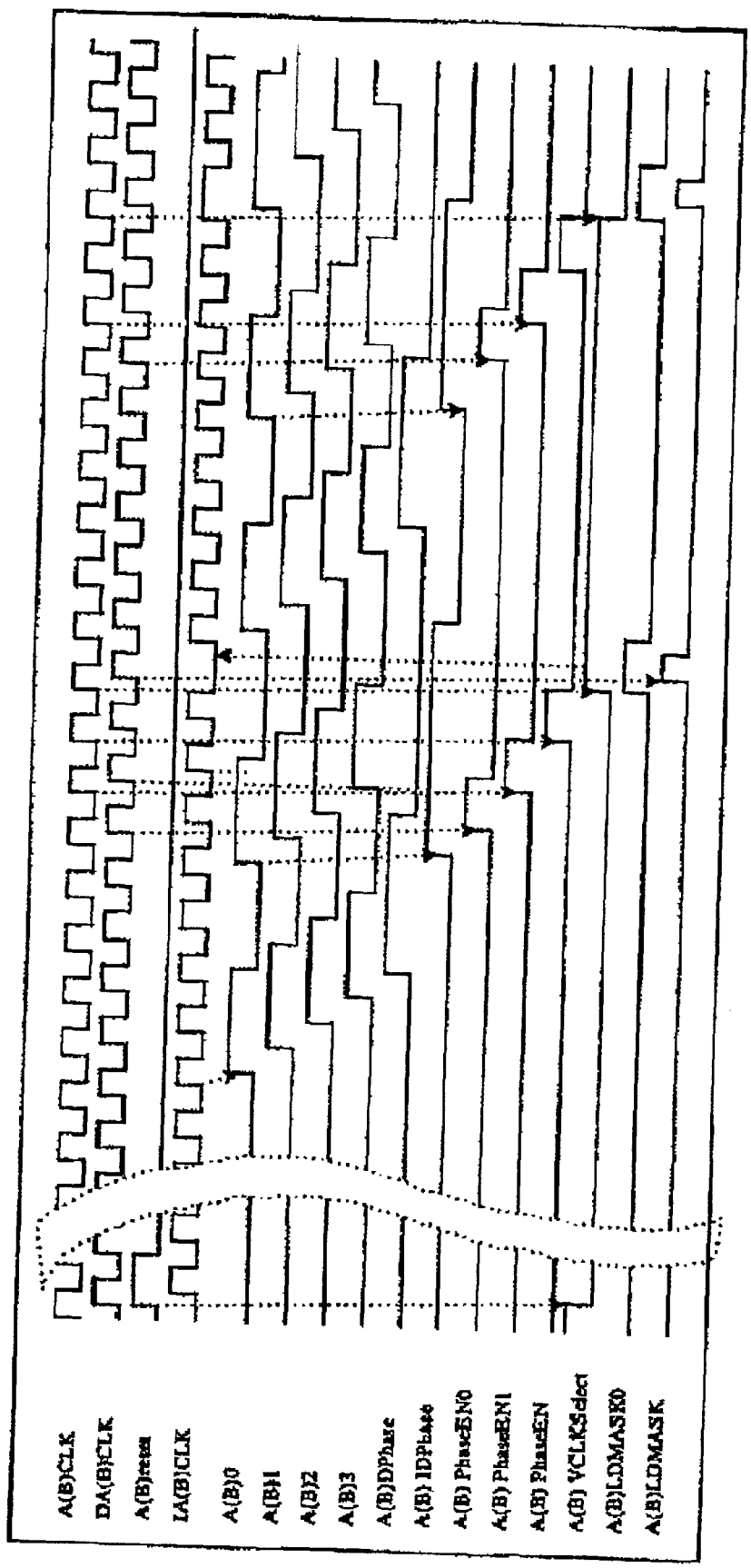
FIG. 62 is a time chart of signals for driving the one-chip IC of FIG. 61.

FIG. 62 shows a time chart of the signals used in the one-chip IC 2000 of FIG. 61. As shown in 63, the pixel clock signal can be delayed by 1/8 of a phase according to a rising edge of a signal ADPhase or BDPhase. As a result, it becomes possible to control the start position of the pixel clock signal to be delayed in steps of a 1/8 clock cycle from line to line in the scanning.

In addition, the frequency of the pixel clock signal can be changed to a frequency calculated by a formula {FCLK×N (N+M/8)} without changing the clock cycle by an addition of a number M of the rising edges during one scanning process. Further, as shown in the time chart of FIG. 62, the pixel clock signal can be delayed by a 1/8 clock cycle by a generation of a signal ALDMASK or BLDMASK so that the laser diode is forcibly switched off during such a time period. With this configuration, an image density is protected against a rapid change.

The above configuration automatically switches off the laser diode. When the density is previously reduced by 1/8 from the image data, it is not needed to forcibly turn off the laser diode. In such a case, a signal LDMASK can be invalidated by a change of a signal MaskEN into its high state.

Figure 63:
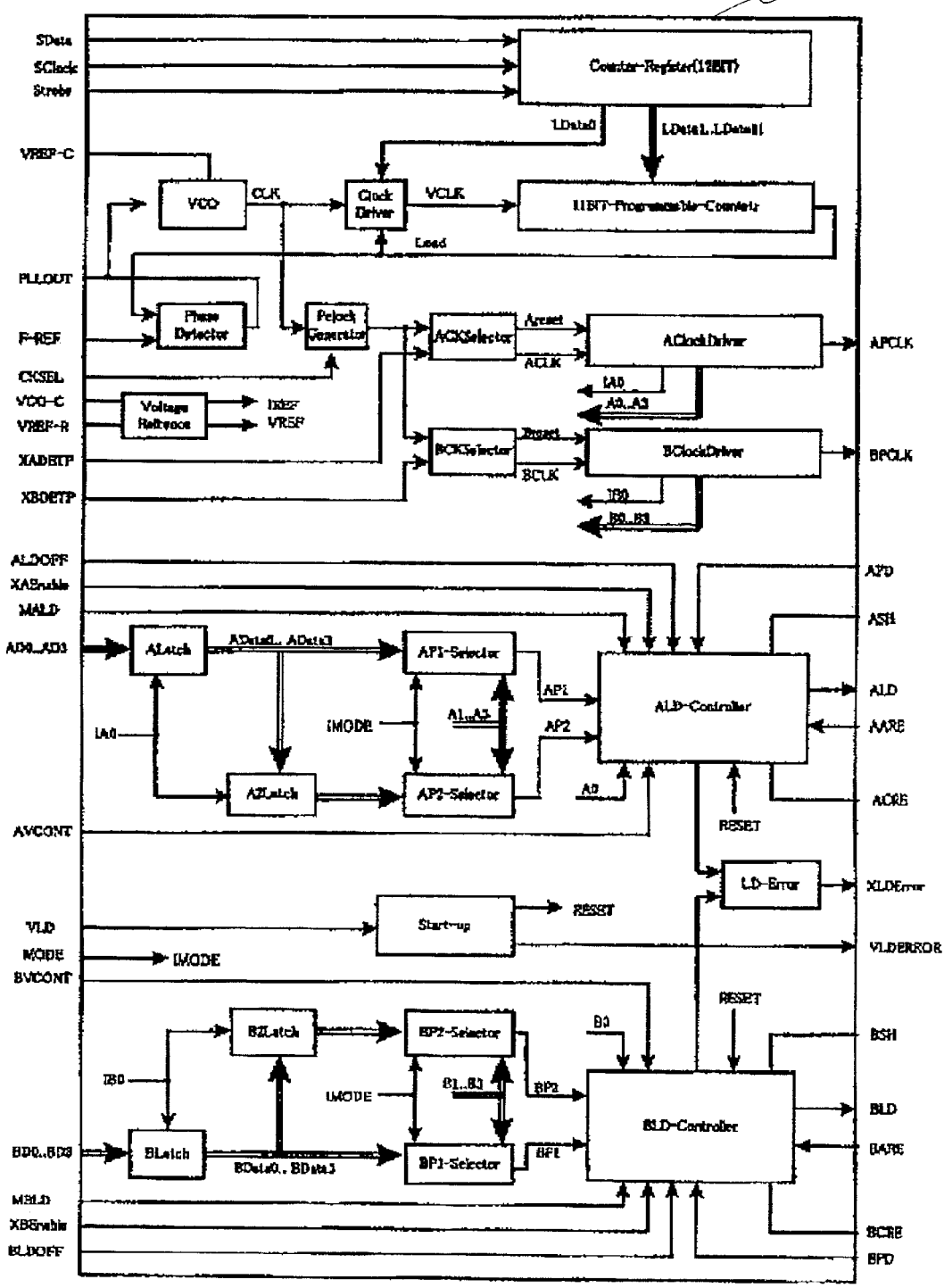
FIG. 63 is a block diagram of another one-chip IC implementing various LD control circuits according to an embodiment of the present invention.

A one-chip IC 2100 according to another embodiment of the present invention is shown in FIG. 63. The one-chip IC 2100 of FIG. 63 is configured to generate a light modulation pulse in accordance with a predetermined rule.

Figure 64:
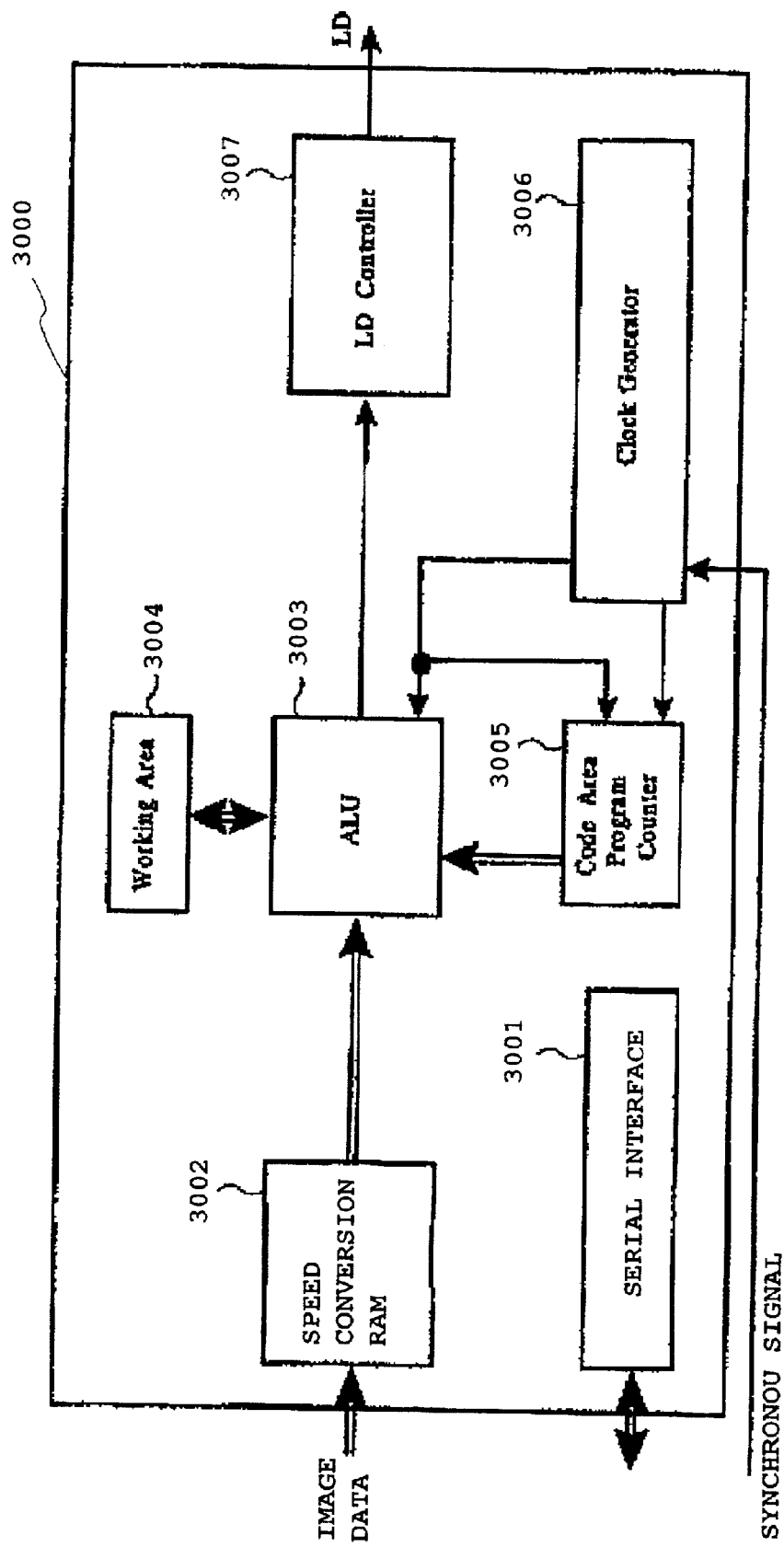
FIGS. 64 and 65 are block diagrams showing the cases in which various LD control functions are conducted by program codes.

Next, an image data converter 3000 according to a preferred embodiment of the present invention is explained with reference to FIG. 64. In the image data converter 3000 of FIG. 64, a program code is loaded into a code-area-program counter 3005 with a serial interface 3001 and various operations are performed. The operations include a generation of an effective time period of writing image data, a generation of a density pattern for an electrophotographic process control, a detection of isolated dots, and an image data conversion process relative to the detected isolated dots. In FIG. 64, an ALU 3003 performs its operation according to a clock signal which runs at a speed eight times faster than the pixel clock signal and is output from a clock generator 3006. In addition, the program code is configured to be set to a predetermined program count value with each synchronous signal.

When the image data converter 300 manipulates the transmitted image data and outputs such data, the ALU 3003 inputs the final resultant data into an LD controller 3007 and, then, the LD controller 3007 drives the laser diode with modulation in accordance with the final resultant data. In FIG. 64, a speed conversion RAM 3002 functions as a buffer for absorbing a speed difference between the clock signal transmitted into the one-chip IC 3000 and the clock signal for writing the image data.

Figure 65:
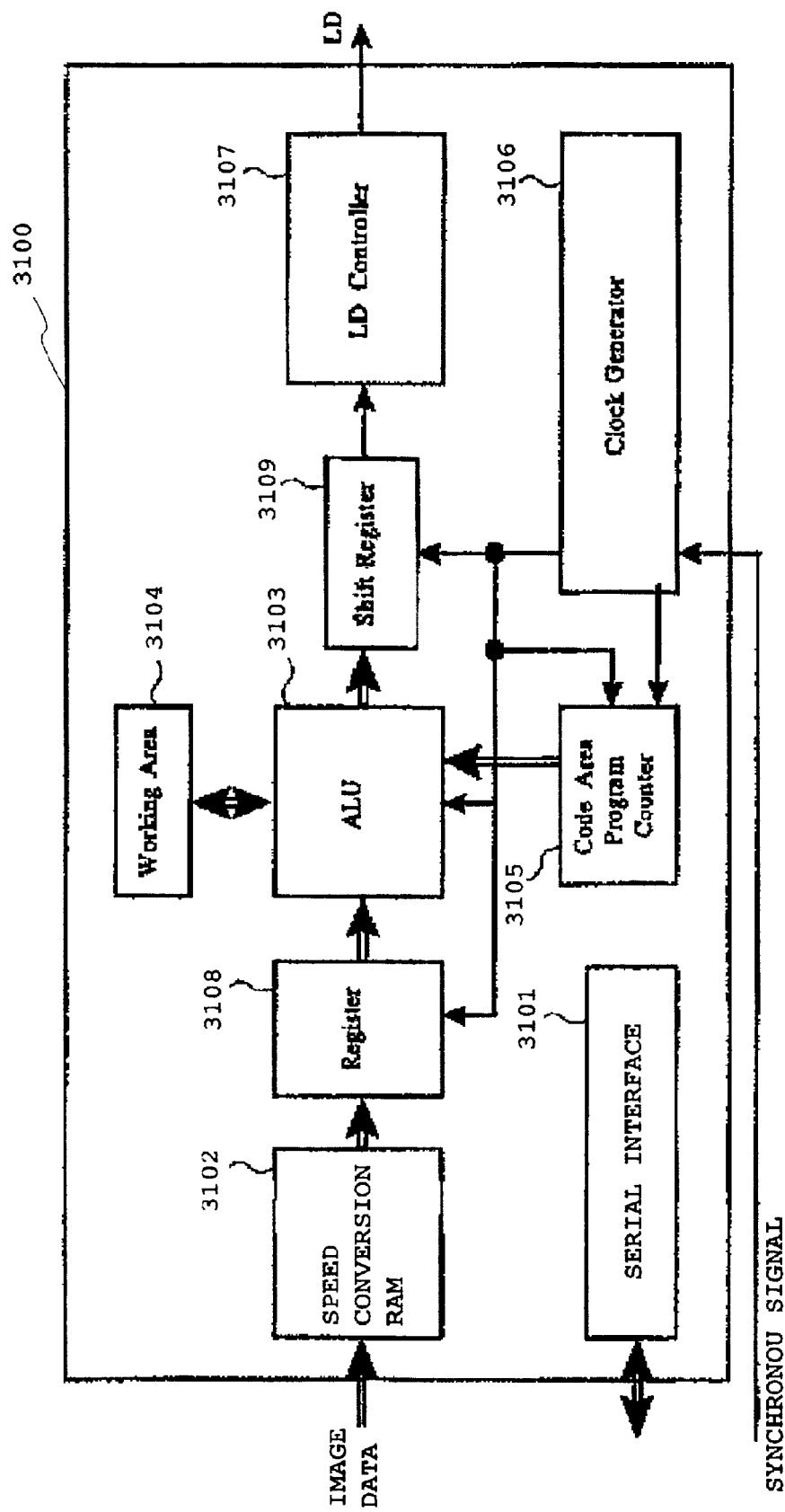

In FIG. 65, an image data converter 3100 according to another embodiment of the present invention is shown. In this case, an ALU 3103 loads an operation result (i.e., a data pattern corresponding to one pixel of the light modulation pattern) into a shift register 3109 one time during eight clock cycles of a clock generator 3106. Then, the shift register 3109 transmits the modulation data to an LD controller 3107 in accordance with the clock signal.

This invention may be conveniently implemented using a conventional general purpose digital computer programmed according to the teaching of the present specification, as will be apparent to those skilled in the computer art. Appropriate software coding can readily be prepared by skilled programmers based on the teachings of the present disclosure, as will be apparent to those skilled in the software art. The present invention may also be implemented by the preparation of application specific integrated circuits or by interconnecting an appropriate network of conventional component circuits, as will be readily apparent to those skilled in the art.

Numerous additional modifications and variations are possible in light of the above teachings. It is therefore to be understood that within the scope of the appended claims, the disclosure of this patent specification may be practiced otherwise than as specifically described herein.

This paten specification is based on Japanese patent applications, No. 2001-201404 filed on Jul. 2, 2001, No. 2001-196597 filed on Jun. 28, 2001, No. 2001-224604 filed on Jul. 25, 2001, and No. 2001-290469 filed on Sep. 25, 2001, in the Japanese Patent Office, the entire contents of which are incorporated by reference herein.

What is claimed is:

1. A pixel clock pulse generating apparatus, comprising:
a high frequency clock pulse generator configured to generate relatively high frequency clock pulses; and
a pixel clock pulse generator configured to receive phase data for instructing a transition time of pixel clock pulses and said relatively high frequency clock pulses generated by said high frequency clock pulse generator and to change a time length between side pixel clock pulses based on said phase data and said high frequency clock pulses.

2. A pixel clock pulse generating apparatus, comprising:
a high frequency clock pulse generator configured to generate relatively high frequency clock pulses; and
a pixel clock pulse generator configured to receive phase data for instructing a transition time of pixel clock pulses and said relatively high frequency clock pulses generated by said high frequency clock pulse generator and to change a frequency of pixel clock pulses based on said phase data and said high frequency clock pulses.

3. A pixel clock pulse generating apparatus as defined in claim 2, wherein said transition time of pixel clock pulses is synchronism with a transition time of said high frequency clock pulses.

4. A pixel clock pulse generating apparatus as defined in claim 2, wherein a frequency of said pixel clock pulses is changed in steps of one clock cycle of said high frequency clock pulses.

5. A pixel clock pulse generating apparatus as defined in claim 2, wherein a frequency of said pixel clock pulses is changed in steps of a half clock cycle of said high frequency clock pulses.

6. A pixel clock pulse generating apparatus as defined in claim 2, wherein a rising edge of each of said high frequency clock pulses is detected and a number of said high frequency clock pulses is counted.

7. A pixel clock pulse generating apparatus as defined in claim 2, wherein a falling edge of each of said high frequency clock pulses is detected and a number of said high frequency clock pulses is counted.

8. A pixel clock pulse generating apparatus, comprising:
a high frequency clock pulse generator configured to generate relatively high frequency clock pulses;
a counter configured to count a number of said high frequency clock pulses generated by said high frequency clock pulse generator;
a comparator configured to compare said number of said high frequency clock pulses counted by said counter with phase data for instructing a transition time of pixel clock pulses; and
a controller configured to perform a transition of a pixel clock pulse based on a result of comparison performed by said comparator.

9. A pixel clock pulse generating apparatus as defined in claim 8, further comprising a decoder configured to decode said phase data and to send decoded data to said comparator.

10. A pixel clock pulse generating apparatus as defined in claim 9, wherein said decoder decodes phase data having a bit width corresponding to an amount of phase shift into phase data having a bit width equal to a bit width used in a calculation.

11. A pixel clock pulse generating apparatus as defined in claim 8, further comprising:
a phase data memory configured to store a plurality of phase data and to send said plurality of phase data in synchronism with said pixel clock pulses to said comparator.

12. A pixel clock pulse generating apparatus as defined in claim 11, wherein said phase data memory previously stores a line of phase data and outputs said phase data line by line in synchronism with said pixel clock pulses.

13. A pixel clock pulse generating apparatus as defined in claim 8, further comprising:
a phase data memory configured to store a plurality of phase data and to output said plurality of phase data in synchronism with said pixel clock pulses; and
a decoder configured to receive said plurality of phase data output by said phase data memory, to decode said plurality of phase data, and to send said decoded phase data to said comparator.

14. A pixel clock pulse generating apparatus as defined in claim 8, further comprising:
a phase data memory configured to store a plurality of first phase data and to output said plurality of phase data in synchronism with said pixel clock pulses; and
a synthesizer configured to receive said plurality of first phase data output by said phase data memory and second phase data, to synthesize said plurality of first phase data and said second phase data, and to send synthesized phase data to said comparator.

15. A pixel clock pulse generating apparatus as defined in claim 14, wherein said phase data memory previously stores a line of first phase data and outputs said phase data line by line in synchronism with said pixel clock pulses and said synthesizer synthesizes said second phase data with said first phase data.

16. A pixel clock pulse generating apparatus as defined in claim 8, further comprising:
a phase data memory configured to store a plurality of first phase data and to output said plurality of phase data in synchronism with said pixel clock pulses;
a synthesizer configured to receive said plurality of first phase data output by said phase data memory and second phase data, to synthesize said plurality of first phase data and said second phase data, and to output synthesized phase data; and
a decoder configured to receive said synthesized phase data output from said synthesizer, to decode said synthesized phase data, and to send decoded phase data to said comparator.

17. A pixel clock pulse generating apparatus, comprising:
a high frequency clock pulse generator configured to generate relatively high frequency clock pulses;
a comparison value generator configured to generate a first comparison value and a second comparison value based on phase data indicating an amount of phase shift relative to pixel clock pulses and a status signal indicating a status of said pixel clock pulses;
a first counter configured to count said high frequency clock pulses generated by said high frequency clock pulse generator by detecting a first varying point of each of said high frequency clock pulses;
a first comparator configured to compare an output value of said first counter with said first comparison value output from said comparison value generator;
a first clock pulse generator configured to generate a first clock pulse at said first varying point of said high frequency clock pulses based on a result of a comparison performed by said first comparator;
a second counter configured to count said high frequency clock pulses generated by said high frequency clock-pulse generator by detecting a second varying point of each of said high frequency clock pulses;
a second comparator configured to compare an output value of said second counter with said second comparison value output from said comparison value generator;
a second clock pulse generator configured to generate a second clock pulse at said second varying point of said high frequency clock pulses based on a result of a comparison performed by said second comparator; and
a clock pulse selector configured to select one of said first and second clock pulses and to output selected clock pulse as a pixel clock pulse.

18. A pixel clock pulse generating apparatus as defined in claim 17, wherein said comparison value generator generates a first value as said first comparison value and a second value as said second comparison value in accordance with said amount of phase shift indicated by said phase data when said status signal indicates that said pixel clock pulses are in a first status, and generates said second value as said first comparison value and said first value as said second comparison value in accordance with said amount of phase shift indicated by said phase data when said status signal indicates that said pixel clock pulses are in a second status.

19. A pixel clock pulse generating apparatus as defined in claim 17, wherein said clock pulse selector toggles between said first and second clock pulses in accordance with said phase data and said status of said pixel clock pulses indicated by said status signal.

20. A pixel clock pulse generating apparatus as defined in claim 17, further comprising:
a phase data memory configured to store a plurality of phase data and to send said plurality of phase data in synchronism with said pixel clock pulses to said comparison value generator.

21. A pixel clock pulse generating apparatus as defined in claim 20, wherein said phase data memory previously stores a line of phase data and outputs said phase data line by line in synchronism with said pixel clock pulses.

22. A pixel clock pulse generating apparatus as defined in claim 17, further comprising:
   a phase data memory configured to store a plurality of first phase data and to send said plurality of first phase data in synchronism with said pixel clock pulses; and
   a synthesizer configured to receive said plurality of first phase data output by said phase data memory and second phase data, to synthesize said plurality of first phase data and said second phase data, and to send synthesized phase data to said comparison value generator.

23. A pixel clock pulse generating apparatus as defined in claim 22, wherein said phase data memory previously stores a line of first phase data and outputs said phase data line by line in synchronism with said pixel clock pulses and said synthesizer synthesizes said second phase data with said first phase data.

24. A pixel clock pulse generating apparatus as defined in claim 17, wherein said first varying point of each of said high frequency clock pulses is a rising edge of each of said high frequency clock pulses and said second varying point of each of said high frequency clock pulses is a falling edge of each of said high frequency clock pulses.

25. A pixel clock pulse generating apparatus, comprising:
   high frequency clock pulse generating means generating relatively high frequency clock pulses; and
   pixel clock pulse generating means for receiving phase data for instructing a transition time of pixel clock pulses and said relatively high frequency clock pulses generated by said high frequency clock pulse generator and changing a time length between said pixel clock pulses based on said phase data and said high frequency clock pulses.

26. A pixel clock pulse generating apparatus, comprising:
   high frequency clock pulse generating means for generating relatively high frequency clock pulses; and
   pixel clock pulse generating means for receiving phase data for instructing a transition time of pixel clock pulses and said relatively high frequency clock pulses generated by said high frequency clock pulse generator and changing a frequency of pixel clock pulses based on said phase data and said high frequency clock pulses.

27. A pixel clock pulse generating apparatus as defined in claim 26, wherein said transition time of pixel clock pulses is synchronism with a transition time of said high frequency clock pulses.

28. A pixel clock pulse generating apparatus as defined in claim 26, wherein a frequency of said pixel clock pulses is changed in steps of one clock cycle of said high frequency clock pulses.

29. A pixel clock pulse generating apparatus as defined in claim 26, wherein a frequency of said pixel clock pulses is changed in steps of a half clock cycle of said high frequency clock pulses.

30. A pixel clock pulse generating apparatus as defined in claim 26, wherein a rising edge of each of said high frequency clock pulses is detected and a number of said high frequency clock pulses is counted.

31. A pixel clock pulse generating apparatus as defined in claim 26, wherein a falling edge of each of said high frequency clock pulses is detected and a number of said high frequency clock pulses is counted.

32. A pixel clock pulse generating apparatus, comprising:
   high frequency clock pulse generating means for generating relatively high frequency clock pulses;
   counting means for counting a number of said high frequency clock pulses generated by said high frequency clock pulse generating means;
   comparing means for comparing said number of said high frequency clock pulses counted by said counting means with phase data for instructing a transition time of pixel clock pulses; and
   controlling means for performing a transition of a pixel clock pulse based on a result of comparison performed by said comparing means.

33. A pixel clock pulse generating apparatus as defined in claim 32, further comprising decoding means for decoding said phase data and to send decoded data to said comparing means.

34. A pixel clock pulse generating apparatus as defined in claim 33, wherein said decoding means decodes phase data having a bit width corresponding to an amount of phase shift into phase data having a bit width equal to a bit width used in a calculation.

35. A pixel clock pulse generating apparatus as defined in claim 32, further comprising:
   phase data storing means for storing a plurality of phase data and to send said plurality of phase data in synchronism with said pixel clock pulses to said comparing means.

36. A pixel clock pulse generating apparatus as defined in claim 35, wherein said phase data storing means previously stores a line of phase data and outputs said phase data line by line in synchronism with said pixel clock pulses.

37. A pixel clock pulse generating apparatus as defined in claim 32, further comprising:
   phase data storing means for storing a plurality of phase data and outputting said plurality of phase data in synchronism with said pixel clock pulses; and
   decoding means for receiving said plurality of phase data output by said phase data storing means, decoding said plurality of phase data, and sending said decoded phase data to said comparing means.

38. A pixel clock pulse generating apparatus as defined in claim 32, further comprising:
   phase data storing means for storing a plurality of first phase data and outputting said plurality of phase data in synchronism with said pixel clock pulses; and
   synthesizing means for receiving said plurality of first phase data output by said phase data storing means and second phase data, synthesizing said plurality of first phase data and said second phase data, and sending synthesized phase data to said comparing means.

39. A pixel clock pulse generating apparatus as defined in claim 38, wherein said phase data storing means previously stores a line of first phase data and outputs said phase data line by line in synchronism with said pixel clock pulses and said synthesizer synthesizes said second phase data with said first phase data.

40. A pixel clock pulse generating apparatus as defined in claim 32, further comprising:
   phase data storing means for storing a plurality of first phase data and outputting said plurality of phase data in synchronism with said pixel clock pulses;
   synthesizing means for receiving said plurality of first phase data output by said phase data storing means and second phase data, synthesizing said plurality of first phase data and said second phase data, and outputting synthesized phase data; and decoding means for receiving said synthesized phase data output from said synthesizing means, decoding said synthesized-phase data, and sending decoded phase data to said comparing means.

41. A pixel clock pulse generating apparatus, comprising:
high frequency clock pulse generating means for generating relatively high frequency clock pulses;
comparison value generating means for generating a first comparison value and a second comparison value based on phase data indicating an amount of phase shift relative to pixel clock pulses and a status signal indicating a status of said pixel clock pulses;
first counting means for counting said high frequency clock pulses generated by said high frequency clock pulse generating means by detecting a first varying point of each of said high frequency clock pulses;
first comparing means for comparing an output value of said first counting means with said first comparison value output from said comparison value generating means;
first clock pulse generating means for generating a first clock pulse at said first varying point of said high frequency clock pulses based on a result of a comparison performed by said first comparing means;
second counting means for counting said high frequency clock pulses generated by said high frequency clock pulse generating means by detecting a second varying point of each of said high frequency clock pulses;
second comparing means for comparing an output value of said second counting means with said second comparison value output from said comparison value generating means;
second clock pulse generating means for generating a second clock pulse at said second varying point of said high frequency clock pulses based on a result of a comparison performed by said second comparing means; and
clock pulse selecting means for selecting one of said first and second clock pulses and to output selected clock pulse as a pixel clock pulse.

42. A pixel clock pulse generating apparatus as defined in claim 41, wherein said comparison value generating means generates a first value as said first comparison value and a second value as said second comparison value in accordance with said amount of phase shift indicated by said phase data when said status signal indicates that said pixel clock pulses are in a first status, and generates said second value as said first comparison value and said first value as said second comparison value in accordance with said amount of phase shift indicated by said phase data when said status signal indicates that said pixel clock pulses are in a second status.

43. A pixel clock pulse generating apparatus as defined in claim 41, wherein said clock pulse selecting means toggles between said first and second clock pulses in accordance with said phase data and said status of said pixel clock pulses indicated by said status signal.

44. A pixel clock pulse generating apparatus as defined in claim 41, further comprising:
phase data storing means for storing a plurality of phase data and sending said plurality of phase data in synchronism with said pixel clock pulses to said comparison value generating means.

45. A pixel clock pulse generating apparatus as defined in claim 44, wherein said phase data storing means previously stores a line of phase data and outputs said phase data line by line in synchronism with said pixel clock pulses.

46. A pixel clock pulse generating apparatus as defined in claim 41, further comprising:
phase data storing means for storing a plurality of first phase data and to send said plurality of first phase data in synchronism with said pixel clock pulses; and
synthesizing means for receiving said plurality of first phase data output by said phase data storing means and second phase data, synthesizing said plurality of first phase data and said second phase data, and sending synthesized phase data to said comparison value generating means.

47. A pixel clock pulse generating apparatus as defined in claim 46, wherein said phase data storing means previously stores a line of first phase data and outputs said phase data line by line in synchronism with said pixel clock pulses, and said synthesizing means synthesizes said second phase data with said first phase data.

48. A pixel clock pulse generating apparatus as defined in claim 41, wherein said first varying point of each of said high frequency clock pulses is a rising edge of each of said high frequency clock pulses and said second varying point of each of said high frequency clock pulses is a falling edge of each of said high frequency clock pulses.

49. A method of generating pixel clock pulses, comprising the steps of:
generating relatively high frequency clock pulses;
instructing a transition time of pixel clock pulses phase data; and
changing a time length between said pixel clock pulses based on said phase data and said high frequency clock pulses.

50. A method of generating pixel clock pulse, comprising the steps of:
generating relatively high frequency clock pulses;
instructing a transition time of pixel clock pulses with phase data; and
changing a frequency of pixel clock pulses based on said phase data and said high frequency clock pulses.

51. An image forming apparatus, comprising:
a photosensitive member;
a pixel clock pulse generator comprising:
a high frequency clock pulse generator configured to generate relatively high frequency clock pulses; and
a pixel clock pulse generator configured to receive phase data for instructing a transition time of pixel clock pulses and said relatively high frequency clock pulses generated by said high frequency clock pulse generator and to change a frequency of pixel clock pulses based on said phase data and said high frequency clock pulses, and
a laser beam scanning mechanism configured to generate a laser scanning beam based on said pixel clock pulses for cyclically scanning a surface of said photosensitive member to form an electrostatic latent image on said photosensitive member.

52. An image forming apparatus as defined in claim 51, wherein said laser beam scanning mechanism generates a plurality of laser scanning beams based on said pixel clock pulses for cyclically scanning a surface of said photosensitive member with said plurality of laser scanning beams in a simultaneous manner to form an electrostatic latent image on said photosensitive member.

53. An image forming apparatus, comprising:
photo-sensing means for sensing light;
pixel clock pulse generating means for generating pixel clock pulses, comprising:

high frequency clock pulse generating means for generating relatively high frequency clock pulses; and pixel clock pulse generating means for receiving phase data for instructing a transition time of pixel clock pulses and said relatively high frequency clock pulses generated by said high frequency clock pulse generating means and changing a frequency of pixel clock pulses based on said phase data and said high frequency clock pulses, and laser beam scanning means for generating a laser scanning beam based on said pixel clock pulses for cyclically scanning a surface of said photosensitive member to form an electrostatic latent image on said photo-sensing means.

54. An image forming apparatus as defined in claim 53, wherein said laser beam scanning means generates a plurality of laser scanning beams based on said pixel clock pulses for cyclically scanning a surface of said photo-sensing means with said plurality of laser scanning beams in a simultaneous manner to form an electrostatic latent image on said photo-sensing means.

55. A method of image forming, comprising the steps of:
generating relatively high frequency clock pulses;
generating pixel clock pulses based on said relatively high frequency clock pulses;
instructing a transition time of said pixel clock pulses with phase data;
changing a frequency of said pixel clock pulses based on said phase data and said high frequency clock pulses;
generating a laser scanning beam bas ed on said pixel clock pulses; and
performing a cyclic scanning with said laser scanning beam relative to a surface of a photosensitive member to form an electrostatic latent image on said photosensitive member.

56. A method as defined in claim 55, wherein the generating step generates a plurality of laser scanning beams based on said pixel clock pulses and the performing step performs said cyclic scanning with said plurality of laser scanning beams in a simultaneous manner relative to said surface of said photosensitive member to form an electrostatic latent image on said photosensitive member.

57. An image forming apparatus, comprising:
a photosensitive member having a photosensitive surface;
a pixel clock pulse generator configured to generate pixel clock pulses;
a laser light oscillator configured to oscillate a plurality of laser light in accordance with said pixel clock pulses;
a controller configured to control a driving of said laser light oscillator, said controller including a high frequency clock pulse generator configured to generate a high frequency clock pulse;
an optical scanner configured to convert said plurality of laser light into a plurality of scanning laser light beams that focus as a plurality of scanning laser light spots on said photosensitive surface of said photosensitive member and scan respective scanning lines starting from respective scanning start positions aligned in a sub-scanning direction on said photosensitive surface of said photosensitive member; and
a phase changer configured to change a phase of said pixel clock pulses to control respective times when said plurality of laser light are oscillated by said laser light oscillator so as to correct deviations associated with said scanning laser light spots, wherein said pixel clock pulse generator changes a time length between pixel clock pulses based on said chase of pixel clock pulses and said high frequency clock pulse.

58. An image forming apparatus as defined in claim 57, wherein said laser light oscillator includes at least two laser light oscillating semiconductors.

59. An image forming apparatus as defined in claim 57, wherein said laser light oscillator includes a laser light oscillating semiconductor that includes a plurality of laser light emission points.

60. An image forming apparatus as defined in claim 57, wherein said deviations occur in said scanning start positions in a main scanning direction.

61. An image forming apparatus as defined in claim 57, wherein said deviations occur in said scanning start positions in a main scanning direction.

62. An image forming apparatus as defined in claim 57, wherein said optical scanner comprises a laser light deflector configured to deflect said plurality of laser light.

63. An image forming apparatus as defined in claim 57, wherein said deviations occur in a scanning line length per unit time among said scanning laser light spots and said phase changer changes the phase of said pixel clock pulses to control respective times when said plurality of laser light are oscillated by said laser light oscillator so as to correct said deviations to be less than 1% relative to a predetermined scanning line length.

64. An image forming apparatus, comprising:
a plurality of photosensitive members, each having a photosensitive surface;
a pixel clock pulse generator configured to generate pixel clock pulses;
a plurality of laser light oscillators, each including at least one laser light oscillating semiconductor configured to oscillate laser light in accordance with said pixel clock pulses;
a controller configured to control a driving of at least one of said laser light oscillators, said controller including a high frequency clock pulse generator configured to generate a high frequency clock pulse;
a plurality of optical scanners arranged to correspond to said plurality of laser light oscillators and to said plurality of photosensitive members on a one-to-one basis, each of said plurality of optical scanners being configured to convert said laser light emitted by corresponding one of said plurality of laser light oscillator into a scanning laser light beam that focuses as a scanning laser light spot on said photosensitive surface of corresponding one of said plurality of said photosensitive members and scans a scanning line on said photosensitive surface of said corresponding one of said plurality of said photosensitive members; and
a phase changer configured to change a phase of said pixel clock pulses to control respective times when said plurality of laser light are oscillated by said plurality of laser light oscillators so as to correct deviations in lengths of said scanning lines relative to a predetermined scanning time period among said plurality of photosensitive members,
wherein said pixel clock pulse generator changes a time length between pixel clock pulses based on said phase of pixel clock pulses and said high frequency clock pulse.

65. An image forming apparatus comprising:
a photosensitive member having a photosensitive surface;

a pixel clock pulse generator configured to generate pixel clock pulses;

a laser light oscillator configured to oscillate a plurality of laser light in accordance with said pixel clock pulses;

an optical scanner configured to convert said plurality of laser light into a plurality of scanning laser light beams that focus as a plurality of scanning laser light spots on said photosensitive surface of said photosensitive member and scan respective scanning lines starting from respective scanning start positions aligned in a sub-scanning direction on said photosensitive surface of said photosensitive member;

a phase changer configured to change a phase of said pixel clock pulses to control respective times when said plurality of laser light are oscillated by said laser light oscillator so as to correct deviations associated with said scanning laser light spots; and a controller configured to control a driving of said laser light oscillator, said controller comprising:
- a high frequency clock pulse generator configured to generate a high frequency clock pulse; and
- an image data loader configured to load image data in synchronism with said high frequency clock pulse and said pixel clock pulse, wherein said pixel clock pulse generator frequency-divides said high frequency clock pulse generated by said high frequency clock pulse generator to generate said pixel clock pulse and said phase changer shifts said phase of said pixel clock pulse to cause said image data loader to change a timing of loading said image data.

66. An image forming apparatus as defined in claim 65, wherein said high frequency clock pulse generator comprises a phase synchronizer comprising:
- a voltage control oscillator configured to oscillate laser light in accordance with a voltage applied;
- a frequency divider configured to frequency-divide an output from said voltage control oscillator; and
- a phase comparator configured to compare a phase of an output from said frequency divider with a phase of a reference frequency and, based on a comparison result, to output a phase synchronous signal.

67. An image forming apparatus as defined in claim 66, wherein said pixel clock pulse generator outputs said pixel clock pulse in synchronism with said phase synchronous signal output by said phase comparator.

68. An image forming apparatus as defined in claim 66, wherein said controller comprises a pulse modulation pattern generator configured to generate a pulse modulation pattern relative to said laser light oscillated by said laser light oscillator in accordance with said output from said voltage control oscillator and said image data loaded by said image data loader.

69. An image forming apparatus as defined in claim 68, further comprising:
- a pulse modulation controller configured to modulation-control said laser light oscillator in accordance with said pulse modulation pattern generated by said pulse modulation pattern generator to cause said laser light to be a frequency-modulated laser light, wherein said phase changer changes said phase of said pixel clock pulses to control a time when said pulse modulation pattern generator generates said pulse modulation pattern.

70. An image forming apparatus as defined in claim 68, wherein said pixel clock pulse generator, said phase changer, said image data loader, said phase synchronizer, and said pulse modulation pattern generator are integrated into a one-chip integrated circuit.

71. An image forming apparatus as defined in claim 68, wherein said pixel clock pulse generator, said phase changer, said controller, said phase synchronizer, and said pulse modulation pattern generator are integrated into a one-chip integrated circuit.

72. An image forming apparatus, comprising:
- photosensitive member means for providing a photosensitive surface;
- pixel clock pulse generating means for generating pixel clock pulses;
- laser light oscillating means for oscillating a plurality of laser light in accordance with said pixel clock pulses;
- controlling means for controlling a driving of at least one of said laser light oscillating means, said controlling means including a high frequency clock pulse generating means for generating a high frequency clock pulse;
- optical scanning means for converting said plurality of laser light into a plurality of scanning laser light beams that focus as a plurality of scanning laser light spots on said photosensitive surface of said photosensitive member means and scan respective scanning lines starting from respective scanning start positions aligned in a sub-scanning direction on said photosensitive surface of said photosensitive member means; and
- phase changing means for changing a phase of said pixel clock pulses to control respective times when said plurality of laser light are oscillated by said laser light oscillating means so as to correct deviations associated with said scanning laser light spots, wherein said pixel clock pulse generating means changes a time length between pixel clock pulses based on said phase of pixel clock pulses and said high frequency clock pulses.

73. An image forming apparatus as defined in claim 72, wherein said laser light oscillating means includes at least two laser light oscillating semiconductors.

74. An image forming apparatus as defined in claim 72, wherein said laser light oscillating means includes a laser light oscillating semiconductor that includes a plurality of laser light emission points.

75. An image forming apparatus as defined in claim 72, wherein said deviations occur in said scanning start positions in a main scanning direction.

76. An image forming apparatus as defined in claim 72, wherein said deviations occur in said scanning start positions in a main scanning direction.

77. An image forming apparatus as defined in claim 72, wherein said optical scanning means comprises a laser light deflecting means for deflecting said plurality of laser light, and said deviations occur in said scanning start positions in a main scanning direction.

78. An image forming apparatus as defined in claim 72, wherein said deviations occur in a scanning line length per unit time among said scanning laser light spots and said phase changing means changes the phase of said pixel clock pulses to control respective times when said plurality of laser light are oscillated by said laser light oscillating means so as to correct said deviations to be less than 1% relative to a predetermined scanning line length.

79. An image forming apparatus, comprising:
- plurality of photosensitive member means each for providing a photosensitive surface;

pixel clock pulse generating means for generating pixel clock pulses;

plurality of laser light oscillating means for oscillating laser light, each laser light oscillating means including at least one laser light oscillating semiconductor configured to oscillate laser light in accordance with said pixel clock pulses;

controlling means for controlling a driving of at least one of said laser light oscillating means, said controlling means including a high frequency clock pulse generating means for generating a high frequency clock pulse;

plurality of optical scanning means arranged to correspond to said plurality of laser light oscillating means and to said plurality of photosensitive member means on a one-to-one basis, each of said plurality of optical scanning means convening said laser light emitted by corresponding one of said plurality of laser light oscillating means into a scanning laser light beam that focuses as a scanning laser light spot on said photosensitive surface of corresponding one of said plurality of said photosensitive member means and scans a scanning line on said photosensitive surface of said corresponding one of said plurality of said photosensitive member means;

phase changing means for changing a phase of said pixel clock pulses to control respective times when said plurality of laser light are oscillated by said plurality of laser light oscillating means so as to correct deviations in lengths of said scanning lines relative to a predetermined scanning time period among said plurality of photosensitive member means, wherein said pixel clock pulse generating means changes a time length between pixel clock pulses based on said phase of pixel clock pulses and said high frequency clock pulse.

80. An image forming apparatus comprising:

photosensitive member means for providing a photosensitive surface;

pixel clock pulse generating means for generating pixel clock pulses;

laser light oscillating means for oscillating a plurality of laser light in accordance with said pixel clock pulses;

optical scanning means for converting said plurality of laser light into a plurality of scanning laser light beams that focus as a plurality of scanning laser light spots on said photosensitive surface of said photosensitive member means and scan respective scanning lines starting from respective scanning start positions aligned in a sub-scanning direction on said photosensitive surface of said photosensitive member means;

phase changing means for changing a phase of said pixel clock pulses to control respective times when said plurality of laser light are oscillated by said laser light oscillating means so as to correct deviations associated with said scanning laser light spots; and controlling means for controlling a driving of said laser light oscillating means, said controlling means comprising:

high frequency clock pulse generating means for generating a high frequency clock pulse; and image data loading means for loading image data in synchronism with said high frequency clock pulse and said pixel clock pulse, wherein said pixel clock pulse generating means frequency-divides said high frequency clock pulse generated by said high frequency clock pulse generating means to generate said pixel clock pulse and said phase changing means shifts said phase of said pixel clock pulse to cause said image data loading means to change a timing of loading said image data.

81. An image forming apparatus as defined in claim 80, wherein said high frequency clock pulse generating means comprises phase synchronizing means comprising:

voltage control oscillating means for oscillating laser light in accordance with a voltage applied;

frequency dividing means for frequency-dividing an output from said voltage control oscillating means; and phase comparing means for comparing a phase of an output from said frequency dividing means with a phase of a reference frequency and, based on a comparison result, to output a phase synchronous signal.

82. An image forming apparatus as defined in claim 81, wherein said pixel clock pulse generating means outputs said pixel clock pulse in synchronism with said phase synchronous signal output by said phase comparing means.

83. An image forming apparatus as defined in claim 81, wherein said controlling means comprises pulse modulation pattern generating means for generating a pulse modulation pattern relative to said laser light oscillated by said laser light oscillating means in accordance with said output from said voltage control oscillating means and said image data loaded by said image data loading means.

84. An image forming apparatus as defined in claim 83, further comprising:

pulse modulation controlling means for modulation-controlling said laser light oscillating means in accordance with said pulse modulation pattern generated by said pulse modulation pattern generating means to cause said laser light to be a frequency-modulated laser light, wherein said phase changing means changes said phase of said pixel clock pulses to control a time when said pulse modulation pattern generating means generates said pulse modulation pattern.

85. An image forming apparatus as defined in claim 83, wherein said pixel clock pulse generating means, said phase changing means, said image data loading means, said phase synchronizing means, and said pulse modulation pattern generating means are integrated into a one-chip integrated circuit.

86. An image forming apparatus as defined in claim 83, wherein said pixel clock pulse generating means, said phase changing means, said controlling means, said phase synchronizing means, and said pulse modulation pattern generating means are integrated into a one-chip integrated circuit.

87. A method of image forming, comprising the steps of:

providing a photosensitive surface;

generating pixel clock pulses;

generating a high frequency clock pulse;

oscillating a plurality of laser light in accordance with said pixel clock pulses;

converting said plurality of laser light into a plurality of scanning laser light beams that focus as a plurality of scanning laser light spots on said photosensitive surface and scan respective scanning lines starting from respective scanning start positions aligned in a sub-scanning direction on said photosensitive surface; and changing a phase of said pixel clock pulses to control respective times when said plurality of laser light are oscillated by said oscillating step so as to correct deviations associated with said scanning laser light spots, wherein generating pixel clock pulses changes a time length between pixel clock pulses based on said phase of pixel clock pulses and said high frequency clock pulse.

88. A method as defined in claim 87, wherein said oscillating step uses at least two laser light oscillating semiconductors.

89. A method as defined in claim 87, wherein said oscillating step uses a laser light oscillating semiconductor that includes a plurality of laser light emission points.

90. A method as defined in claim 87, wherein said deviations occur in said scanning start positions in a main scanning direction.

91. A method as defined in claim 87, wherein said deviations occur in said scanning start positions in a main scanning direction.

92. A method as defined in claim 87, wherein said converting step comprises a step of deflecting said plurality of laser light, and said deviations occur in said scanning start positions in a main scanning direction.

93. A method as defined in claim 87, wherein said deviations occur in a scanning line length per unit time among said scanning laser light spots and said changing step changes the phase of said pixel clock pulses to control respective times when said plurality of laser light are oscillated by said oscillating step so as to correct said deviations to be less than 1% relative to a predetermined scanning line length.

94. A method of image forming, comprising the steps of:
providing a plurality of photosensitive surfaces;
generating pixel clock pulses;
oscillating a plurality of laser light with at least one laser light oscillating semiconductor configured to oscillate laser light in accordance with said pixel clock pulses;
arranging said plurality of laser light and said plurality of photosensitive surfaces to correspond to each other on a one-to-one basis;
controlling a driving of at least one of said laser light oscillators, said controlling including generating a high frequency clock pulse;
converting each of said plurality of laser light into a scanning laser light beam that focuses as a scanning laser light spot on said corresponding photosensitive surface and scans a scanning line on said corresponding photosensitive surface; and
changing a phase of said pixel clock pulses to control respective times when said plurality of laser light are oscillated by said oscillating step so as to correct deviations in lengths of said scanning lines relative to a predetermined scanning time period among said plurality of photosensitive surfaces,
wherein said generating pixel clock pulses changes a time length between pixel clock pulses based on said phase of pixel clock pulses and said high frequency clock pulse.

95. A method of image forming, comprising:
providing a photosensitive surface;
generating pixel clock pulses;
oscillating a plurality of laser light in accordance with said pixel clock pulses;
converting said plurality of laser light into a plurality of scanning laser light beams that focus as a plurality of scanning laser light spots on said photosensitive surface and scan respective scanning lines starting from respective scanning start positions aligned in a sub-scanning direction on said photosensitive surface;
changing a phase of said pixel clock pulses to control respective times when said plurality of laser light are oscillated by said oscillating step so as to correct deviations associated with said scanning laser light spots; and
the step of controlling a driving of said laser light oscillator, said controlling step further comprising the steps of:
generating a high frequency clock pulse; and
loading image data in synchronism with said high frequency clock pulse and said pixel clock pulse,
wherein said pixel clock pulse generating step frequency-divides said high frequency clock pulse generated by said high frequency clock pulse generating step to generate said pixel clock pulse and said changing step shifts said phase of said pixel clock pulse to cause said loading step to change a timing of loading said image data.

96. A method as defined in claim 95, wherein said high frequency clock pulse generating step comprises the step of synchronizing which comprises the steps of:
oscillating laser light in accordance with a voltage applied;
frequency-dividing an output from said voltage control oscillating step; and
comparing a phase of an output from said frequency dividing step with a phase of a reference frequency and, based on a comparison result, to output a phase synchronous signal.

97. A method as defined in claim 96, wherein said pixel clock pulse generating step outputs said pixel clock pulse in synchronism with said phase synchronous signal output by said comparing step.

98. A method as defined in claim 96, wherein said controlling step further comprises the step of generating a pulse modulation pattern relative to said laser light oscillated by said laser light oscillating step in accordance with said output from said voltage control oscillating step and said image data loaded by said image data loading step.

99. A method as defined in claim 98, further comprising the steps of:
modulation-controlling said laser light oscillating step in accordance with said pulse modulation pattern generated by said pulse modulation pattern generating step to cause said laser light to be a frequency-modulated laser light,
wherein said phase changing step changes said phase of said pixel clock pulses to control a time when said pulse modulation pattern generating step generates said pulse modulation pattern.

100. A method as defined in claim 98, wherein said pixel clock pulse generating step, said phase changing step, said image data loading step, said phase synchronizing step, and said pulse modulation pattern generating step are integrated into a one-chip integrated circuit.

101. A method as defined in claim 98, wherein said pixel clock pulse generating step, said phase changing step, said controlling step, said phase synchronizing step, and said pulse modulation pattern generating step are integrated into a one-chip integrated circuit.

* * * * *